United States Patent
Suga et al.

(10) Patent No.: US 6,771,889 B1
(45) Date of Patent: Aug. 3, 2004

(54) DATA STORAGE BASED ON SERIAL NUMBERS

(75) Inventors: Akira Suga, Tokyo (JP); Satoshi Ogiwara, Sagamihara (JP); Taku Yamagami, Yokohama (JP); Yuko Tanaka, Kawasaki (JP); Kazuhiko Nakashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/715,110

(22) Filed: Nov. 20, 2000

Related U.S. Application Data

(62) Division of application No. 08/720,911, filed on Oct. 3, 1996, now Pat. No. 6,192,191.

(30) Foreign Application Priority Data

| Oct. 3, 1995 | (JP) | 7-256485 |
| Oct. 3, 1995 | (JP) | 7-256486 |
| Oct. 3, 1995 | (JP) | 7-256487 |
| Oct. 3, 1995 | (JP) | 7-256488 |
| Oct. 3, 1995 | (JP) | 7-256489 |
| Oct. 3, 1995 | (JP) | 7-256490 |

(51) Int. Cl.$^7$ .............................. H04N 5/76; H04N 5/225
(52) U.S. Cl. ..................... 386/95; 386/117; 348/207.99
(58) Field of Search ........................... 386/95, 98, 117, 386/125, 126, 45, 1, 38, 120; 348/207.99, 231, 232, 233, 220; 707/100, 104, 200; H04N 5/225, 5/92, 5/76

(56) References Cited

U.S. PATENT DOCUMENTS

| 4,221,938 A |   | 9/1980  | Mohammadioun ........... 369/29 |
| 4,907,283 A |   | 3/1990  | Tanaka et al. ................ 382/40 |
| 5,164,831 A |   | 11/1992 | Kuchta et al. .............. 358/909 |
| 5,189,630 A |   | 2/1993  | Barstow et al. .............. 386/96 |
| 5,418,919 A |   | 5/1995  | Kadosawa et al. .......... 395/375 |
| 5,712,947 A | * | 1/1998  | Oguro et al. ............... 386/120 |
| 5,771,334 A |   | 6/1998  | Yamauchi et al. ............ 386/95 |
| 5,806,072 A |   | 9/1998  | Kuba et al. ................. 348/231 |
| 5,835,669 A |   | 11/1998 | Hirayama et al. ............ 386/95 |
| 5,959,669 A |   | 9/1999  | Mizoguchi et al. ......... 348/362 |
| 6,222,986 B1 | * | 4/2001 | Inuiya ........................ 386/120 |
| 6,393,193 B2 | * | 5/2002 | Yamagata et al. ............ 386/46 |

* cited by examiner

*Primary Examiner*—Thai Tran
(74) *Attorney, Agent, or Firm*—Fitzpatrick, Cella, Harper & Scinto

(57) ABSTRACT

An object of the present invention is to easily search data from a recording medium on which different types of data items are recorded. A storing apparatus is disclosed, that comprises a signal processing unit for acquiring first type data and second type data and processing them, a serial number assigning unit for sequentially assigning a serial number to the first type data and the second type data processed by the signal processing unit in the acquired order regardless of the first type data or the second type data, and a storing unit for storing the first type data and the second type data corresponding to the serial number.

6 Claims, 44 Drawing Sheets

| type.stg | type.data Type | type.IDCode |

| Nobj | object index | SubObject index |
|---|---|---|
| 0 | 2 | 1 |
| 1 | 3 | 1 |
| 2 | 4 | 1 |
| 3 | 4 | 2 |
| 4 | 4 | 3 |
| 5 | 5 | 1 |

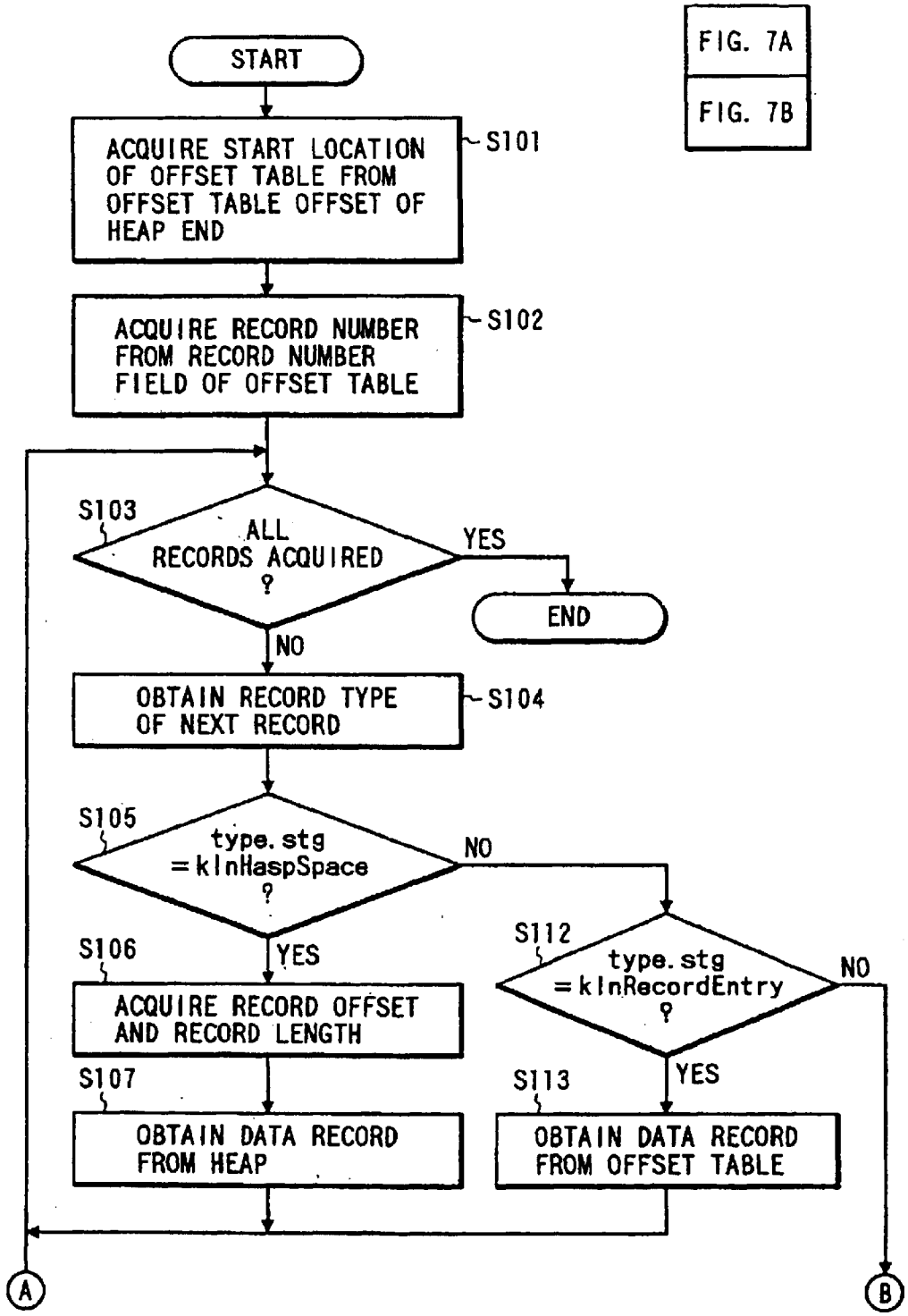

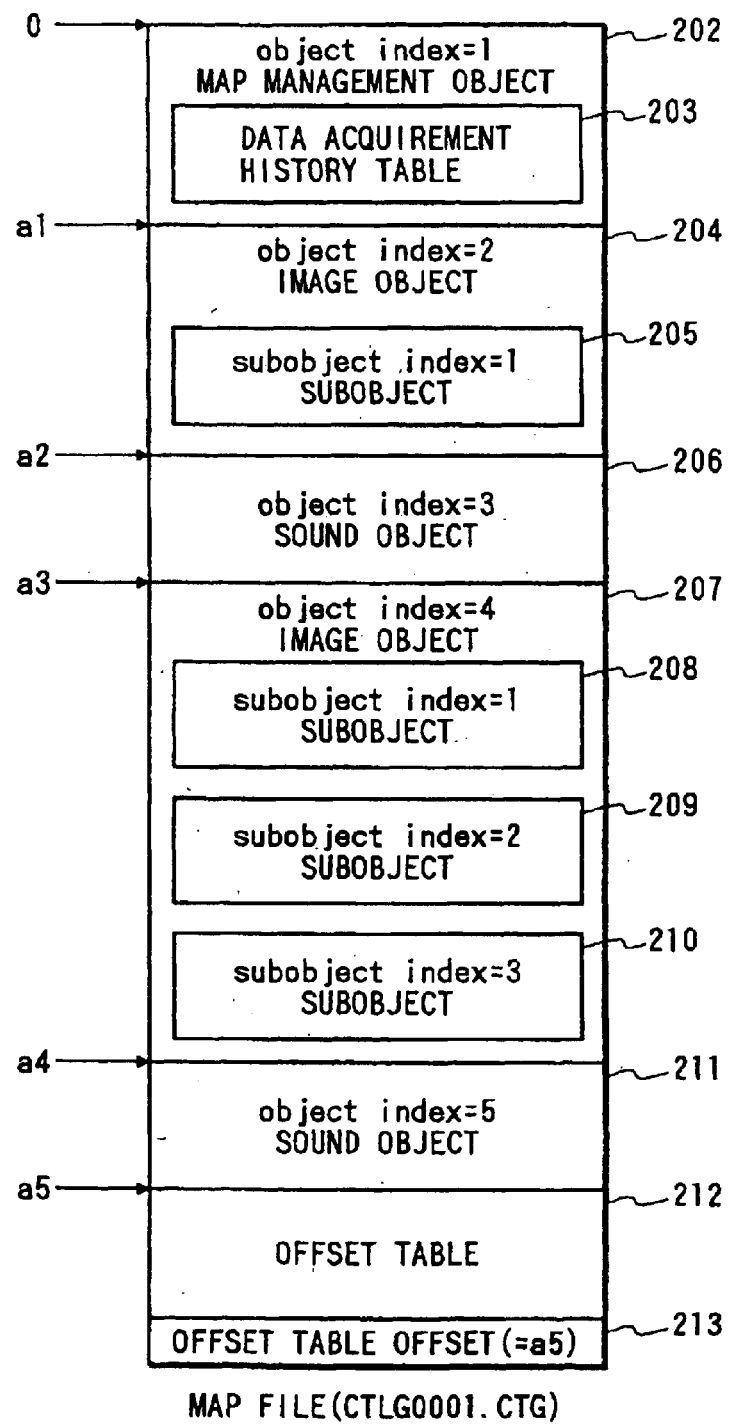

FIG. 10

| | | |
|---|---|---|
| | RECORD NUMBER=5 | 214 |
| 1 | RECORD TYPE (type.IDCode=mapManagementObject) | 220 |
| | RECORD OFFSET (=0) | 221 |
| | RECORD LENGTH | 222 |
| 2 | RECORD TYPE (type.IDCode=imageObject) | 223 |
| | RECORD OFFSET (=a1) | 224 |
| | RECORD LENGTH | 225 |
| 3 | RECORD TYPE (type.IDCode=soundObject) | 226 |
| | RECORD OFFSET (=a2) | 227 |
| | RECORD LENGTH | 228 |
| 4 | RECORD TYPE (type.IDCode=imageObject) | 229 |
| | RECORD OFFSET (=a3) | |
| | RECORD LENGTH | |
| 5 | RECORD TYPE (type.IDCode=soundObject) | |
| | RECORD OFFSET (=a4) | |
| | RECORD LENGTH | |

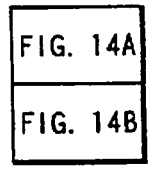
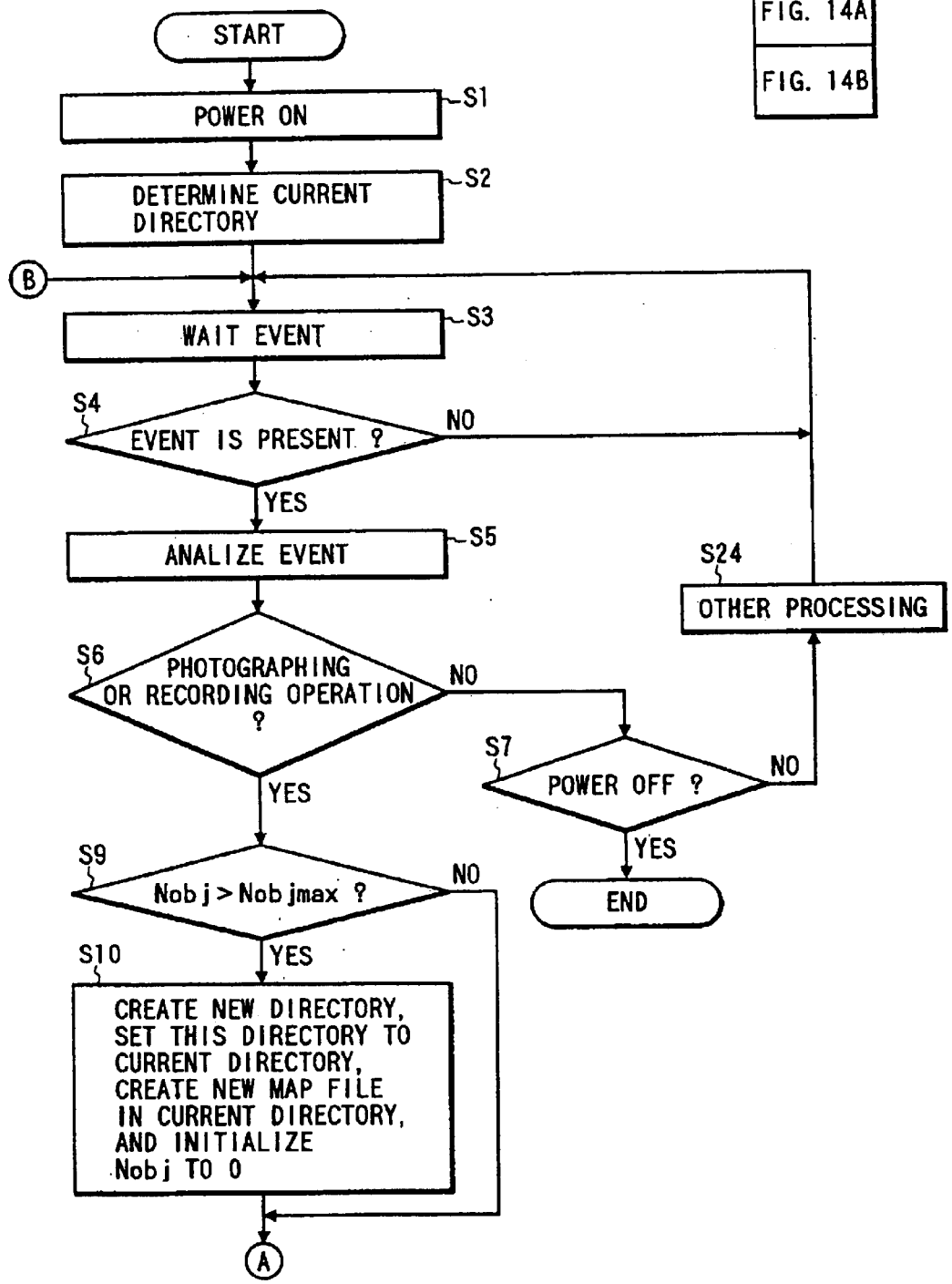

FIG. 26

```
MapFile1
    Recording mode table desc
    Configuration desc(Configuration ID=4)
    Configuration desc(Configuration ID=5)
    Configuration desc(Configuration ID=6)
    Hardware Adjustment Values desc
    Map file end tag
```

FIG. 27

```
desc1:tag, length, data;
desc2:tag, length, {
        desc3:tag, length, data;
        desc4:tag, length, data;
};
```

FIG. 28

```
Configuration desc:tag,length,{
    Configuration ID desc:tag,length,Configuration ID;
    Shooting Parameter desc:tag,length,Shooting Parameter;
    Sound Recording Parameter desc:tag,length,Sound Recording Parameter;
    Image Auto Copy Property desc:tag,length,{
        Image object handler desc:tag,length,Image object handler;
        Configuration Name desc:tag,length,Configuration Name;
        Description desc:tag,length,Description;
    };
    Sound Auto Copy Property desc:tag,length,{
        Configuration Name desc:tag,length,Configuration Name;
    };
};
```

FIG. 29

| Recording mode | Configuration ID |
|---|---|
| 1 | 4 |
| 2 | 5 |
| 3 | 6 |

Recording mode table

FIG. 30

```
MapFile2
    Configuration desc /* Configuration ID=6 */
    Image file desc
    Image file desc
    Image file desc
    Sound file desc
    Configuration desc /*Configuration ID=4 */
    Image file desc
    Sound file desc
    Map file end tag
```

FIG. 31

```
Image file desc:tag,length,{
    File location desc:tag,length, location;
    Properties.desc:tag,length,properties;
    Link desc:tag,length,Link ;/*to Configuration desc(Configuration ID=6) */
    Image Auto Copy Prorerty desc:tag,length,{
        Image object handler desc:tag,length,Image object handler;
        Configuration Name desc:tag,length,Configuration Name;
        Description desc:tag,length,Description;
    };/*Copied from Configuration desc(Configuration ID=6)*/
};
```

FIG. 32

```
Sound file desc:tag,length,{
    File location desc:tag,length,location;
    Properties desc:tag,length,properties;
    Link desc:tag,length,Link ;/*to Configuration desc(Configuration ID=6) */
    Sound Auto Copy Property desc:tag,length,{
        Configuration Name desc:tag,length,Configuration Name;
    };/*Copied from Configuration desc(Configuration ID=6)*/
};
```

| FIG. 33A | FIG. 33B |

BEFORE SETTING OF REMOVABLE MEMORY

AFTER SETTING OF REMOVABLE MEMORY

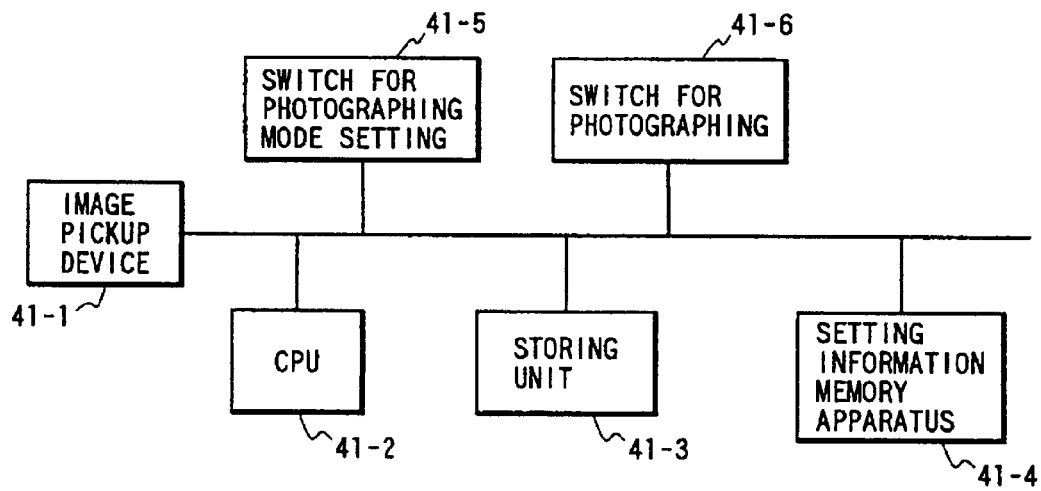

DATA ON MAP FILE

DATA STORAGE BASED ON SERIAL NUMBERS

This application is a division of application Ser. No. 08/720,911, filed Oct. 3, 1996, now U.S. Pat. No. 6,192,191.

BACKGROUND OF THE INVENTION

1. Field of the Invention

The present invention relates to a recording apparatus, a reproducing apparatus, a recording method, and a reproducing method so as to process (for example, record and reproduce) an captured image data and sound data.

2. Related Background Art

In recent years, a digital camera that captures image data and sound data and records the captured data in a recording medium such as a memory card has been developed.

In the digital camera, the captured image data and sound data are recorded as an image file and a sound file to the recording medium, respectively. An individual file stores property information of the captured data (such as photographed data, photographing mode, and photographing condition). To manage the image file and sound file, a method for recording the property information of each captured data as management information to a map file has been proposed.

In addition, there are needs for properly managing a special photographing operation for processing a plurality of images as one photographing unit such a sequential photographing operation and a panorama photographing operation.

As features of the digital camera, in addition to capturing image data and sound data, functions for managing various types of property information in association with captured data, displaying the property information along with the image data, and searching desired image data with a search keyword of the property information are desired. However, the property information of image data and sound data is not always expressed with fixed length data. To process various types of data including data for special photographing operations, variable length data is inevitably used. In addition, when text information that annotates image data is added as property information to the image data, it is impossible to treat the text information as fixed length data due to presence of various types of image data. On the other hand, data should be quickly searched. Moreover, to reduce the cost of the digital camera, the variable length data should be managed with a memory that does not have a large storage capacity.

In the digital camera, various types of data such as still image data and sound data are captured. Although a function for designating a desired type of data of such captured data and reproducing or deleting the designated data is desired, a simple display unit should be inevitably used due to the restrictions of size, weight, and cost of the apparatus. In this situation, a function for selecting desired image data or sound data is required. In addition, when various types of captured data and property information are managed with a map file, desired captured data should be searched corresponding to the map file corresponding to a simple method.

When a recording medium with a large capacity is used for the digital camera, many frames of image data can be photographed in comparison with the conventional silver salt type camera. In this case, even if the number of digits of the display unit is limited, frames of image data more than the number of digits of the display unit should be captured.

SUMMARY OF THE INVENTION

An object of the present invention is to provide a recording apparatus and a recording method for easily searching desired data from a recording medium in which different types of data have been recorded.

Another object of the present invention is to provide a recording apparatus and a recording method for easily searching data from the recording apparatus in which captured data has been stored in association with information of the recording apparatus.

A further object of the present invention is to provide a recording method and a recording apparatus for effectively recording and deleting captured data and various types of property data corresponding to the captured data.

A further object of the present invention is to provide a recording apparatus and a recording method having new functions.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 9 is a schematic diagram showing a data record stored in a map file;

FIG. 10 is a schematic diagram showing a structure of an offset table;

FIG. 26 is a schematic diagram showing a first map file;

FIG. 27 is a schematic diagram showing the format of a descriptor;

FIG. 28 is a schematic diagram showing a structure of a configuration descriptor;

FIG. 29 is a schematic diagram showing a recording mode table;

FIG. 30 is a schematic diagram showing a structure of a second map file in the case that three images and one sound are recorded in a Rec3 recording mode with a recording mode table shown in FIG. 6 and then one image and one sound are recorded in a Rec1 recording mode;

FIG. 31 is a schematic diagram showing a first image file descriptor;

FIG. 32 is a schematic diagram showing a first sound file descriptor;

FIG. 41 is a block diagram showing a structure of a sixth embodiment of the present invention;

FIG. 42 is a schematic diagram showing a structure of data of a reproduction processing means identification table;

DESCRIPTION OF THE PREFERRED EMBODIMENTS

First Embodiment

Figure 2:
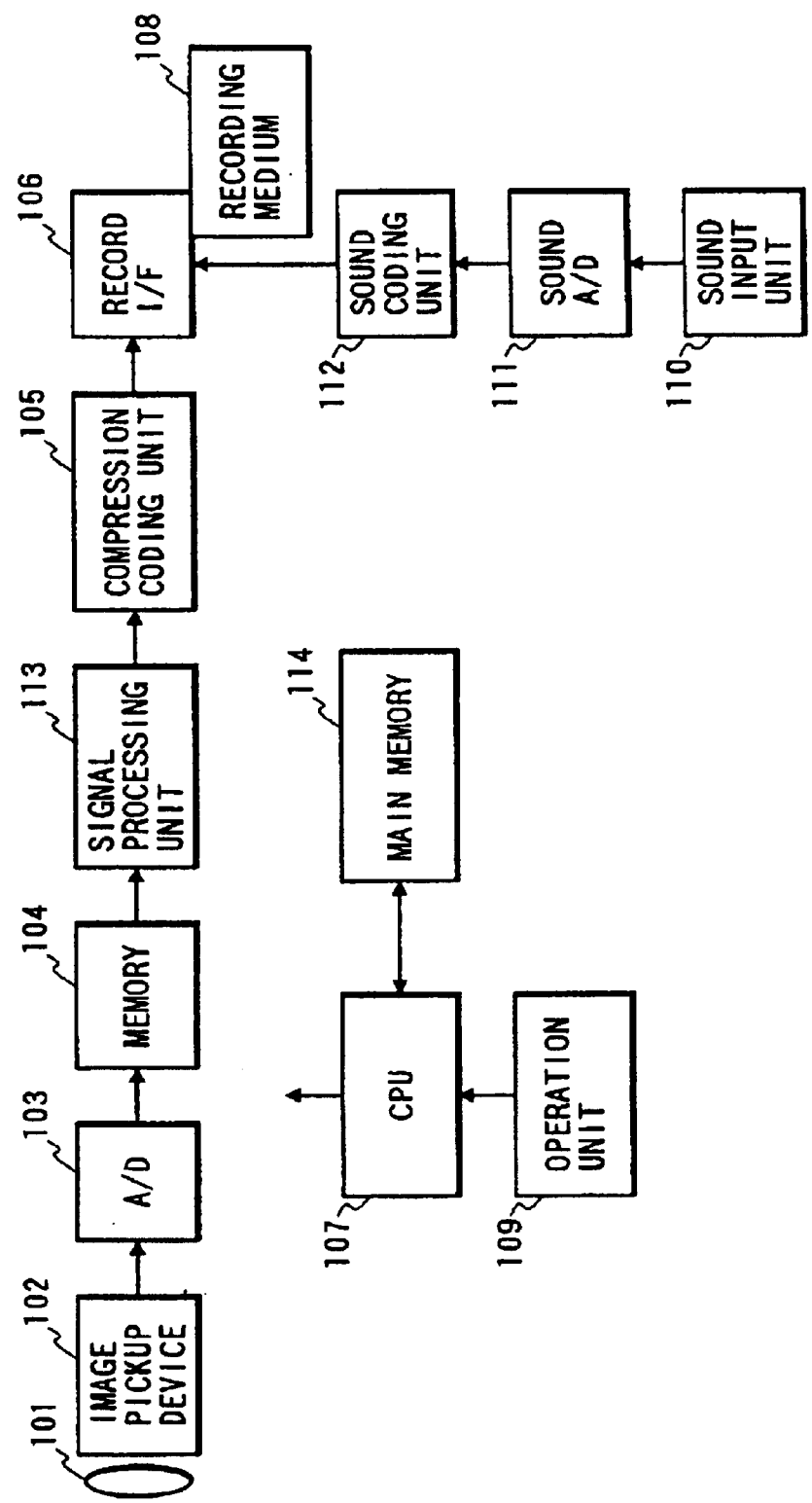
FIG. 2 is a block diagram showing a structure of the digital camera.

FIG. 2 is a block diagram showing a structure of a digital camera according to a first embodiment of the present invention. In FIG. 2, reference numeral 101 is a lens. Reference numeral 102 is an image pickup device that converts an optical image focused by the lens 101 into an electric signal. Reference numeral 103 is an AD converting circuit that converts an analog output signal of the image pickup device 102 into a digital signal. Reference numeral 104 is a memory that temporarily stores an output signal of the AD converting circuit 103. Reference numeral 113 is a signal processing unit that for example processes a color signal of data temporarily stored in the memory 104. Reference numeral 105 is a compression coding unit that compresses and codes image data received from the signal processing unit 113. Reference numeral 108 is a recording medium such as a removable flash memory. Reference numeral 106 is a recording interface that is used to record compressed image data to the recording medium 108. Reference numeral 107 is a CPU that controls the operation of the digital camera. Reference numeral 114 is a main memory that the CPU 107 uses. Reference numeral 109 is an operation unit with which the user sets up a mode and an operation of the digital camera. Reference numeral 110 is a sound input unit such as a microphone. Reference numeral 111 is a sound AD converting circuit that converts an analog signal of the sound input unit 110 into a digital signal. Reference numeral 112 is a sound coding unit that codes sound data. The coded sound data is recorded on the recording medium 108 through the recording interface 106.

Figure 3:
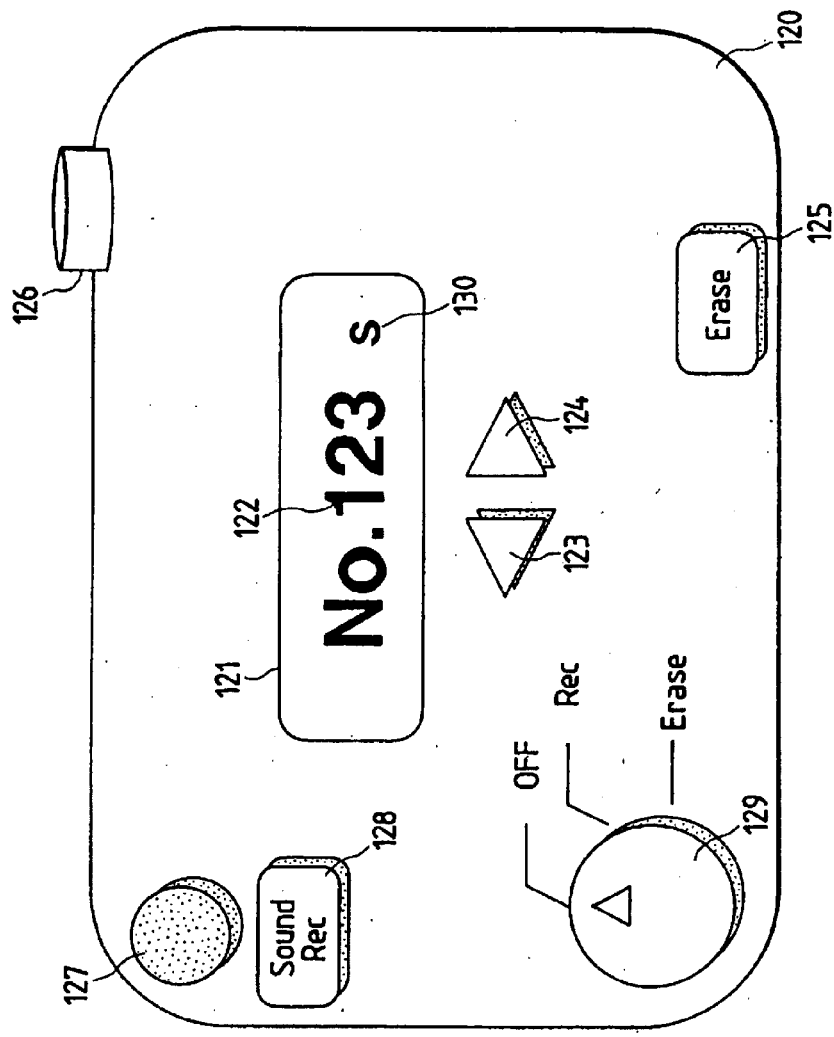
FIG. 3 is a schematic diagram showing a rear surface of the digital camera.

FIG. 3 is a schematic diagram for explaining an example of the operation unit 109 disposed on the rear surface of the digital camera. In FIG. 3, reference numeral 120 is the rear surface of the digital camera. Reference numeral 121 is an operation system display unit. Reference numeral 122 is a serial number indication for identifying captured sound or image. To reduce the size, weight, and cost of the digital camera, the operation system display unit 121 is simply structured. The number of display digits of the serial number indication 112 is normally around three. Since the user cannot easily memorize a number exceeding three digits, three digits are assigned to the number of display digits of a serial number. Reference numeral 130 is a captured data type indication. When data of a serial number displayed is an image, P (Picture) is displayed. When data of a serial number displayed is a sound, S is displayed. Reference numeral 129 is a mode setup switch that can select one of three modes OFF (power off), Rec (recording mode), and Erase (erasing mode). Reference numerals 123 and 124 are a down button and an up button that select a serial number of record data. Reference numeral 125 is an erasing button. In the case that the mode setup switch 129 is placed in the erasing mode, when the erasing button 125 is pressed, the sound data or image data corresponding to the serial number displayed is erased. Reference numeral 126 is a releasing switch that triggers a photographing operation. Reference numeral 127 is a microphone. Reference numeral 128 is a sound recording switch.

Figure 4:
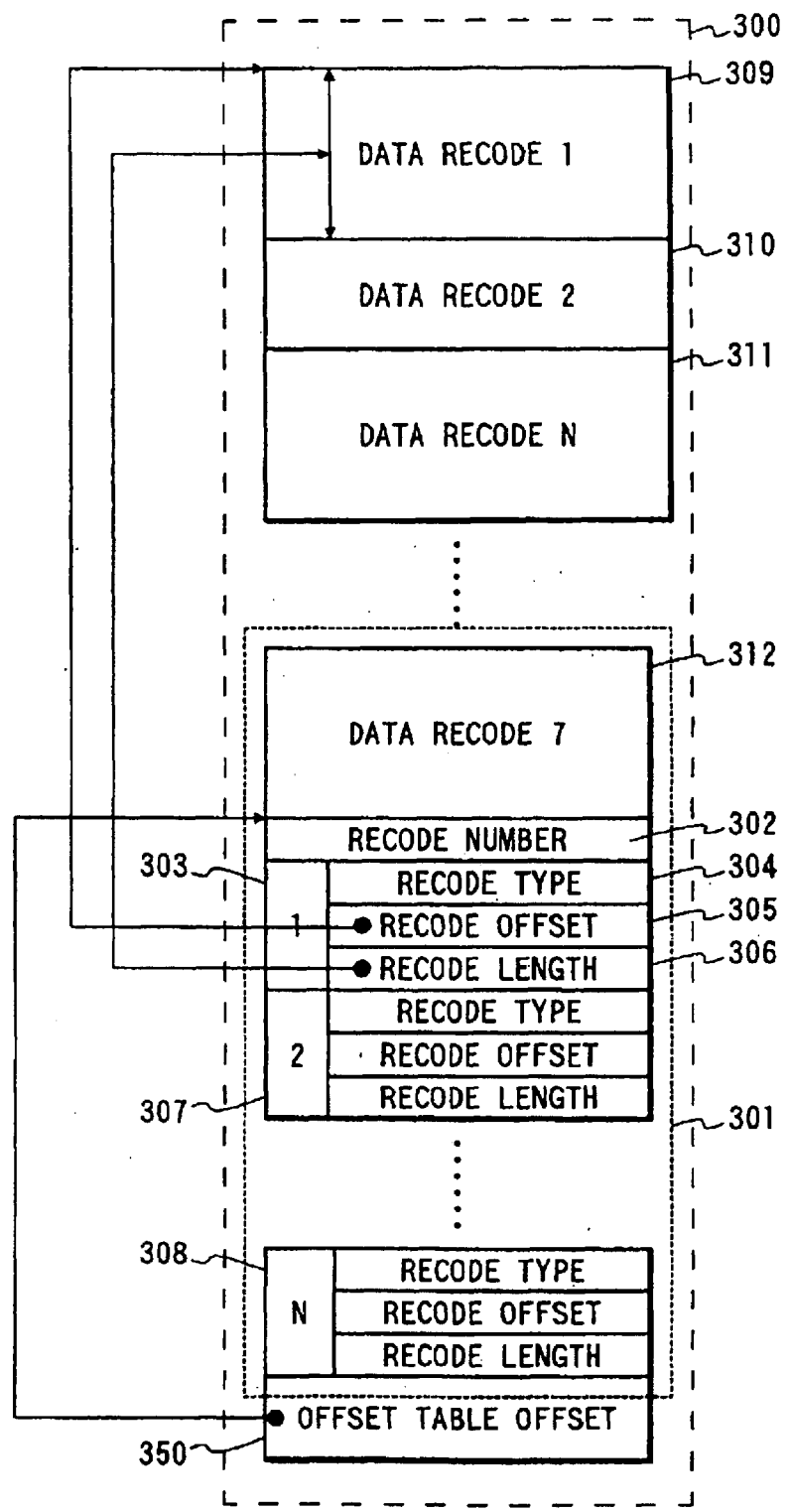
FIG. 4 is a schematic diagram showing a heap structure used as a basic structure of which variable length data is stored in a map file.

FIG. 4 is a schematic diagram for explaining a heap structure 300 used as a basic structure for storing variable length data to a map file (that will be described later) according to the first embodiment. In FIG. 4, reference numerals 309 to 312 are N variable length data records. A data record is a unit of data. The data record is sometimes referred to as a record. Reference numeral 309 is a data record 1. Reference numeral 310 is a data recorder 2. Reference numeral 311 is a data record N. Reference numeral 312 is a data record 7. Reference numeral 301 is an offset table that has acquired data record information that represents the number of records in the heap, record types of the data records, offsets, and record lengths. Reference numeral 302 is the number of data records included in one heap. Reference numeral 303 is acquired data record information of the data record 1. The acquired data record information 303 is composed of a record type field 304 representing the type of the data record 1, a record offset field 305 that represents the offset amount from the beginning of the heap to the beginning of the data record 1, and a record length field 306 that represents the length of the data record 1. With the acquired data record information, a data record can be read. Likewise, reference numeral 307 is acquired data record information of the data record 2. Reference numeral 308 is acquired data record information of the data record N. Reference numeral 350 is an offset of offset table for acquiring the position of the offset table. As described above, the heap structure 300 is composed of the N variable length data records, the offset table 301, and the offset of offset table 350.

Figures 5, 8:
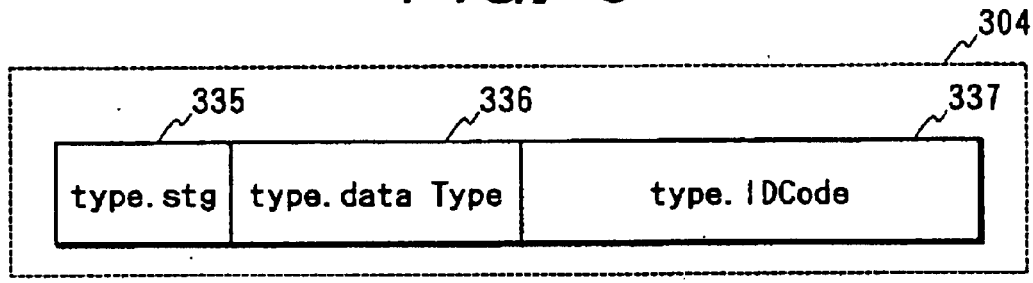
FIG. 5 is a schematic diagram showing a general form of a record type field.
FIG. 8 is a schematic diagram showing an acquired data history table stored in a map file.

FIG. 5 is a schematic diagram showing a general form of the record type field 304. In FIG. 5, reference numeral 335 is a bit field for identifying a storing method of a data record. The bit field 335 is abbreviated as type.stg. Reference numeral 336 is a bit field that represents the type of a data record. The bit field 336 is abbreviated as type.dataType. The bit field 336 represents a category of a data format that represents whether a data record is "ASCII code" or "WORD". Reference numeral 337 is an ID code bit field that represents a detailed category of a data record. The ID code bit field 337 is abbreviated as tyep.IDCode.

Figure 6:
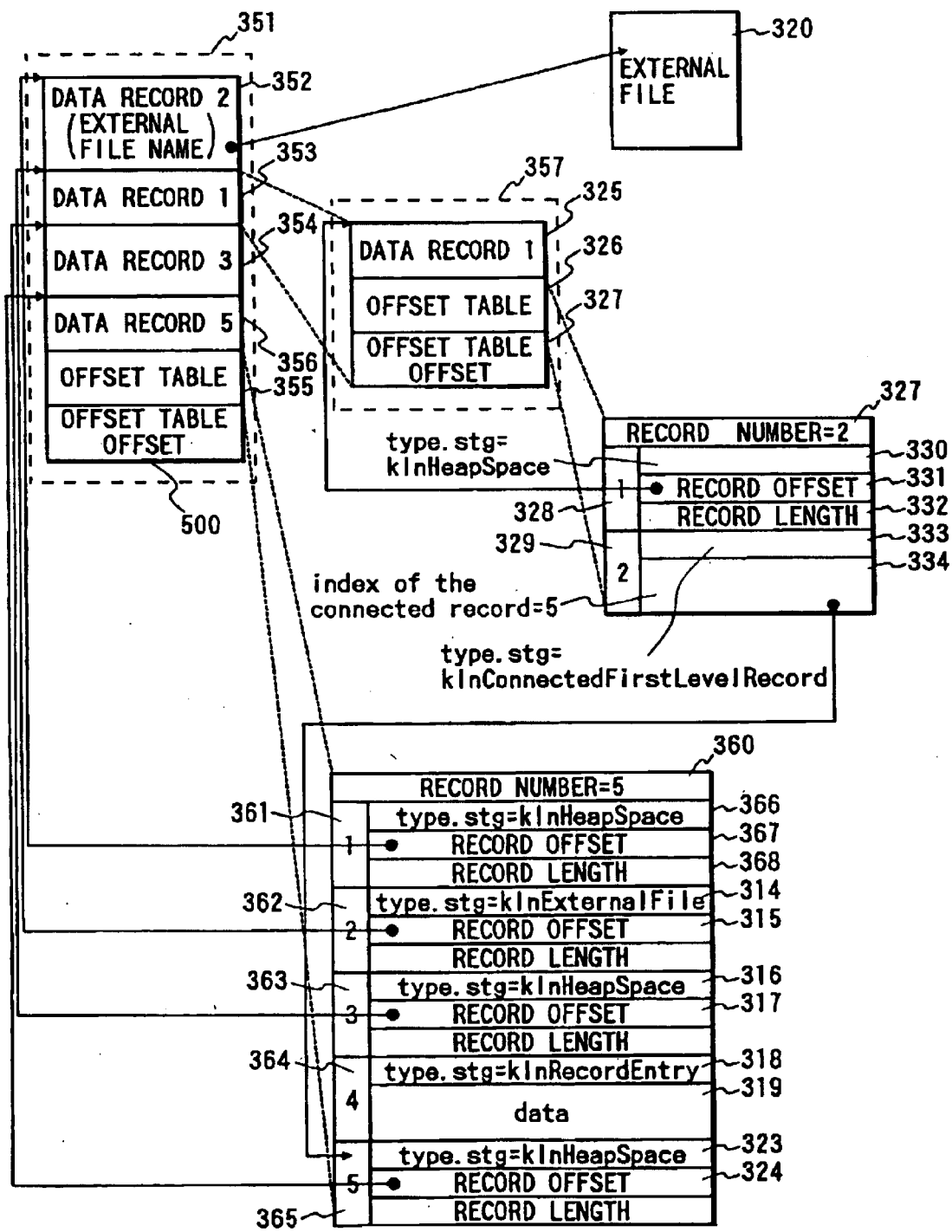
FIG. 6 is a schematic diagram showing a hierarchical heap structure of which the heap structure shown in FIG. 4 is extended.

FIG. 6 is a schematic diagram showing a hierarchical heap structure of which the heap structure 300 shown in FIG. 4 is extended. In the embodiment, a map file is composed with the hierarchical heap structure shown FIG. 6. Reference numeral 351 is an example of the hierarchical heap structure. Reference numeral 353 is a data record 1 that is one data record in a first hierarchical level. In addition, the data record 1 (353) is also a heap structure 357 that is structured as a heap in a second hierarchical level. Since heaps are hierarchically structured, they are referred to as a hierarchical heap structure. In the hierarchical heap structure, a total of four data record string methods are accomplished. These storing methods are identified with the type.stg bit field 335. Next, the four data record storing methods will be described.

The first data record storing method is a method for storing data in a heap as described in FIG. 4. For example, the data record 3 (354) is stored in this method. When a constant kInHeapSpace is assigned to the type.stg bit field of the record type field 316 of the acquired data record information 363 of the data record 3 (354), it is determined that data is stored in the heap. A record offset 317 has an offset amount from the beginning of the heap to the beginning of the data record 3 (354).

The second data record storing method is a method for storing data in the acquired data record information of the offset table with a record offset field and a record length field of the offset table. The second storing method is exemplifed by a fourth data record in a hierarchical heap 351 shown in FIG. 6. When the type.stg bit field of the record type field 318 of the acquired data record information 364 of the offset table 355 is a constant kInRecordEntry, a data record is directly stored in a region 319 that has a record offset and a record length. When such a small data record is directly stored in the offset table, the data storage space is decreased and the access speed of a data record is increased.

The third data record storing method is a method for linking a member of a heap in a hierarchical level deeper than the second hierarchical level with a record in the first hierarchical level with an index that the member in the deeper hierarchical level has. In this example, the data record 2 in the second hierarchical level is connected to the data record 5 (356) in the first hierarchical level. When a constant kInConnectedFirstLevelRecord is assigned to the type.stg bit field of the record type field 333 of the acquired data record information 329 of the offset table 326 of the heap 357 in the second hierarchical level, the third data record storing method is identified. When an index of a data record in the first hierarchical level is stored in the region 334 that has a record offset, a data record that has been linked is identified. In this example, the region 334 is linked with a data record 5 in the first hierarchical level.

In this record data storing method, a heap in a child hierarchical level can be prevented from increasing with large child data records. Moreover, in this method, since large data is not present in a child hierarchical level, all the heap 357 in the second hierarchical level can be stored in the main memory 114. Only when the data record 5 (356) linked is required, it is read. Thus, the main memory 114 can be effectively used. Consequently, when data is hierarchically stored in one file, it is not necessary to hierarchically allocate the data. As a result, when the hierarchical structure is changed, the amount of data moved in a file can be minimized. For example, when a data record A in the first hierarchical level is moved from a member of a data record B in the second hierarchical level to a member of a data record C in the third hierarchical level, only the index of the data to be linked is rewritten. For example, in the case that an icon image as property information of a particular data record is stored in the map file, according to this method, when a parent data record is moved and erased, it is not necessary to move the icon image with a large amount of data.

A fourth data storing method is a method for storing a real data record to an external file. This method is exemplified by the data record 2 (352) in the first hierarchical level. When a constant kInExternalFile is assigned to the type.stg field of the record type field 314 of the acquired data record information 362 of the data record 2 (352), it represents that a real data record is stored in an external file. The data record 2 that the record offset 315 represents stores an external file name. With this information, real data in the external file 320 can be acquired. In this data storing method, large data can be stored in the external file and it can be linked with a data record in the heap. Thus, the storage capacity of the map file can be decreased. In addition, external files in various formats can be used as data records in the map file.

Figure 7B:
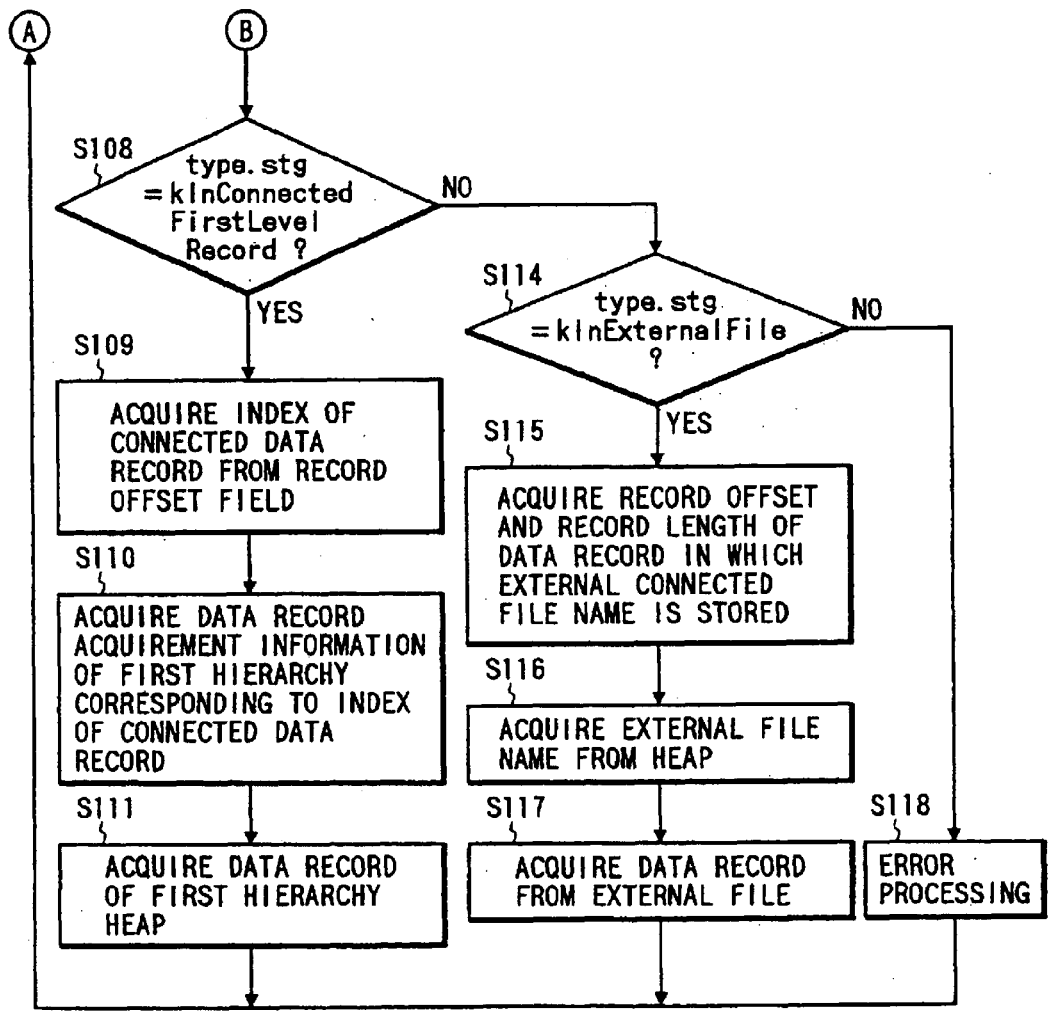
FIG. 7 is comprised of FIGS. 7A and 7B showing flow charts illustrating an accessing method of a data record from a hierarchical heap.

FIGS. 7A and 7B are flow charts showing a method for accessing a data record from a hierarchical heap. At step S101, the start location of the offset table is acquired from the offset of offset table at the last end of the heap. At step S102, the number of records is acquired from the number of record field of the offset table. Thereafter, at step S103, it is determined whether all records have been acquired. When the determined result at step S103 is Yes, the process is completed. When the determined result at step S103 is No, the flow advances to step S104. However, only a required data record may be read from the offset table. At step S104, the record type of the next record is acquired from the record type field of the acquired data record information. At step S105, it is determined whether or not type.stg= kInHeapSpace. When the determined result at step S105 is Yes, the flow advances to step S106. At step S106, the record offset field and the record length field of the acquired data record information are read. With the resultant information, at step S107, a data record is acquired from the heap. When the determined result at step S105 is No, the flow advances to step S112. At step S112, it is determined whether or not type.stg=kInRecordEntry. When the determined result at step S112 is Yes, the flow advances to step S113. At step S113, a data record is acquired from the offset table.

When the determined result at step S113 is No, the flow advances to step S108. At step S108, it is determined whether or not type.stg=kInConnectedFirstLevelRecord. When the determined result at step S108 is Yes, the flow advances to step S109. At step S109, an index of a linked data record is acquired from the record offset field. Thereafter, at step S110, acquired data record information in the first hierarchical level corresponding to the index of the connected data record is acquired from the offset table in the first hierarchical level. At step S111, a data record is acquired from the heap in the first hierarchical level. When the determined result at step S108 is No, the flow advances to step S114. At step S114, it is determined whether or not type.stg=kInExternalFile. When the determined result at step S114 is Yes, the flow advances to step S115. At step S115, the record offset and the record length of a data record that has an external connected file name are acquired. At step S116, the external file name is acquired from the heap. At step S117, a data record is acquired from the external file.

Figure 1:
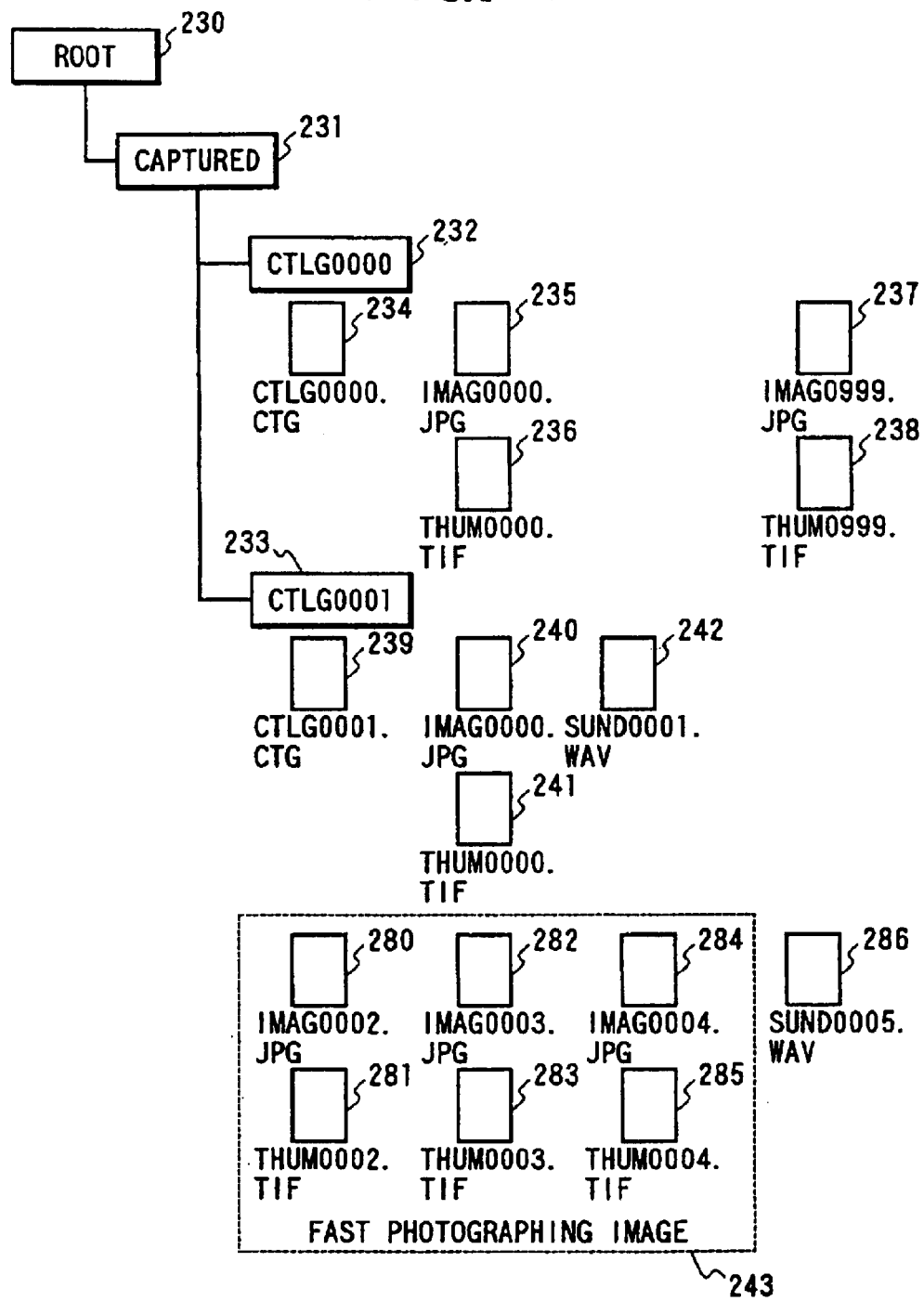
FIG. 1 is a schematic diagram showing a structure of directories and files in the case that captured data is recorded on a recording medium of a digital camera.

FIG. 1 is a schematic diagram for explaining structures of directories and files in the case that captured data is recorded to the recording medium 108 of the digital camera. In this embodiment, files of the recording medium 108 are managed by for example a FAT file system. A directory CAPTURED (231) is created under a ROOT directory 230. A directory for storing up to 1000 captured data items such as image data or sound data is created under the directory CAPTURED (231). In FIG. 1, a directory CTLG0000 (232) and a directory CTLG0001 (233) are examples of captured data directories. The directory CTLG0000 (232) stores up to 1000 captured data items from a combination of a map file CTLG0000.CTG (234) (that manages property information of entire captured data of the directory CTLG0000 (232)), an image data file IMAG0000.JPG (235), and a thumbnail image data file THUM0000.TIF (236) to a combination of an image data file IMAG0999.JPG (237) and a thumbnail image data file THUM0999.TIF (238). The thumbnail image data is an reduced image that is used to display a list of all captured data items when they are read to a personal computer or the like. The thumbnail image becomes an index image for searching a desired image from an image group photographed by the digital camera and read to the personal computer or the like.

When 1000 captured data items are stored in the directory CTLG0000 (232), a directory CTLG0001 (233) is automatically created. In addition, a map file CTL0001.CTG (239) for managing all captured data items in the directory CTLG0001 (233) is automatically created. The directory CTLG0001 (233) stores a first captured image data file IMAGE0000.JPG (240), a thumbnail image file THUM0000.TIF (241) thereof, a captured sound data file SUND0001.WAV (242), a second captured image data file IMAG0002.JPG (280), a thumbnail image file THUM0002.TIF (281) thereof, a captured image data file IMAG0003.JPG (282), a thumbnail image file THUM0003.TIF (283), a third captured image file IMAG0004.JPG (284), a thumbnail image file THUM0004.TIF (285), and a captured sound file SUND0005.WAV (286). Now, assume that the image files IMAG0002.JPG (280), IMAG0003.JPG (282), and IMAG0004.JPG (284) are a sequentially photographed image set 243 photographed by one sequential photographing operation.

FIG. 8 is a schematic diagram for explaining an acquired data history table stored in the map file CTLG0001.CTG (239). In FIG. 8, a Nobj field represents a serial number of captured data items stored in a captured data storage directory. This serial number is referred to as an object serial number. In the map file, one unit of data is referred to as an object. In the map file, data is managed as data records of a heap in the first hierarchical level. For example, the sequentially photographed image set 243 is composed of three image data items as three sub-objects. The sequentially photographed image set 243 is managed as one object composed of the three sub-objects. An object is managed as a data record in the heap in the first hierarchical level of the map file. In FIG. 8, a object index field represents an index of a data record of the heap in the first hierarchical level of the map file CTLG0001.CTG (239). A subObject index field represents an index of a sub-object of an object (for example, an index of an image of a sequentially photographed image). In the example shown in FIG. 8, Nobj=0 represents the image file IMAG0000.JPG, Nobj=1 represents the sound file SUND0001.WAV, Nobj=2 represents the image file IMAG0002.JPG, Nobj=3 represents the image file IMAG0003.JPG, Nobj=4 represents the image file IMAG0004.JPG, and Nobj=5 represents the sound file SUND0005.WAV.

The file name includes an object serial number. For example, the file name IMAG000.JPG of the image file with Nobj=0 is composed of IMAGE that represents an image, 0000 that represents an object serial number Nobj with four digits, and an extension JPG that represents the data format of the image. The file name SUND0001.WAV of the second captured sound data is composed of SUND that represents a sound, 0001 that represents an object serial number Nobj with four digits, and an extension WAV that represent the data format of the sound.

FIG. 9 is a schematic diagram for explaining a data record stored in the map file CTLG0001.CTG (239). The map file CTLG0001.CTG (239) is formed in a hierarchical heap structure. In this case, a data record stored in the heap of the first hierarchical level is referred to as an object. In FIG. 9, reference numeral 202 is a map management object of which object index=1. The map management object 202 stores the management information of the map file. Reference numeral 203 is an acquired data history table. The acquired data history table 203 is stored as one data record of the map management object. As with the acquired data history table, property information that an object includes as a data record is referred to as a property. An object stores various properties that represent properties of the object. In FIG. 9, only typical properties will be described.

Reference numeral 204 is an image object of which object index=2. Since the image object 204 is a single photographed image, the image object 204 includes a sub-object 205 that is one image data item of which subObject index=1 is included. Reference numeral 206 is a sound object of which object index=3. Reference numeral 207 is an image object of which object index=4. Since the image object 207 is a three-sequentially-photographed-images set, the image object 207 is composed of a sub-object 208 that is image data of which subObject index=1, a sub-object 209 of which subObject index=2, and a sub-object 210 of which subObject index=3. Reference numeral 211 is a sound object of which object index=5. Reference numeral 212 is an offset table for storing acquired data record information in the first hierarchical level of the map file CTLG0001.CTG (239). Reference numeral 213 is an offset of offset table for acquiring the location of the map file CTLG0001.CTG (239) of the offset table 212. The offset of offset table 213 stores a5 that is an offset address from the beginning of the map file CTLG0001.CTG (239) of the offset table 212.

FIG. 10 is a schematic diagram showing a structure of the offset table 212. In Table 10, reference numeral 214 is the number of records. In this example, the number of records is 5. Reference numeral 215 is acquired data record information of a data record of which object index=1. The acquired data record information 215 has a record type field 220 of which type.IDCode=mapManagementObject that represents a map management object. As shown in FIG. 9, since the data record 215 is located at the beginning of the file, the record offset field 221 thereof is 0. Reference numeral 216 is acquired data record information of a data record of which object index=2. The acquired data record information 216 has a record type field of which type.IDCode=imageObject that represents an image object. As shown in FIG. 9, the acquired data record information 216 has a record offset 223 that is a1. Reference numeral 217 is acquired data record information of a data record of which object index=3. The acquired data record information has a record type field of which type.IDCode=soundObject that represents a sound object. As shown in FIG. 9, the acquired data record information has a record offset that is a2. Reference numeral 218 is acquired data record information of a data record of which object index=4. The acquired data record information 218 has a record type field 226 of which type.IDCode=imageObject that represents an image object. As shown in FIG. 9, the acquired data record information 218 has a record offset 227 that is a3. Reference numeral 219 is acquired data record information of a data record of which object index=5. The acquired data record information 219 has a record type field 228 of which type.IDCode=soundObject that identifies a sound object. As shown in FIG. 9, the acquired data record information 219 has a record offset field that is a4.

Figure 11:
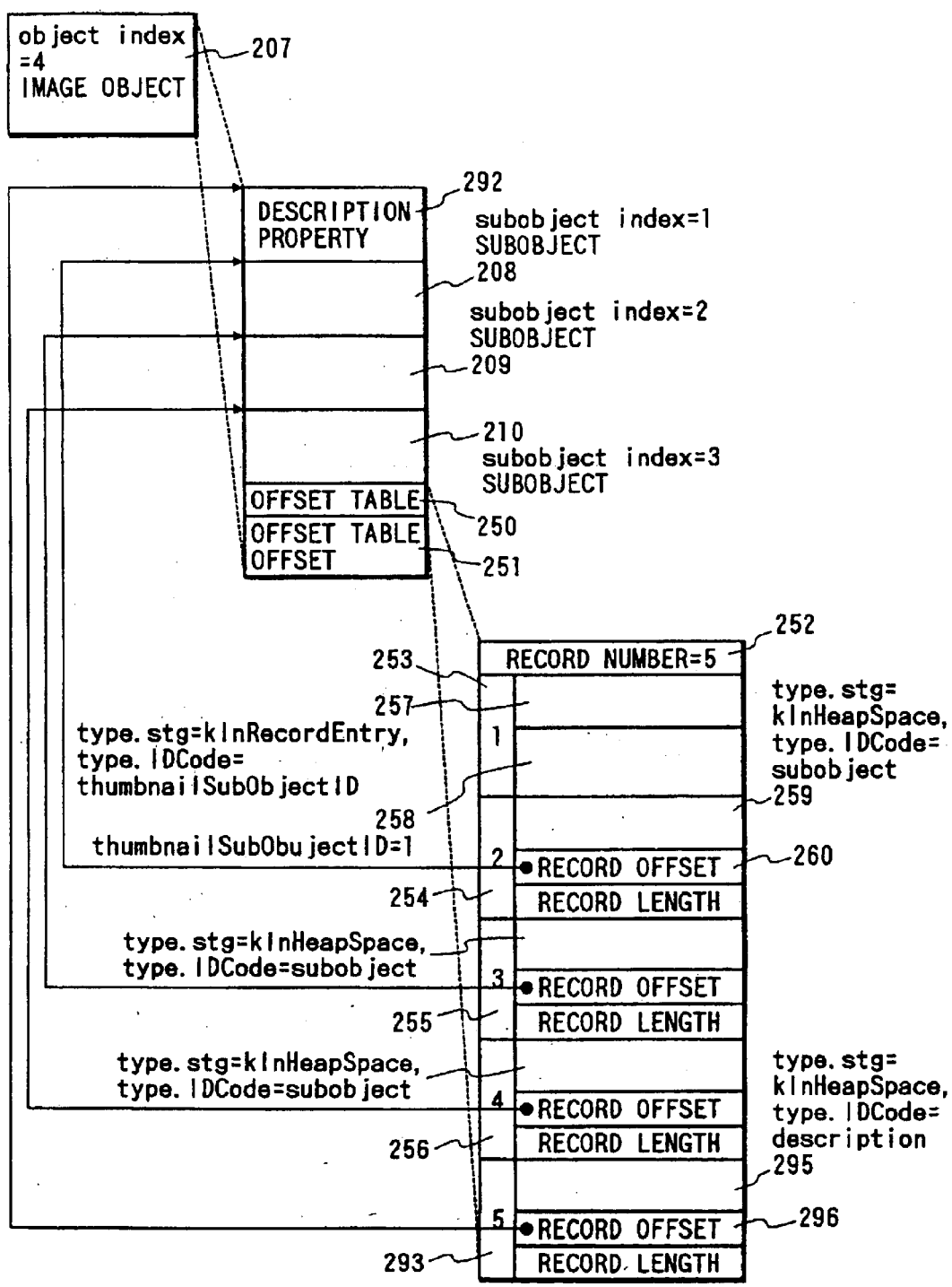
FIG. 11 is a schematic diagram showing a structure of an image object file of a map file.

FIG. 11 is a schematic diagram for explaining a structure of the image object 207 (sequentially photographed image set) of the map file CTLG0001.CTG (239). The image object 207 is composed of the heap in the second hierarchical level. The heap in the second hierarchical level is composed of a sub-object 208, a sub-object 209, a sub-object 210, a description property 292 (that stores text information that annotates the image object 207), an offset table 250, and an offset of offset table 251. Reference numeral 252 is a number-of-records field of the offset table 250. In this example, the number-of-records field 252 is 5. Reference numeral 253 is acquired data record information of the first data record. Since a type.stg bit of a record type field of the acquired data record information 253 is a constant kInRecordEntry, data is directly stored in the record offset field and the record length field 258. Since a type.IDCode bit field of the acquired data record information 253 is a constant thumbnailSubObjectID, one of sub-objects is designated as a thumbnail that represents a sequentially photographed image set. In this example, since a record offset field 258 of the acquired data record information 253 stores thumbnailSubObjectID=1, the thumbnail of the first image of the sequentially photographed image set is used.

Reference numeral 254 is acquired data record information of the second data record. Since a type.stg bit field of a record type field of the acquired data record information 254 is a constant kInheapSpace, a data record is stored in the heap of the sub-object 208 that the record offset represents. A record offset field 260 represents an offset from the beginning of the heap at the top address of the sub-object 208 in the heap. Likewise, reference numerals 255 and 256 are acquisition information of the third and fourth data records (namely, the sub-object 209 and the sub-object 210), respectively. Reference numeral 293 is acquired data record information of the fifth data record. Since a type.stg bit field of a record type field 295 of the acquired data record information is a constant kInHeapSpace, a data record is stored in the heap. Since a type.IDCode bit field of the record field 295 is a constant description, the data record is a description of an image (namely, descriptive information). A record offset 296 represents an offset from the beginning of the heap of the description property 292 of the heap.

Thus, a plurality of sequentially photographed images are managed as one photographing set. When images captured by the digital camera are displayed on a display of a personal computer, sequentially photographed images can be represented with one thumbnail. Consequently, a desired image can be easily searched. In addition, associated information such as a description can be added as one photographing image set. Thus, the storage capacity for data can be reduced.

In this embodiment, sequentially photographed images are represented as one image object. However, a panorama photographed image of which a large image is photographed as a plurality of divided images can be represented as one image object. Thus, in this case, the same effect can be accomplished.

Figure 12:
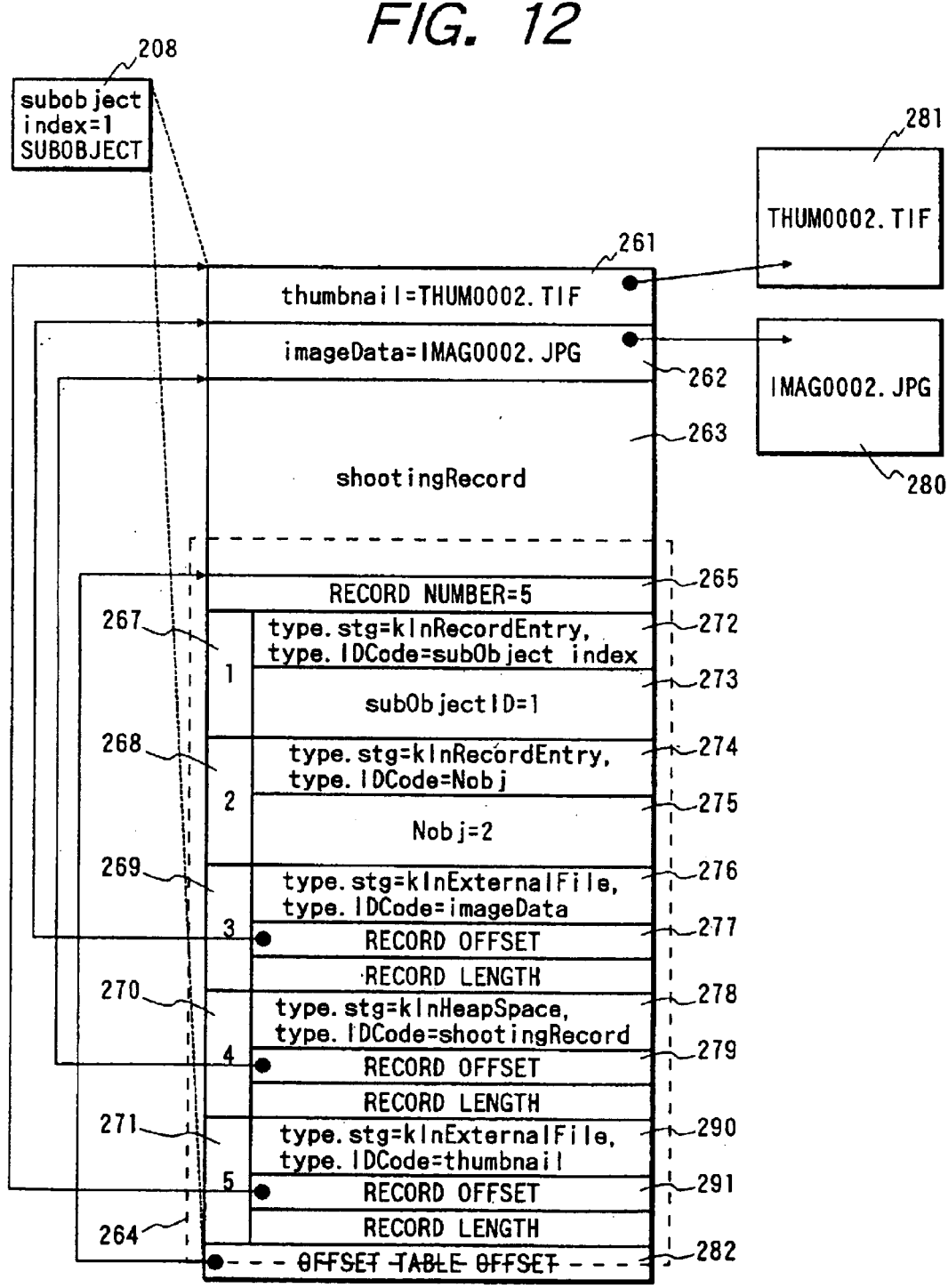
FIG. 12 is a schematic diagram showing a structure of a data record of a sub-object.

FIG. 12 is a schematic diagram showing a structure of data records of the sub-object 208. The sub-object 208 can be composed of heap in the third hierarchical level. In the example shown in FIG. 12, there are five data records composed of three data records in the heap and two data records in the offset table. A number-of-records field 265 in the offset table 264 is 5. First acquired data record information 267 has an offset table of which subObject index=1 corresponding to information of a record type field 272. In other words, this information represents the first image of the image object. However, when the image object is a single photographed image, only an image of which subObject index=1 is present. Second acquired data record information 268 has a record offset field 275 of which an object serial number Nobj=2 corresponding to information of a record type field. Third acquired data record information 269 represents that an external file has imageData (namely, image data) corresponding to information of a record type field 276.

A data record 262 of a heap that a record offset 277 represents a file name of image data. The file name represent an image file IMAG0002.JPG (280). Fourth acquired data record information 270 represents that a data record 263 of a heap that a record offset 279 represents stores shooting Record (namely, photographing record information) corresponding to a record type field 278. The photographing record information also stores information of shutter speed and diaphragm value in a photographing operation. Fifth acquired data record information 271 stores thumbnail (namely, a file name of a thumbnail image file) in a data record 261 of a heap that a record offset 291 represents corresponding to information of a record type field 290. The file name represents a thumbnail image file THUMB0002.TIF (281).

Figure 13:
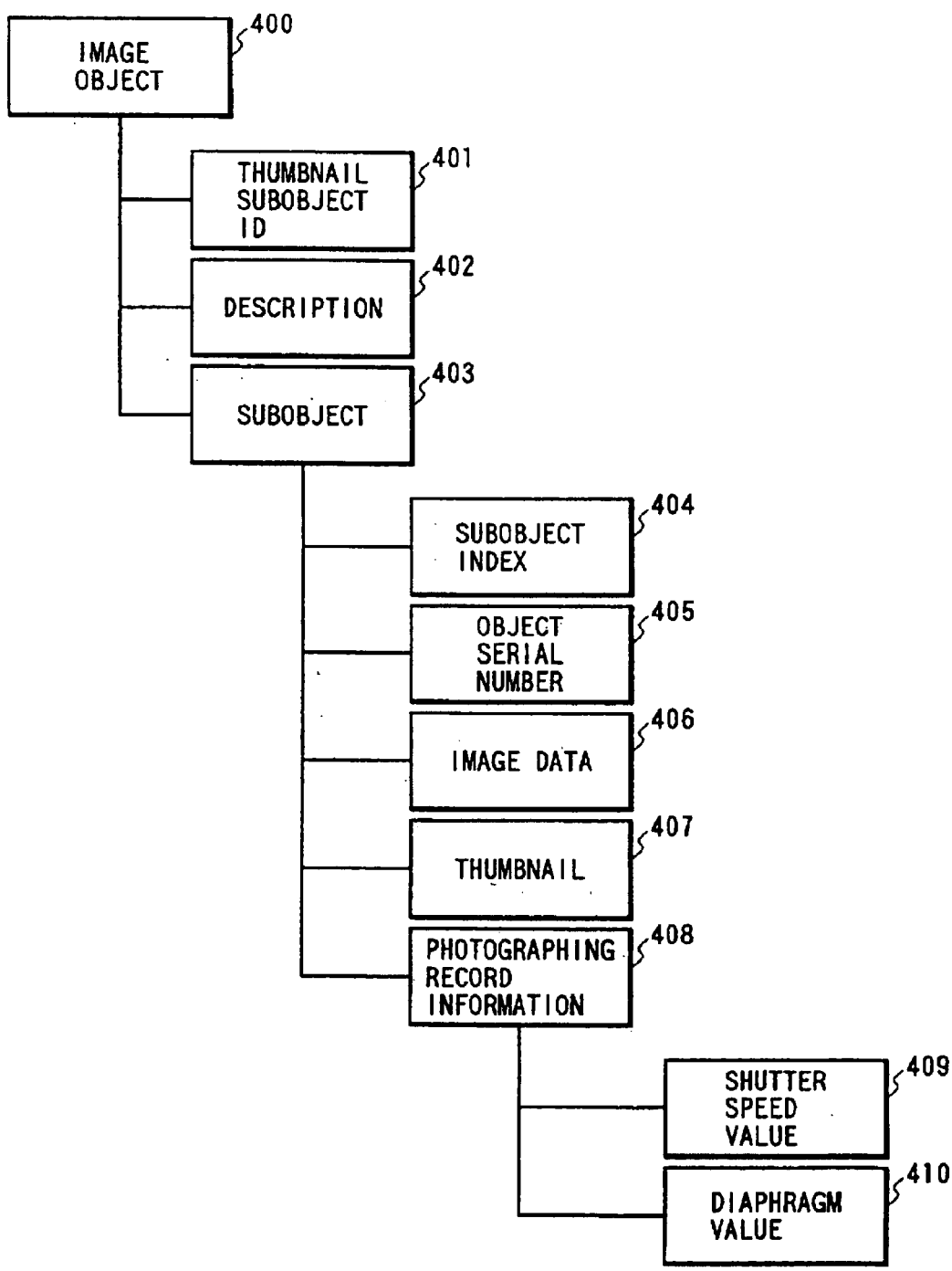
FIG. 13 is a schematic diagram showing a hierarchical structure of each property with which an image object is stored in a map file with a hierarchical heap structure.

FIG. 13 is a schematic diagram showing a hierarchical structure of properties in the case that an image object is stored in a map file that has a hierarchical heap structure. In FIG. 13, reference numeral 400 is an image object. Reference numeral 401 is a thumbnail object ID. Reference numeral 402 is a description. Reference numeral 403 is a sub-object. Reference numeral 404 is a sub-object index. Reference numeral 405 is an object serial number. Reference numeral 406 is image data. Reference numeral 407 is a thumbnail. Reference numeral 408 is photographing record information. Reference numeral 409 is a shutter speed value. Reference numeral 410 is a diaphragm value. Among these properties, the description 402 may store a keyword for a searching operation. When the description 402 is stored in a shallow hierarchical level, it can be quickly acquired. On the other hand, although the shutter speed value 409 is displayed, not searched, it is stored in a deep hierarchical level. When the shutter speed value 409 is not required, it is skipped. To reduce the cost of the body of the digital camera, the storage capacity of the main memory 114 used in the CPU 107 should be minimized. When data is read from the map file, only required data should be read to the main memory 114 and other data should be skipped. At this point, since data is categorized as data records in the hierarchical heap, it is not necessary to check all data to be read. Thus, data to be read can be quickly determined. For example, when photographing record information is not used in searching data, it can be skipped. Thus, it is not necessary to determine of what data the photographing record information is composed.

Property information that should be quickly read is placed in a shallow hierarchical level. Property information that is not required to do so is placed in a deep hierarchical level. Thus, the searching process with the property information in the map file can be quickly performed. In addition, property information that should be quickly read is placed as a group in a shallow hierarchical level. Property information that is required to do so is placed as a group in a deep hierarchical level. Thus, it is not necessary to check whether or not each property information should be read. Thus, the searching operation with property information in the map file can be quickly performed. In addition, property information that has high read frequency is placed as a group in a shallow hierarchical level. Property information that has low read frequency is placed as a group in a deep hierarchical level. Thus, it is not necessary to determine whether or not each property information should be read. Consequently, a process for displaying data in the map file can be quickly performed.

Figure 14B:
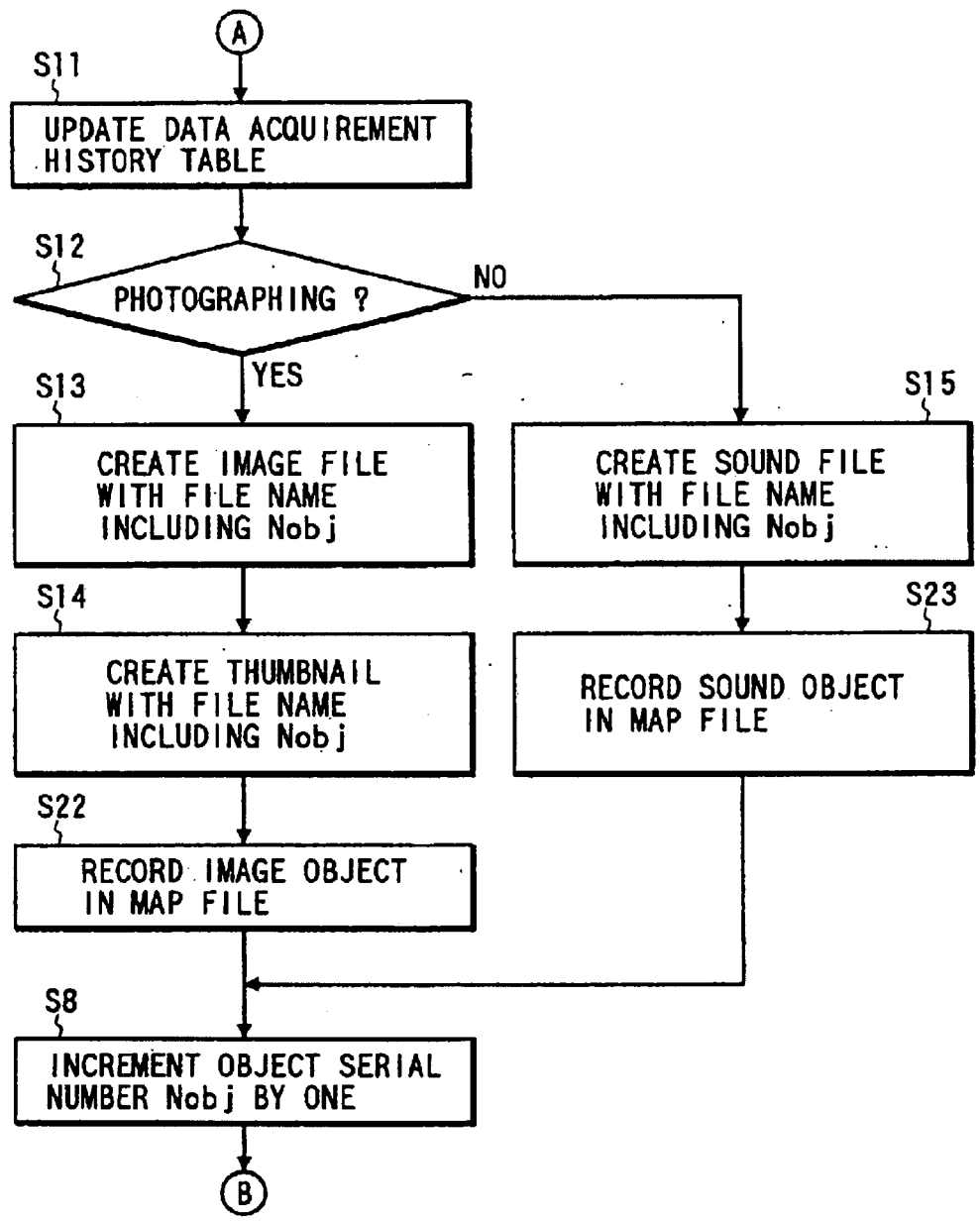
FIG. 14 is comprised of FIGS. 14A and 14B showing flow charts illustrating a file managing process in a Rec mode.

FIGS. 14A and 14B are flow charts showing a file managing sequence in the case that an image is photographed (namely, the mode setup switch 129 is placed in the Rec mode). In FIGS. 14A and 14B, at step S1, the power is turned on. At step S2, a current directory for storing various data that is acquired in the process is determined. At step S3, the system waits for an event (namely, until the user operates the system). At step S4, it is determined whether or not an event took place. When the determined result at step S4 is Yes, the flow advances to step S5. At step S5, the event is analyzed. At step S6, it is determined whether the event is a photographing operation or a sound recording operation. When the event is neither a photographing operation nor a sound recording operation, the flow advances to step S7. At step S7, it is determined whether or not the power off operation was performed. When the determined result at step S7 is Yes, the power is turned off. When the determined result at step S7 is No, the flow advances to step S24. At step S24, an other operation is performed. Thereafter, the flow returns to step S3. When the event is either a photographing operation or a sound recording operation at step S6, the flow advances to step S9. At step S9, it is determined whether or not an object serial number Nobj exceeds a predetermined maximum value Nobjmax. When the determined result at step S9, the flow advances to step S10. At step S10, a new directory is created. The created directory is assigned to the current directory. A new map file is created in the current directory. In addition, Nobj is initialized to 0.

When the object serial number Nobj of the map file CTLG0000.CTG of the directory CTLG0000 (232) shown in FIG. 1 exceeds 999, the directory CTLG0001 (232) is created. The directory is assigned to the current directory. A new map file CTLG0001.CTG (239) is created and the object serial number Nobj is reset to 0. Thereafter, at step S11, the acquired data history table 203 is updated. At step S12, when the photographing operation is performed, the flow advances to step S13. At step S13, an image file is created with a file name Nobj. Thereafter, the flow advances to step S14. At step S14, a thumbnail file is created with a file name Nobj. Thereafter, the flow advances to step S22. At step S22, an image object is recorded in the map file. Thereafter, the flow advances to step S8. At step S8, an object serial number Nobj is incremented by 1. Thereafter, the flow returns to step S3. When the event is not a photographing operation at step S12, since the sound recording operation is performed, the flow advances to step S15. At step S15, a sound file with a file name Nobj is created. Thereafter, the flow advances to step S23. At step S23, a sound object is recorded in the map file. Thereafter the flow advances to step S8. At step S8, the object serial number Nobj is incremented by 1. Thereafter, the flow returns to step S3.

Figure 15:
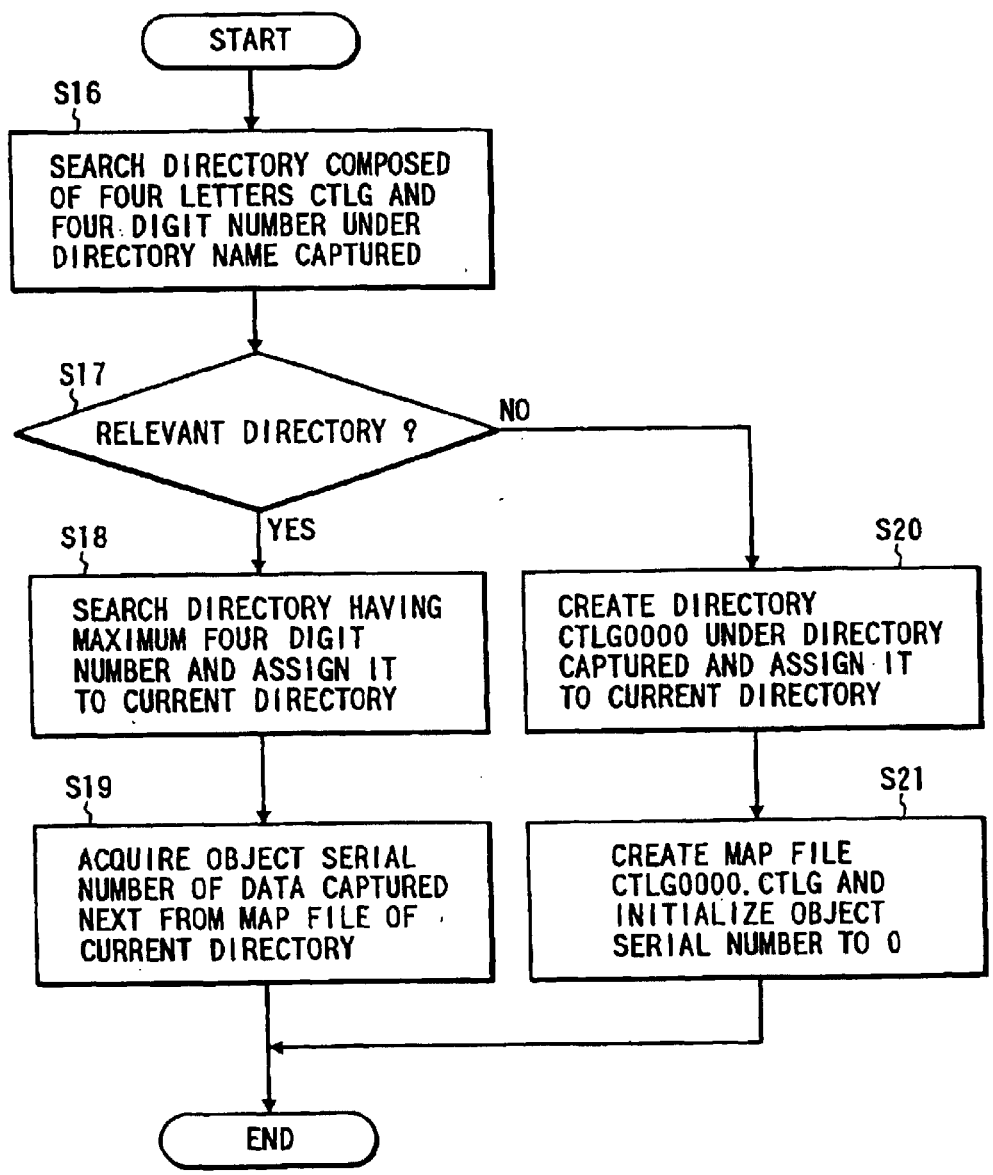
FIG. 15 is a detailed flow chart showing a current directory determining process at step S2 shown in FIG. 14A.

FIG. 15 is a flow chart showing a detailed process for determining a current directory at step S2 shown in FIG. 14A. At step S16, a directory with a directory name composed of four letters CTLG and four digit number is created under a directory CAPTURED. At step S17, it is determined whether or not a relevant directory is present. When the determined result at step S17 is Yes, the flow advances to step S18. At step S18, a directory with a maximum value of the four digits is searched and the acquired directory is assigned to a current directory. At step S19, an object serial number of data to be captured next is acquired from the map file of the current directory. When the determined result at step S17 is No, the flow advances to step S20. At step S20, a directory CTLG0000 is created under the directory CAPTURED and assigned to the current directory. At step S21, a map file CTLG0000.CTLG is created and the object serial number is initialized to 0. The object serial number is displayed as the serial number indication 122.

When the object serial number Nobj exceeds the maximum digit of the serial number indication 122, since a storage block of new data is automatically created, when a recording medium with a large storage capacity is used, data with serial numbers that exceed the number of digits of the serial number indication 122 can be captured.

In the case that captured data is erased, the mode setup switch 129 is placed in the Erasing mode. With the down button 123 and the up button 124, the object serial number is increased and decreased, respectively until a desired object serial number of captured data is displayed in the serial number indication 122. The object index of the captured data with the object serial number is acquired from the acquired data history table 203. The type of the captured data with the object serial number is acquired from the map file. When the type of the captured data is image data, P is displayed in the captured data type indication 130. When the type of the captured data is sound data, S is displayed in the captured data type indication 130. The captured data type indication 130 represents not only information of the captured order of the data, but the type of which captured data is image data or sound data. Thus, the user can determine whether or not the data should be erased corresponding to the captured order of data and the data type. Consequently, the data can be prevented from being mistakenly erased. When the erase button 125 is pressed, the file name of the data is acquired from the map file and the file is erased.

Figure 16:
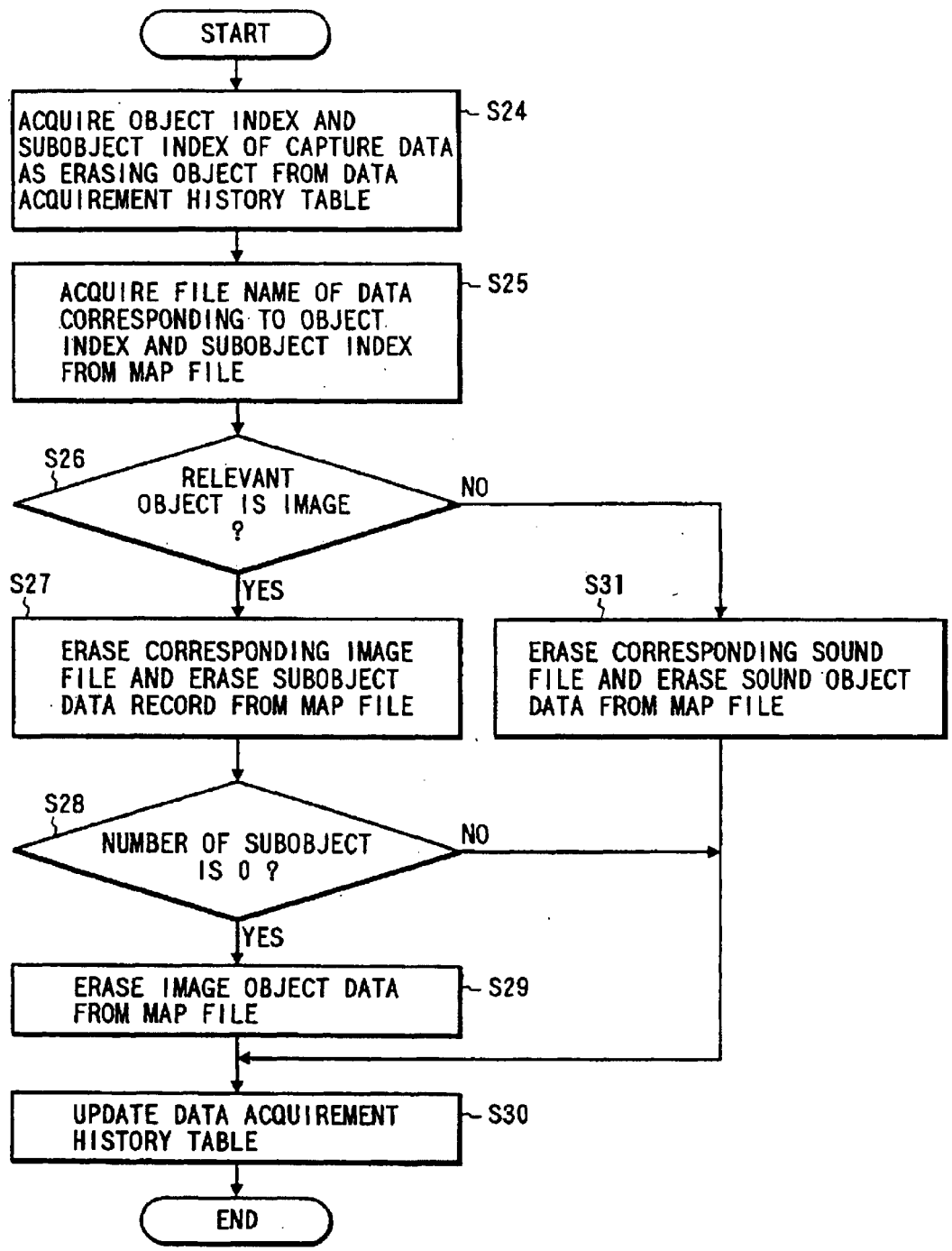
FIG. 16 is a flow chart showing a data erasing process after an object serial number of captured data to be erased is obtained.

FIG. 16 is a flow chart showing a data erasing process performed after an object serial number of captured data to be erased is acquired. At step S24, an object index and a sub-object index of captured data to be erased are acquired from the acquired data history table. At step S25, a file name of data corresponding to the object index and the sub-object index is acquired from the map file. At step S26, it is determined whether or not the object is image data. When the determined result at step S26 is Yes, the flow advances to step S27. At step S27, the relevant image file is erased and the data record of the sub-object is erased from the map file. At step S28, it is determined whether or not the number of objects is 0. When the determined result at step S28 is Yes, the flow advances to step S29.

At step S29, the image object data record is erased from the map file. At step S30, the acquired data history table is updated and the process is completed. When the determined result at step S26 is No (namely, the relevant object is sound data), the flow advances to step S31. At step S31, the relevant sound file is erased and the sound object data record is erased from the map file. Thereafter, the flow advances to step S30. At step S30, the information of the erased data is erased from the acquired data history table so as to update the acquired data history table. Thus, the process is completed.

Even if many data items are stored in the map file, when an object serial number is assigned with a simple display unit, captured data can be quickly searched from the acquired data history table 203. Although the use of the acquired data history table 203 was exemplified for erasing the captured data, captured data can be searched for reproducing data. In addition, captured data is assigned object serial numbers in the captured order of data regardless of whether the captured data is image data or sound data. Moreover, file names of image data and sound data also include object serial numbers. Thus, the user can know the captured order of data with file names.

According to the first embodiment, since a means for hierarchically managing captured data and property information thereof with a map file formed in a hierarchical heap structure is disposed, data that should be quickly searched is placed in a shallow hierarchical level. Data that is not required to do so is placed in a deep hierarchical structure. In addition, data is managed with categories of heaps. Thus, when undesired data is skipped, the number of times of the checking operation can be reduced. Consequently, property data as variable length data can be effectively managed. Thus, the speed of the searching operation can be increased. As a result, since data can be skipped, the main memory with a small storage capacity can be effectively used.

Property information that should be quickly read is placed in a shallow hierarchical level. Property information that is not required to do so is placed in a deep hierarchical level. Thus, the searching process with the property information in the map file can be quickly performed. In addition, property information that should be quickly read is placed as a group in a shallow hierarchical level. Property information that is required to do so is placed as a group in a deep hierarchical level. Thus, it is not necessary to check whether or not each property information should be read. Thus, the searching operation with property information in the map file can be quickly performed. In addition, property information that has high read frequency is placed as a group in a shallow hierarchical level. Property information that has low read frequency is placed as a group in a deep hierarchical level. Thus, it is not necessary to determine whether or not each property information should be read. Consequently, a process for displaying data in the map file can be quickly performed.

In addition, since is a means for hierarchically structuring image blocks in a map file that has a hierarchical heap structure is disposed, a plurality of images photographed sequentially and photographed in a panorama mode can be managed as photographing blocks. Thus, the number of thumbnails for a list can be reduced. Moreover, since a plurality of images are treated as photographing blocks, they can be easily searched. Moreover, since associated information such as description is added to a plurality of images, the storage capacity of data can be reduced.

In addition, since a small data record is directly stored in the offset table, the data storage space can be reduced and the access speed of data records is increased. Since data having an index of a data record of a heap in the first hierarchical level is stored as a data record of a heap in a deep hiearchical level of the map file, when data is hierarchically stored in one file, it is not necessary to successively allocate data corresponding to the hierarchical structure. Thus, when the hierarchical structure is changed, the amount of movement of data in the file can be minimized. On the other hand, since data records are stored in an external file, not in a heap, data with a large size can be stored in the external file. Thus, the storage capacity of the map file can be reduced.

In addition, since a means for assigning serial numbers to captured data in the captured order regardless of whether the captured data is image data or sound data and for designating data to be reproduced or erased corresponding to the serial number is disposed, a simple display unit can be used.

Moreover, since the map file has an acquired data history table that stores information of the relation between serial numbers assigned to captured data and indexes of the captured data, even if the map file has various data, captured data in the map file can be quickly searched corresponding to serial numbers assigned thereto.

Furthermore, since a means for limiting the maximum number of captured data that can be managed by one map file, automatically generating a storage unit of captured data in the case that the captured data exceeds the maximum number, and resetting the serial number assigned to the captured data is disposed, even if the number of digits displayed on the display unit is limited, many data items can be captured and managed.

In the foregoing description, two types of image data and sound data were explained. However, other types of data may be used.

Thus, according to the first embodiment, since processed data is assigned serial numbers regardless of whether the data is image data and sound data, even if data assigned serial numbers is recorded on a recording medium, data to be reproduced or erased can be easily searched.

In addition, since serial numbers that are data record numbers for directories as blocks of data recorded on a recording medium are reset, when serial numbers are displayed, a display unit that has a small number of display digits can be used.

Moreover, since a data name or a file name is added to processed data, desired data can be easily searched with the data name or file name.

Furthermore, since property information is formed in a hierarchical heap structured, when data is searched, undesired data can be skipped. Thus, the searching operation can be effectively and quickly performed.

Second Embodiment

Next, an image recording system (digital still camera) according to a second embodiment of the present invention will be described with reference to the accompanying drawings.

Figure 17:
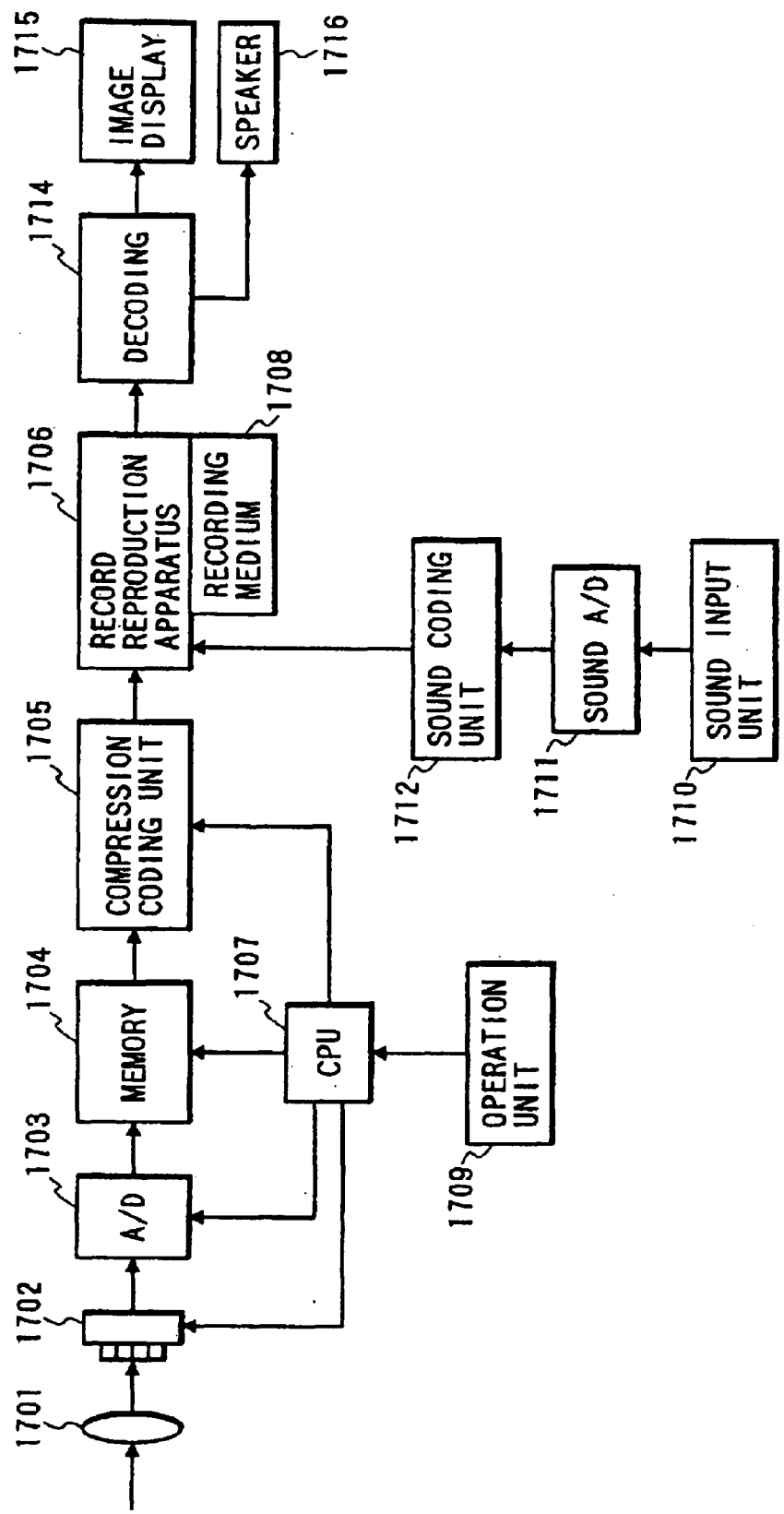
FIG. 17 is a block diagram showing a hardware system of a digital electronic still camera according to a second embodiment of the present invention.

FIG. 17 is a block diagram showing a structure of a digital still camera according to the second embodiment.

In FIG. 17, an optical image of an object obtained through a lens 1701 is converted into an image electric signal by an image pickup device 1702 such as a CCD disposed behind the lens 1701. The image pickup device 1702 stores electric charges corresponding to the optical image of the object with a control signal supplied from a CPU 1707 and reads the image signal.

The image signal being read as an analog signal is converted by an A/D converter 1703 into a digital signal. Means for adjusting the image signal (for example, means for performing a gamma compensating process, a color signal forming/separating process, and a white balancing process) (not shown) are disposed between the image pickup device 1702 and the A/D converter 1703. The image signal that has been converted by the A/D converter 1703 is temporarily stored in an image memory 1704. Next, a compression encoding unit 1705 compresses and codes the image data read from the image memory 1704. The image data that has been compressed and coded is written to a recording medium 1708 through a recording/reproducing unit 1706 that composes the recording/reproducing system.

As an example of the compressing method of the image data, JPEG method that has been defined as an international standard can be used.

The recording/reproducing unit 1706 has a memory card interface defined in JEIDA or the like as an interface for the recording medium 1708. In other words, the recording/reproducing unit 1706 has a logic circuit and an interface connector for reading and writing data received from the compression coding unit 1705 to the recording medium 1708 corresponding to the interface protocol.

As the recording medium 1708, a memory card or a hard disk that corresponds to the recording medium 1708 can be used. As a file format of the recording medium 1708, data is recorded corresponding to for example memory card DOS file system of JEIDA.

When the CPU 1707 detects a sound record command issued by the user through an operation unit 1709, an A/D converter 1711 converts a sound signal that is input from a sound input unit 1710 into digital data and supplies the digital data to a sound coding unit 1712. The sound coding unit 1712 compresses and codes the digital data and supplies the resultant data to the recording/reproducing unit 1706. The recording/reproducing unit 1706 performs processes necessary for the input sound data and records the resultant data on the recording medium 1708. The recording system of the recording/reproducing unit 1706 has a function for counting the total number of captured data items recorded by the recording system along with a function for processing a photographed date, a photographing mode, a photographing condition, a record location of a thumbnail image file on the medium, an annotation, and so forth. In FIG. 17, signal lines connected from the CPU 1707 to the recording/reproducing unit 1706, the sound coding unit 1712, and so forth are omitted.

When the CPU 1707 detects the cancellation of the sound record command issued by the user through the operation unit 1709 or the CPU 1707 counts a predetermined time period, it assumes that the sound recording operation has been canceled and terminates the sound recording operation. For example, while sound data is being recorded, the user can cause the system to record sound data as an annotation of image data through the operation unit 1709. In this embodiment, when a sound signal is recorded, it is treated as an annotation of image data that has been record last.

When information recorded on the recording medium 1708 is reproduced, the reproducing system of the recording/reproducing unit 1706 and a decoding circuit 1714 reproduce an image signal and a sound signal and supply these signals to an image displaying unit 1715 and a speaker 1716, respectively.

When input image data or sound data is recorded as an image file or a sound file on the recording medium 1708, the recording/reproducing unit 1706 generates property information of the image data or sound data and records it to a management map file. A captured data block managed by the map file is assigned as a recording block.

An image file name or sound file name, a thumbnail image file name, a data recording condition, data record time, and the number of captured data items included in the record block as a serial number of each record block are recorded as property values of captured data in the map file. In addition, the total number of captured data items obtained by the recording/reproducing unit 1706 is recorded as an ID number in association with data to be recorded.

Figure 18A:
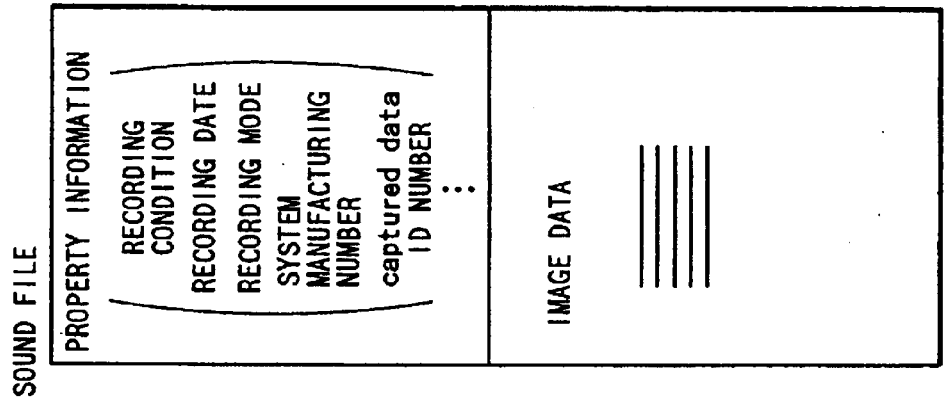
FIGS. 18A and 18B are schematic diagrams showing examples of structures of an image file and a sound file.
Figure 18B:
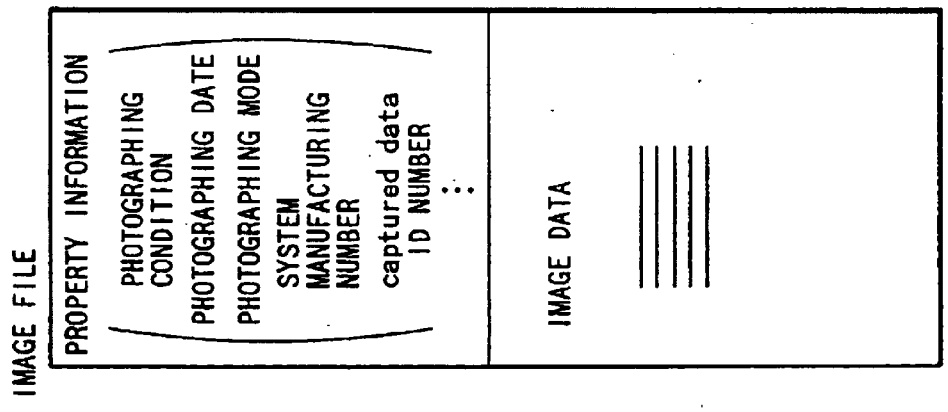

Captured data items acquired by the recording/reproducing unit 1706 are recorded as files. The total number of captured data items acquired by the recording/reproducing unit 1706 is recorded as an ID number of the captured data file. FIGS. 18A and 18B show examples of structures of captured data files.

Figure 19A:
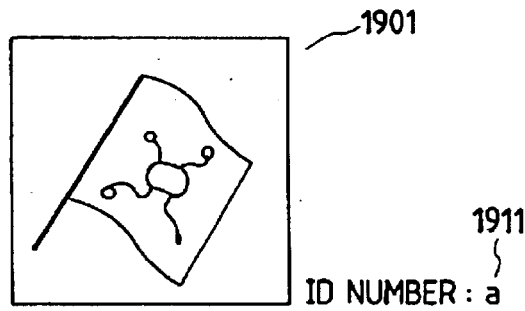
FIGS. 19A, 19B, and 19C are schematic diagrams for identifying image files with ID numbers.
Figure 19B:
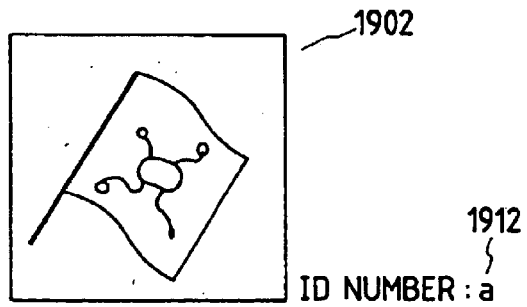
Figure 19C:
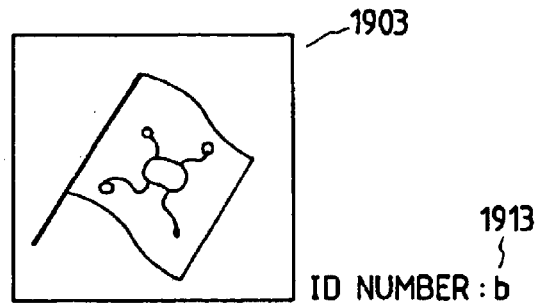

When ID numbers are recorded in individual captured data files, a desired captured data file can be identified without a map file. In other words, as shown in FIGS. 19A, 19B, and 19C, when an original image 1901, an image 1902 of which the image 1901 has been copied, and another image 1903 are displayed, even if their appearance is resemble, they can be identified with ID numbers 1911, 1912, and 1913 recorded in their files.

Next, the operation for searching a captured data file with an ID number recorded therein will be described.

One map file and captured data files managed therewith are present in the same directory. One directory has at least one record block. In this case, a desired captured data file is searched with a serial number assigned thereto. When captured data recorded on the recording medium is moved to a recording medium of a personal computer or the like, one directory may have a plurality of record blocks.

Figure 20:
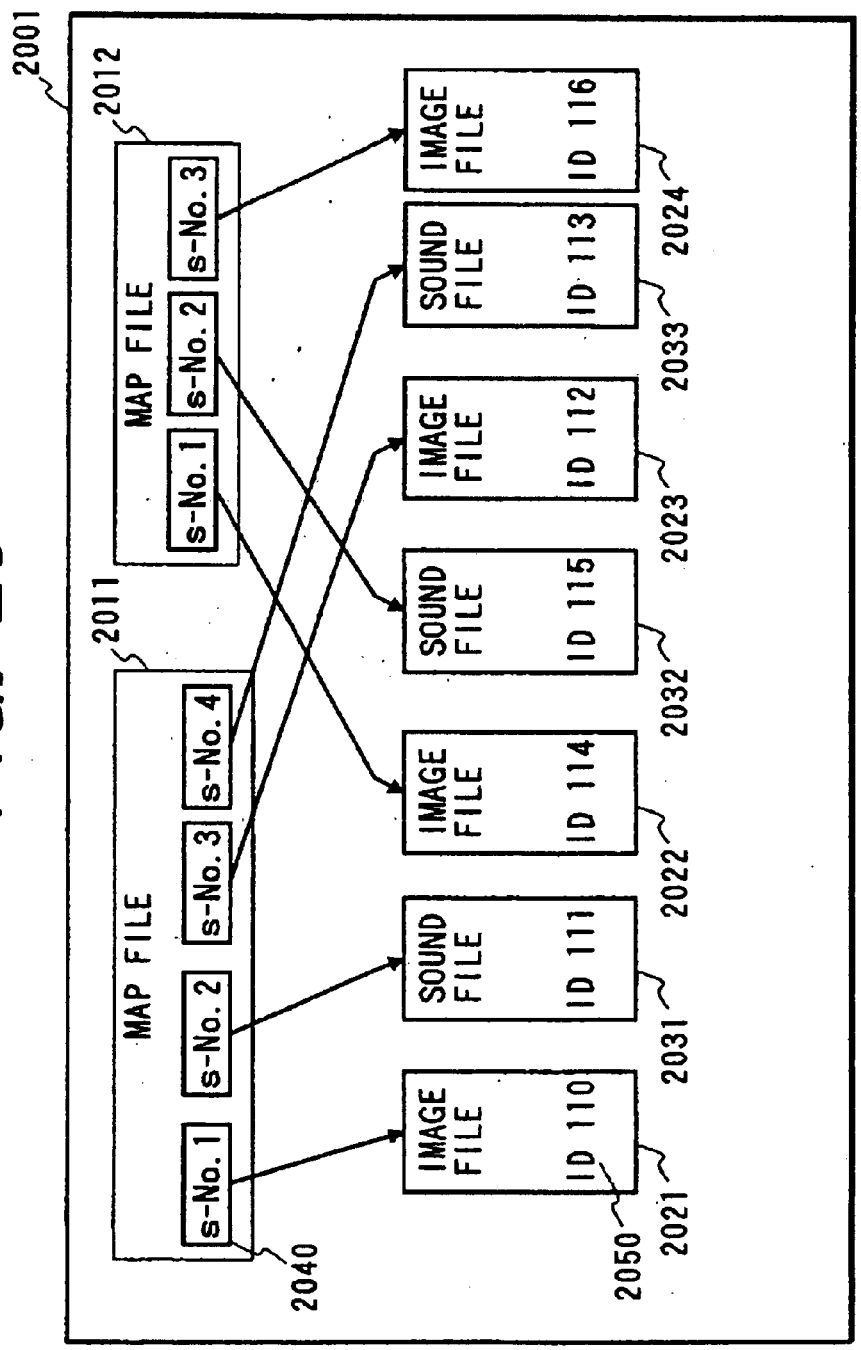
FIG. 20 is a schematic diagram showing an example of identifying a captured data file in the case that a plurality of record units are present in the same directory.

In an example shown in FIG. 20, one directory 2001 has a first record block composed of a map file 2011 and captured data files 2021, 2031, 2023, and 2033 and a second record block composed of a map file 2012 and captured data files 2022, 2032, and 2024.

In this case, a serial number 2040 of a record block of each of the data files 2011 and 2012 is redundant (namely, s-Nos. 1 to 3 are redundant). Thus, a data file cannot be uniquely identified.

To solve this problem, when a captured data file is searched, an ID number that is the total number of captured data items of the system is used. Since this number is unique in the system, even if the captured data files 2011 and 2012 included in the plurality of record blocks are present in the same directory 2001, they can be identified and a required captured data file can be searched.

Figure 21:
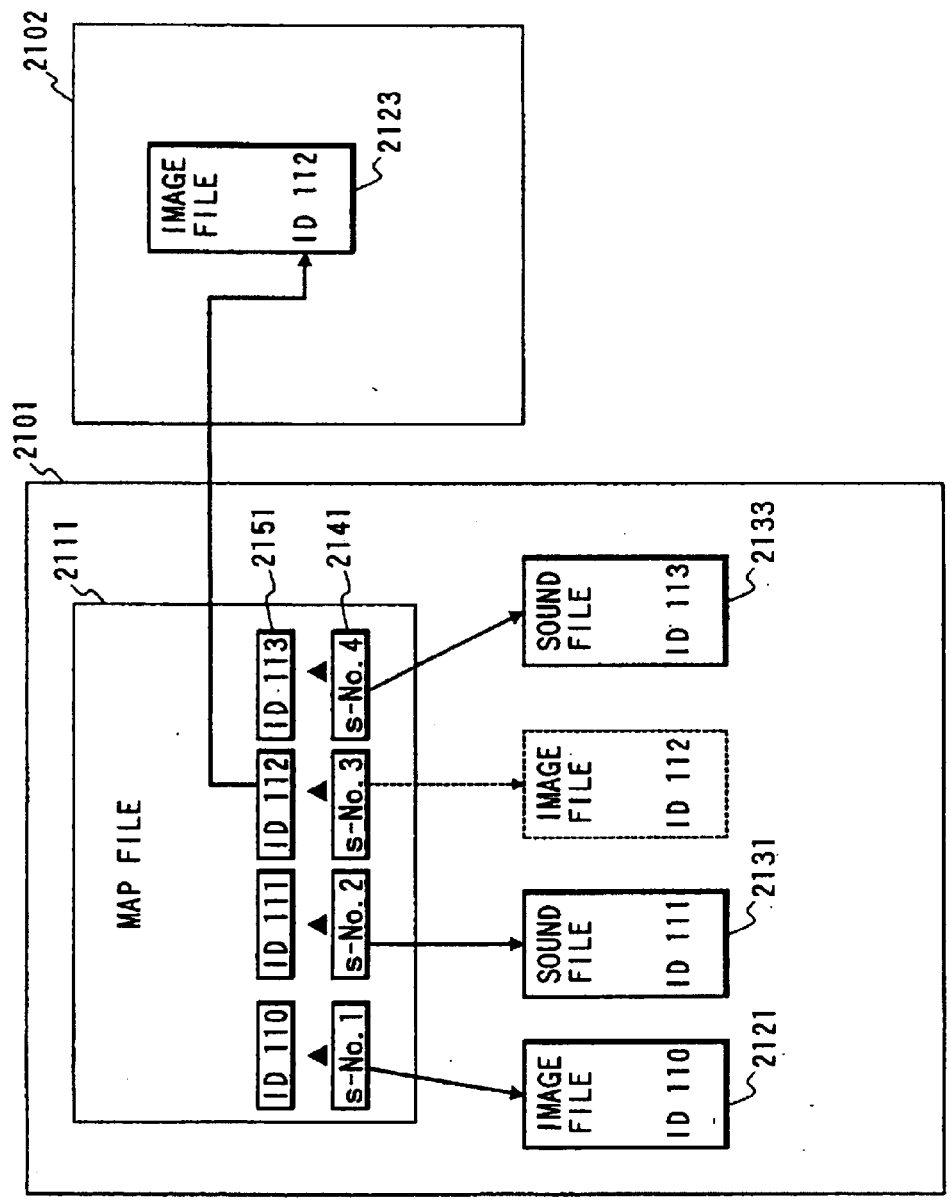
FIG. 21 is a schematic diagram showing a structure of a searching method in the case that a directory of a captured data file is moved.

Next, a searching method in the case that a directory of a particular captured data file is moved to another directory that does not have a map file will be described with reference to FIG. 21.

Assume that although a map file 2111 that manages captured data is present in a directory 2101, part of captured data is present in another directory 2102. Normally, a captured data file is searched with a captured data serial number 2141 recorded in the map file. However in a directory (for example, a directory 2102) that does not have the map file 2101, captured data cannot be searched with the serial number 2141.

To solve this problem, in this embodiment, an ID number 2151 that is the total number of captured data items recorded in the map file 2111 is used. This number is associated with the serial number 2141. First, corresponding to the serial number 2141, desired captured data is searched in the directory 2101. When a file corresponding to the serial number s-No. 3 is not found, an ID number corresponding to the serial number s-No. 3 is searched. A captured data file 2123 having the same ID number is searched in the other directory 2102. Thus, a captured data file stored in another directory that does not have a map file can be searched.

Figure 22:
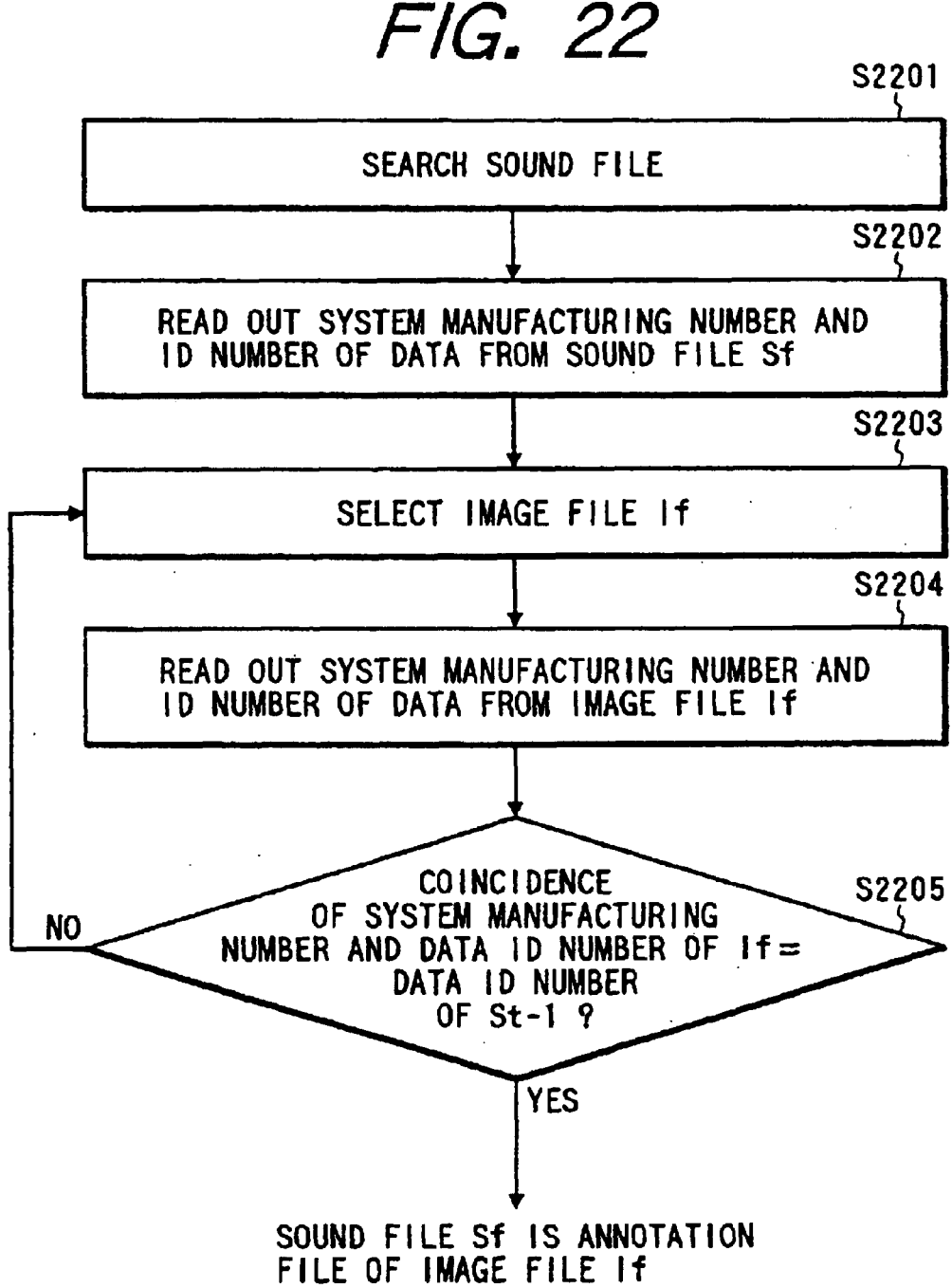
FIG. 22 is a flow chart showing a method for restoring the relation of annotation of image data and sound data without the use of a captured data management map file.

Since the total number of captured data items of the system is recorded in each captured data file, even if the map file is destroyed due to any cause, the associated information of a file managed by the map file can be restored. Next, an example of the restoring method will be described with reference to flow charts shown in FIGS. 22 and 23. In this case, assume that when a sound signal is recorded as captured data, it is treated as an annotation of image data that has been recorded last.

First, it is determined with what image signal the sound signal has the relation of an annotation. To do that, at step S2201, a sound file Sf is searched in the recording medium. At step S2202, the manufacturing number of the system that has recorded the sound file Sf and the ID number of the sound data are read from the sound file Sf. At step S2203, an image file If is selected from image file groups in the recording medium as a target to be determined whether it has the relation of an annotation. At step S2204, the manufacturing number of the system that has recorded the image file If and the ID number of the image data are read from the image file If.

At step S2205, it is determined whether these systems accord and the data ID number of the image file If is equivalent to the data ID number of the sound file Sf minus 1. When the determined result at step S2205 is Yes, it is considered that the sound file If is an annotation file of the image file Sf. Otherwise, the flow returns to step S2203. At step S2203, another image file is selected. Thus, in this process, the relation of a annotation between captured data files (sound and image files) can be restored.

Figure 23:
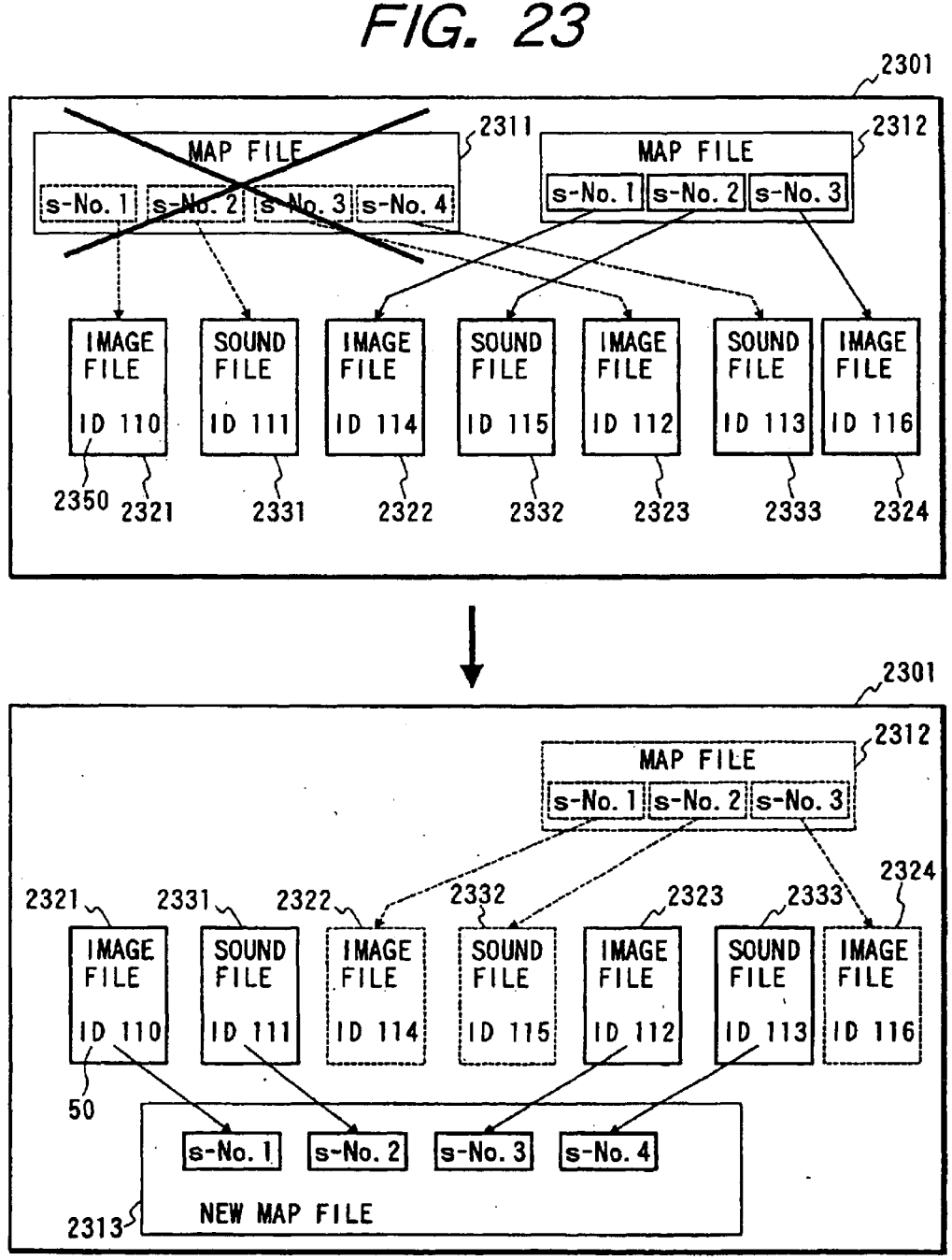
FIG. 23 is a schematic diagram for explaining an example for restoring a captured data management file with an ID number recorded in a captured data file.

Next, a method for restoring a map file with an ID number recorded in a captured data file will be described with reference to FIG. 23. Assume that data cannot be read from a map file 2311 in a directory 2301. First, captured data files 2322, 2332, and 2324 that are managed by another map file 2312 are excluded. Next, ID numbers recorded in the remaining captured data files 2321, 2331, 2323, and 2333 are read and sorted in the order. The ID numbers are assigned serial numbers in the order. The serial numbers are recorded in a file in association with the captured data. Thus, a map file can be restored.

In addition, when information for identifying the system that has recorded captured data (for example, the manufacturing number of the system) is recorded in the map file, captured data file that has been recorded by a plurality of systems can be searched.

As described above, according to this embodiment, since the total number of captured data items recorded by a recording system is assigned to captured data, each captured data item can be easily identified and searched.

According to the embodiment, since the total number of captured data items is recorded in a captured data file, it can be easily identified.

According to the embodiment, the total number of each captured data file recorded by the system can be determined with reference to the map file. Thus, a desired captured data file can be quickly displayed.

According to the embodiment, since the total number of captured data items recorded by the recording system is recorded in each captured data file and it is recorded in a map file in association with the captured data, the total number of desired captured data recorded by the recording system can be determined. In addition, the total number of desired captured data can be determined with reference to the map file. Thus, desired captured data can be quickly searched.

According to the embodiment, since information for identifying a recording system that has recorded captured data is recorded, the recording system can be identified. The total number of captured data recorded by the system can be determined.

According to the embodiment, even if there are captured data files recorded by a plurality of recording systems, the total number of captured data files recorded by the recording systems can be determined without a map file.

According to the embodiment, when there are captured data files recorded by a plurality of recording systems, the total number of captured data files recorded by the recording systems can be determined with reference to the map file and can be quickly displayed.

According to the embodiment, even if there are captured data files recorded by a plurality of recording systems, the total number of captured data files recorded by the recording systems can be determined without a map file. In addition, the total number of captured data files recorded by the recording systems can be determined with reference to the map file and can be quickly displayed.

According to the embodiment, even if there are a plurality of record blocks of captured data files in the same directory or one record block is present over a plurality of directories, a desired captured data file can be searched.

According to the embodiment, in the case that there are captured data files recorded by a plurality of recording systems, even if a plurality of record blocks of captured data are present in the same directory or one record block is present over a plurality of directories, desired captured data can be searched.

According to the embodiment, even if a map file cannot be read due to any cause, the map file can be restored.

Third Embodiment

Next, a third embodiment of the present invention will be described with reference to the accompanying drawings.

Figure 24:
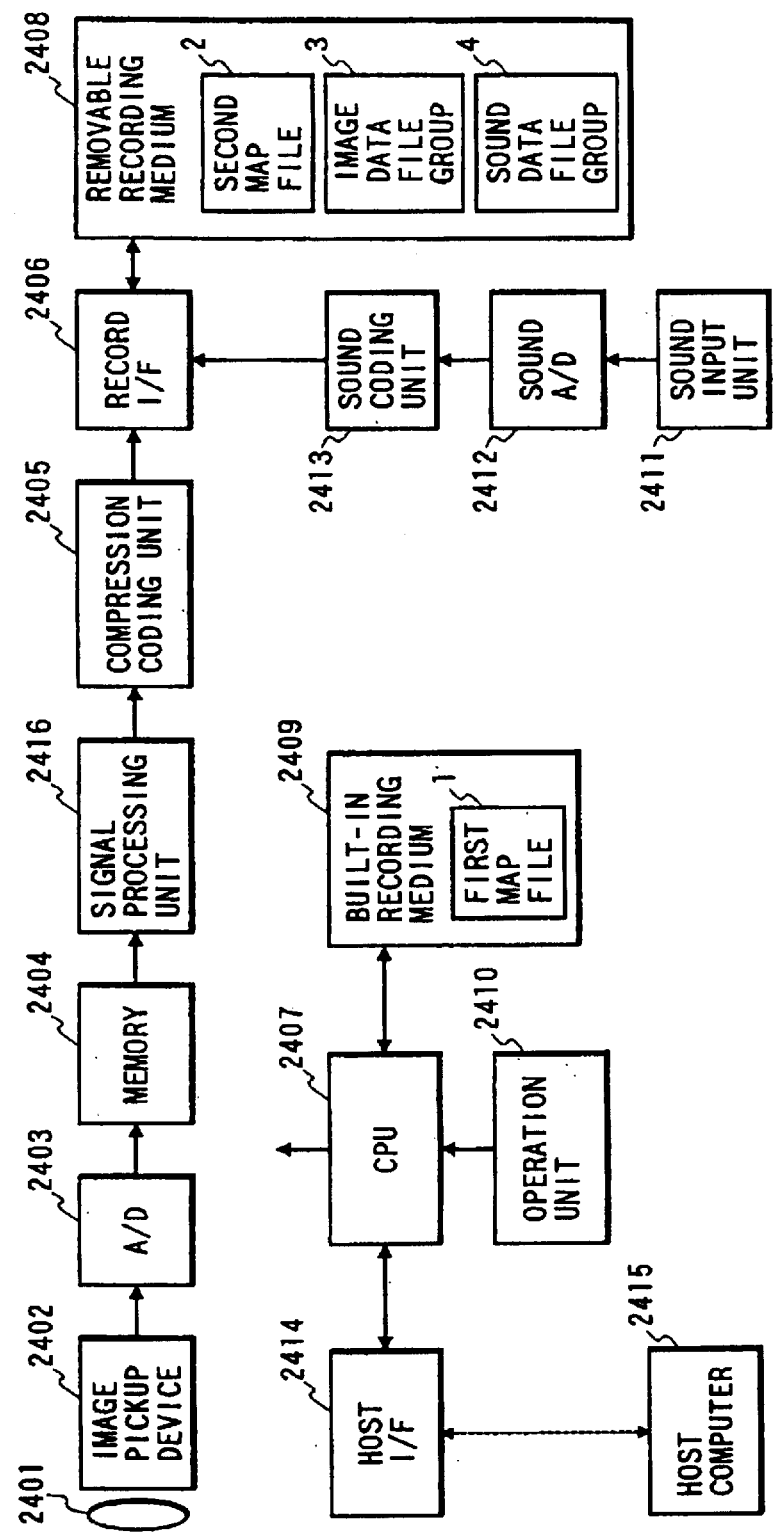
FIG. 24 is a block diagram showing a structure of a digital camera according to a third embodiment of the present invention.

FIG. 24 is a block diagram showing an outlined structure of a digital electronic still camera according to the third embodiment of the present invention. It should be noted that although structural units that do not directly relate to the embodiment (such as a diaphragm and a shutter) are not shown, they are actually disposed in the digital camera.

In FIG. 24, an optical image of an object obtained by a lens 2401 is converted into an image electric signal by an image pickup device 2402 such as a CCD disposed behind the lens 2401. The image pickup device 2402 stores electric charges corresponding to the optical image of the object with a control signal supplied from a CPU 2407. The image signal that is an analog signal is converted into a digital signal by an A/D converter 2403. Thereafter, the digital signal is temporarily stored in a memory 2404. A signal processing portion 2416 performs a gamma compensating process, a color signal forming/separating process, and a white balancing process for the digital signal stored in the memory 2404.

Thereafter, a compression coding unit 2405 compresses and codes the resultant image data. The compressed and coded image data is written to a removable recording medium 2408 through a recording unit 2406 that composes a recording/reproducing system. At this point, one image file is created for each image data item. The image files compose an image data file group 3. As an example of the image data compressing method, JPEG method (a compressing method defined in ISO/IECDIS 10918-1) as an international standard method can be used.

When the CPU 2407 detects a sound record command issued by the user through an operation unit 2410, a digital data converted by an A/D converter 2411 is supplied from a sound input portion 2410 to a sound coding unit 2412. The sound coding unit 2412 compresses and codes the digital data and supplies the resultant data to a recording interface 2406. When the CPU 2407 detects the cancellation of the sound record command issued by the user through the operation unit 2410 or when the CPU 2407 detects a predetermined elapsed time period, it assumes that the sound recording operation has been canceled and terminates the sound recording operation. Whenever sound data is recorded, it is recorded as one sound file on the removable recording medium 2408. The sound files compose a sound data file group 4. The user can issue a command for recording sound data as an annotation of image data through the operation unit 2410. When an EVF (Electric View Finder) is disposed as a user interface for the camera and image data being photographed is reproduced, an annotation of sound data can be added to any image file.

The recording interface 2406 has a memory card interface defined in PCMCIA or JEIDA as an interface for the removable recording medium 2408. In other words, a logic circuit and an interface connector that read and writes data received from the compression coding unit 2405 from/to the removable recording medium 2408 corresponding to an interface protocol are used. The removable recording medium 2408 may be a memory card, a hard disk, or the like corresponding thereto. A file is recorded on the removable recording medium 2408 corresponding to for example the DOS FAT file system format. On the other hand, a built-in recording medium 2409 has stored a first map file 1 that has setup data of the camera for photographing operation.

Along with an image data file group 3 and a sound data file group 4, a second map file 2 is recorded on the removable recording medium 2408. The second map file 2 stores a property data group such as setup information for the digital camera corresponding to image data of the image data file group 3 and sound data of the sound data file group 4. When the photographing operation is performed, the CPU 2407 reads setup information of the first map file 1 and copies it to the second map file 2 on the removable recording medium 2408 so that the setup information is associated with the image data.

The property data group such as setup information of the digital camera has information intrinsic to the digital camera. If the removable recording medium 2408 is used as a recording medium that stores the property data group, when the removable recording medium 2408 is mounted on a digital camera of different type, the setup information of the digital camera on the removable recording medium 2408 may not accord with the setup information available in the digital camera of different type. For example, setup information of a built-in strobe is meaningless for a model that does not have a built-in strobe. Thus, the first map file 1 that includes the setup information intrinsic to the digital camera is recorded in the built-in recording medium 2409 that is non-removable. As an example of the built-in recording medium 2409, an nonvolatile memory such as a flash memory is used. As the file format, the DOS FAT system is used.

In FIG. 24, reference numeral 2415 is a host computer. The host computer 2415 is connected to the digital camera through a host interface 2414. The host computer 2415 can read/write a file from/to the built-in recording medium 2409 and the removable recording medium 2408, set up the digital camera, and read image data and sound data therefrom. Normally, (when the photographing operation is performed), the digital camera and the host computer 2415 are separated.

In FIG. 24, signal lines connected from the CPU 2407 to the recording unit 2406, the sound coding unit 2412, and so forth are omitted for simplicity. However, it should be noted that these units are controlled under the control of the CPU 2407.

Figure 25:
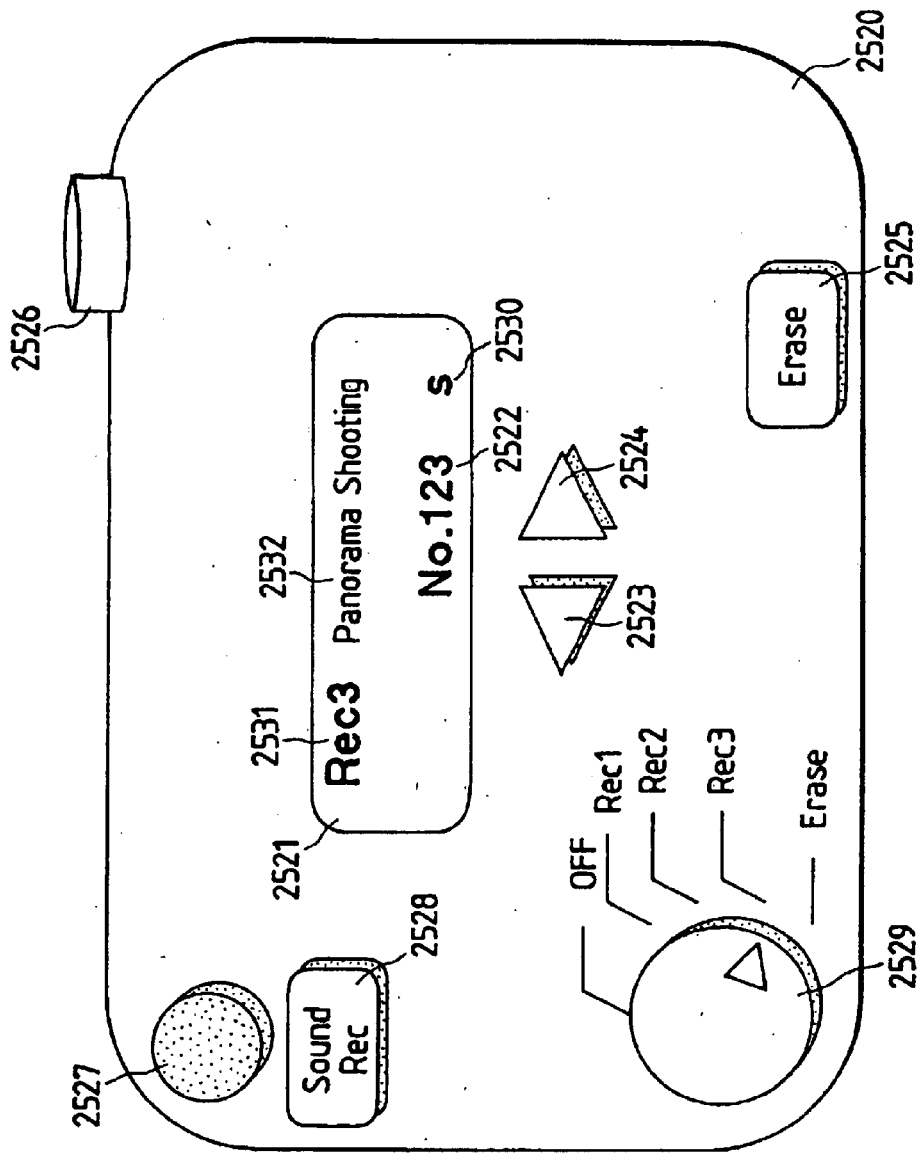
FIG. 25 is a rear view showing an operation unit of a digital camera.

FIG. 25 is a schematic diagram for explaining an example of the operation unit 2410 disposed on the rear surface of the digital camera. In FIG. 25, reference numeral 2520 is a rear surface of the digital camera. Reference numeral 2521 is an operation indication. Reference numeral 2522 is a serial number indication for identifying captured sound data or image data. The operation indication 2521 is simply structured so as to reduce the size, weight, and cost of the digital camera. The number of display digits of the serial number indication 2522 is mainly around three. In addition, when the user memorizes a number, if the number of digits thereof exceeds three, he or she feels difficulty. Thus, it is preferable to limit the number of display digits of a serial number to three.

Reference numeral 2530 is a captured data type indication. When data with a serial number displayed is image data, the captured data type indication 2530 displays P. When data with a serial number displayed is sound data, the captured data type indication 2530 displays S. Reference numeral 2529 is a mode setup switch that can select one of five modes that are OFF (power off), Rec1 (recording mode 1), Rec2 (recording mode 2), Rec3 (recording mode 3), and Erase (erasing mode). Reference numerals 2523 and 2524 are a down button and an up button that select a serial number of record data, respectively. Reference numeral 2525 is an erase button that is used to erase sound data or image data with a serial number displayed in the case that the mode setup switch 2529 is placed in the erasing mode. Reference numeral 2526 is a release switch that triggers the photographing operation. Reference numeral 2527 is a microphone. Reference numeral 2528 is a sound recording switch. Reference numeral 2531 is a recording mode indication. Reference numeral 2532 is an annotation indication for a selected recording mode.

In the third embodiment, along with property data of image data such as date, diaphragm value, and shutter speed that the recording unit records, the first map file has a property data group recorded in association with image data and sound data.

FIG. 26 is a schematic diagram showing a structure of the first map file 1. The map file has various property information as a block referred to as a descriptor. As shown in FIG. 26, the map file has for example five descriptors. The first descriptor is Recording mode table desc that has a recording mode table that represents the relation between each recording mode and configuration ID corresponding thereto. The second, third, and fourth descriptors are Configuration descs that have various configurations in various recording modes. The configurations have setups of for example image format, image size, self timer, exposure, focus, strobe, and sound sampling frequency/bits.

Configuration desc has a configuration ID for identifying a configuration. In FIG. 26, the configuration ID of the second descriptor is 4. The configuration ID of the third descriptor is 5. The configuration ID of the fourth descriptor is 6. Hardware Adjustment Values desc has for example various adjustment values of the hardware of the recording unit (for example, an adjustment value of an amplifier gain). Hardware Adjustment Values desc is information that the recording unit internally uses. Recording mode table desc and Hardware Adjustment Values desc are not associated with image data when the photographing operation is performed. Tag at the end of the map file is Map File End Tag that represents the end of the file.

FIG. 27 is a schematic diagram for explaining the format of a descriptor. In FIG. 27, a first descriptor desc1 is composed of a tag region, a length region, and a data region. The tag region identifies the type of information. The length region represents the length of the descriptor. In FIG. 27, a region ranging from a descriptor name (for example desc1:) to a symbol (;) is one descriptor. The descriptor name (desc1:) and delimiter (;) are not data stored in a real file, but symbols used to easily distinguish descriptors. In a real map file, descriptors are represented with only bit strings as in tag, length, and data. A descriptor is identified with tag. The length of a descriptor is identified with length. Thus, since the type and length of each descriptor is identified at the beginning thereof, the next descriptor can be easily identified.

In FIG. 27, descriptors desc3 and desc4 are nested in the data region of the descriptor desc2. In other words, a plurality of descriptors can be nested in a descriptor. The nested portion can be represented with brackets { }.

FIG. 28 is a schematic diagram showing a structure of a configuration descriptor. As shown in FIG. 28, the data region of the Configuration desc is preceded by the tag and length. A plurality of descriptors are nested in the data region. A first descriptor in Configuration desc is Configuration ID desc. Configuration ID desc has Configuration ID for identifying a configuration. A second descriptor is Shooting Parameter desc. Shooting Parameter desc has Shooting parameter that stores setups of image format, image size, self timer, exposure, focus, strobe, and so forth. A third descriptor is Sound Recording Parameter desc that has such as sound sampling frequency/bits.

A fourth descriptor is Image Auto Copy Property desc that has data that is automatically copied to Image File desc that has property information of image photographed (Image File desc will be described later). A fifth descriptor is Sound Auto Copy Property desc that has data that is automatically copied to Sound File desc that has property information of sound recorded (Sound File desc will be described later).

Three descriptors are nested in Image Auto Copy Property desc. A first descriptor in Image Auto Copy Property desc is Image Object Handler desc that has a file name of an execution module of an image process invoked when image data is read to the host computer. The image process is for example a freezing process for compressed image data. A second descriptor is Configuration Name desc that has the name of Configuration desc. A third descriptor is Description desc that has a description of a configuration.

Configuration Name desc is nested in Sound Auto Copy Property desc. Configuration Name desc has the name of the configuration of Configuration desc.

Recording mode table desc of the first map file 1 has Recording mode table that is a table representing the relation of Configuration ID corresponding to each recording mode. FIG. 29 shows an example of Recording mode table.

The property data group of Configuration desc of the first map file 1 can be edited by the user with a digital camera setup program on the host computer 2415 connected to the digital camera.

FIG. 29 shows an example of the recording mode table. Numbers 1, 2, and 3 in the recording mode field correspond to the recording modes Rec1, Rec2, and Rec3 that are set up with the mode setup switch 2529 shown in FIG. 25. In the digital camera according to the embodiment, since three recording modes can be set up, the first map file 1 has three configuration descriptors. A Configuration ID field corresponds to a configuration ID of each configuration descriptor.

When the configuration of the recording mode of Rec3 is changed with the digital camera setup program on the host computer 24, the configuration descriptor corresponding to Configuration ID=6 is erased from the first map file 1. For example, the configuration descriptor corresponding to Configuration ID=7 is added to the first map file 1. In addition, Configuration ID corresponding to Recording mode=3 of the recording mode table shown in FIG. 29 is rewritten to 7.

FIG. 30 is a schematic diagram showing a structure of a second map file 2 in the case that while the recording mode table is in the state shown in FIG. 27 three image items and one sound item are recorded in the Rec3 recording mode and then one image item and one sound item are recorded in the Rec1 recording mode. In the following description, a text surrounded by /* and */ is an annotation, not data.

The second map file 2 has Configuration desc with Configuration ID=6 corresponding to the Rec3 recording mode, three Image file descs that has property information of image files photographed, one Sound file desc that has property information of a sound file recorded, Configuration desc with Configuration ID=4 corresponding to the Rec1 recording mode, one Image file desc, one Sound file desc, and Map file end tag. When image data or sound data is recorded, if a configuration descriptor corresponding to the recording mode is not present in the second map file, the configuration descriptor is copied from the first map file.

FIG. 31 is a schematic diagram showing a structure of the first Image file desc shown in FIG. 27. As shown in FIG. 31, Image file desc has a tag, a length, and four nested descriptors. A first descriptor in Image file desc is File Location desc that has a path name and a file name of an image file. A second descriptor in Image file desc is Properties desc that has property information of image data generated by the digital camera (the property information is such as date, diaphragm value, and shutter speed). A third descriptor in Image file desc is Link desc that has link information to the configuration descriptor corresponding to the recording mode of image data recorded in the second map file. In the case shown in FIG. 31, since image data is photographed in the Rec3 recording mode, Link desc has the link information to the configuration descriptor corresponding to Configuration ID=6. A fourth descriptor in Image file desc is Image Auto Copy Property desc that is shown in FIG. 28. This descriptor is copied from the configuration descriptor that has been copied from the first map file 1 to the second map file 2 to Image file desc. Since Image Auto Copy Property desc is directly copied to Image file desc, an image file can be quickly searched with a configuration name and a description.

FIG. 32 is a schematic diagram showing a structure of the first Sound file desc shown in FIG. 30. As shown in FIG. 32, Sound file desc has a tag (that represents a sound file descriptor), a length, and four nested descriptors. A first descriptor in Sound file desc is File location desc that has a path name and a file name of a sound file. A second descriptor in Sound file desc is Properties desc that has property information of sound data generated by the digital camera (the proper information is such as date). A third descriptor in Sound file desc is Link desc that has link information to the configuration descriptor corresponding to the recording mode of sound data recorded in the second map file 2. In FIG. 31, Link desc has the link information to the configuration descriptor corresponding to Configuration ID=6 because sound data has been recorded in the Rec3 recording mode. A fourth descriptor in Sound file desc is Sound Auto Copy Property desc as shown in FIG. 28. Sound Auto Copy Property desc is copied from the configuration descriptor that has been copied from the first map file 1 to the second map file 2 to Sound file desc. Since Sound Auto Copy Property desc is directly copied to Sound file desc, a sound file can be quickly searched with for example a configuration name.

Figure 33:
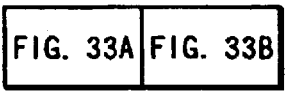
FIG. 33 is comprised of FIGS. 33A and 33B showing flow charts illustrating the operation of a recording mode according to the third embodiment of the present invention.
Figure 33A:
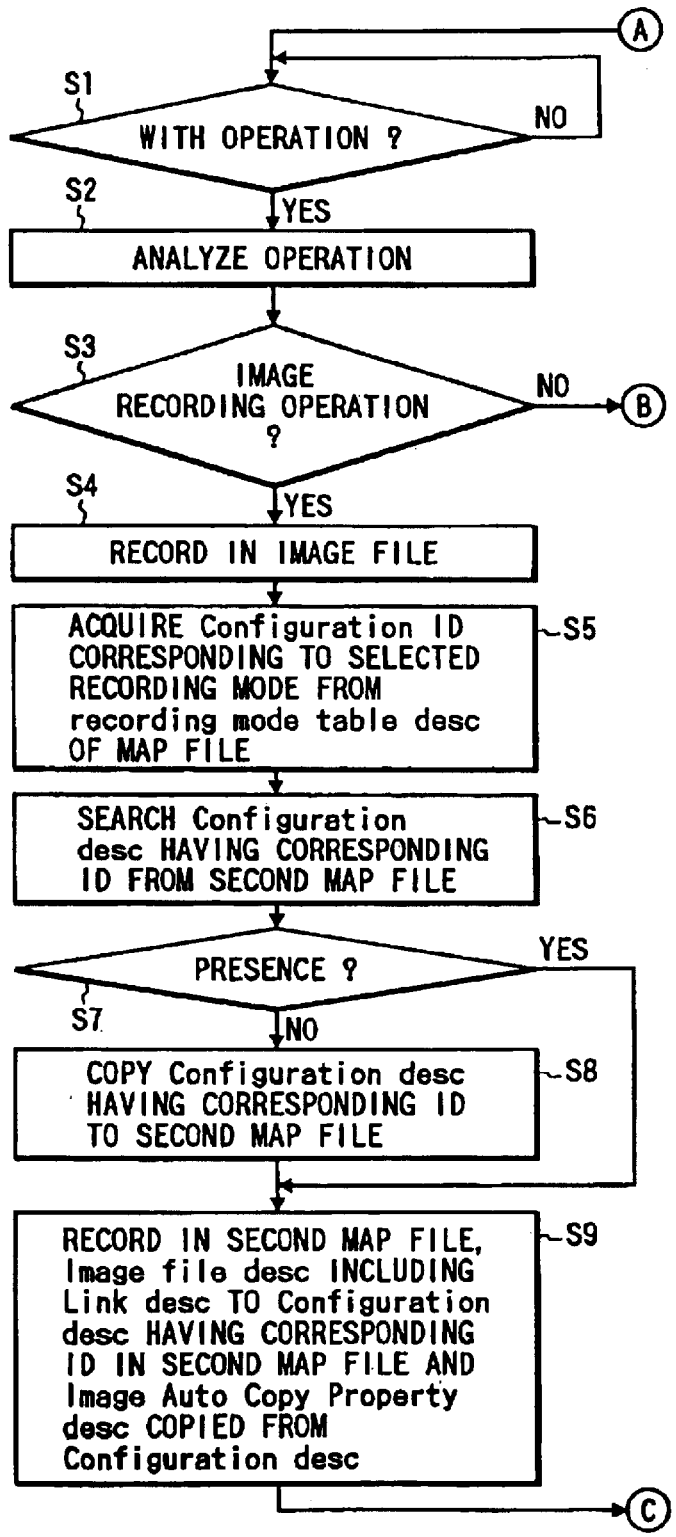
Figure 33B:
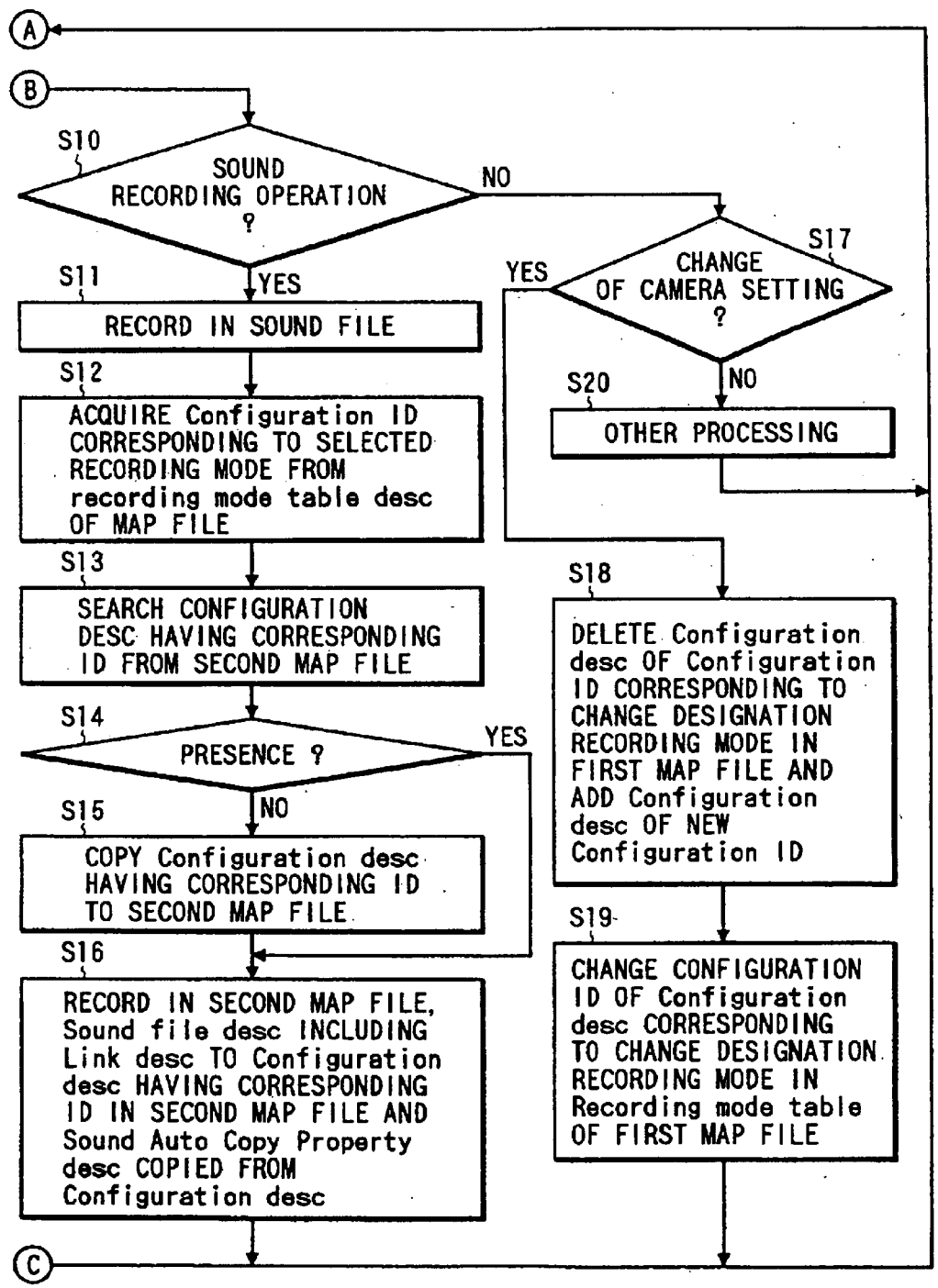

FIGS. 33A and 33B are flow charts showing a recording operation according to the third embodiment of the present invention. At step S1, it is determined whether or not an operation has been performed. When the determined result at step S1 is No, the system waits until an operation is performed. When the determined result at step S1 is Yes, the flow advances to step S2. At step S2, the operation is analyzed. At step S3, it is determined whether or not the operation is an image recording operation. When the determined result at step S3 is an image recording operation, the flow advances to step S4. At step S4, an image file is recorded. At step S5, a configuration ID corresponding to the selected recording mode is acquired from Recording Mode Table desc in the first map file 1. At step S6, Configuration desc having a relevant configuration ID is searched from the second map file 2. At step S7, it is determined whether or not the relevant configuration descriptor is present. When the determined result at step S7 is No, the flow advances to step S8. At step S8, Configuration desc having the relevant ID is copied from the first map file 1 to the second map file 2. At step S9, Image File desc that has Link desc to the configuration desc having the relevant configuration ID in the second map file and Image Auto Copy Property desc copied from Configuration desc is recorded to the second map file 2.

When the determined result at step S3 is No, the flow advances to step S10. At step S10, it is determined whether or not the operation is a sound recording operation. When the determined result at step S10 is Yes, the flow advances to step S11. At step S11, a sound file is recorded. At step S12, a configuration ID corresponding to the selected recording mode is acquired from Record Mode Table desc of the first map file 1. At step S13, the configuration descriptor having the relevant configuration ID is searched from the second map file 2. At step S14, it is determined whether or not the configuration desc is present. When the determined result at step S14 is No, the flow advances to step S15. At step S15, Configuration desc with the relevant ID is copied from the first map file 1 to the second map file 2. At step S16, Sound file desc that has Link desc to the configuration descriptor with the relevant configuration ID in the second map file and Sound Auto Copy Property desc copied from the configuration descriptor is recorded to the second map file 2.

When the determined result at step S10 is No, the flow advances to step S17. At step S17, it is determined whether or not the operation is a camera configuration changing operation. When the determined result at step S17 is Yes, the flow advances to step S18. At step S18, the configuration descriptor with the relevant configuration ID corresponding to the change designated recording mode is erased from the first map file 1. A new configuration description with a new configuration ID is added to the first map file 1. At step S19, the configuration ID corresponding to the change designated recording mode in the recording mode table of the first map file 1 is changed to the configuration ID of the new configuration descriptor.

When the digital camera is connected to the host computer 2415, image data, sound data, and configuration data in association therewith can be read with the reproducing program on the host computer 2415 and reproduced by the host computer 2415. At this point, designated image data can be displayed along with configuration information in association therewith. When the record data and configuration property information thereof are recorded so that they are associated, an object can be photographed with a plurality of configurations. The photographed images can be compared on the host computer 2415 with a plurality of configurations. A configuration condition of which an object can be optimally photographed can be stored. The stored configuration condition can be used for similar objects. In contrast, image data can be searched with a configuration name. Thus, image data photographed with the same configuration can be displayed.

The removable recording medium 2408 is a removable memory card, a removable hard disk, or the like. Thus, the removable recording medium 2408 may be not mounted on the system. At this point, the second map file 2 that stores image data and sound data is created on the built-in recording medium 2409. The image data is recorded on the recording medium 2409.

As descried above, according to the third embodiment, since a particular one of a plurality of property data items is automatically recorded in association with image data or sound data when the image data or sound data is recorded, properties that are not generated by the recording unit can be added to the image/sound data regardless of the type of the properties.

Since property information automatically added to record data is stored in the non-removable built-in recording medium, properties that are not generated by the recording unit can be added to the image/sound data regardless of the type of the properties.

Since property information associated with record data is stored in the first map file and particular property data is copied to the second map file when the record data is recorded, properties that are not generated by the recording unit can be added to image/sound data regardless of the type of the properties.

Since the first map file is stored in a non-removable built-in recording medium and the second map file is stored in a recording medium on which the image/sound data is recorded, properties that are not generated by the recording unit can be added to the image/sound data regardless of the type of the properties.

Since property information automatically added to record data is input or edited from the outside, properties that are not generated by the recording unit can be added to the image/sound data regardless of the type of the properties.

A designation of the image processing means can be added to image data.

Information for designating a configuration of the recording unit can be added to image data.

Any character information can be added to image data.

A configuration name of the recording unit can be added to sound data.

Since only property information that is not present in the second map file is copied from the first map file, the storage capacity of the second map file can be prevented from redundantly increasing. In addition, data copy time can be reduced.

Configuration property information of the recording apparatus corresponding to each recording mode is stored in the first map file. A table showing the relation between each recording mode and configuration property information is stored in the first map file. When image data is recorded, configuration property information is searched from the table. When the configuration property information is present in the second map file, the configuration property information of the second map file and record image data or record sound data are associated. When the configuration property information is not present in the second map file, the configuration property information is copied from the first map file to the second map file. Thereafter, since the configuration property information and record image data or record sound data are associated, the configuration property information corresponding to the recording mode selected from a plurality of recording modes are automatically associated with the record data, when image data or sound data is reproduced, the configuration thereof can be precisely acquired. When similar image data is photographed, the configuration can be used again. In contrast, image data or sound data can be searched with the configuration of the recording apparatus.

Fourth Embodiment

Figure 37:
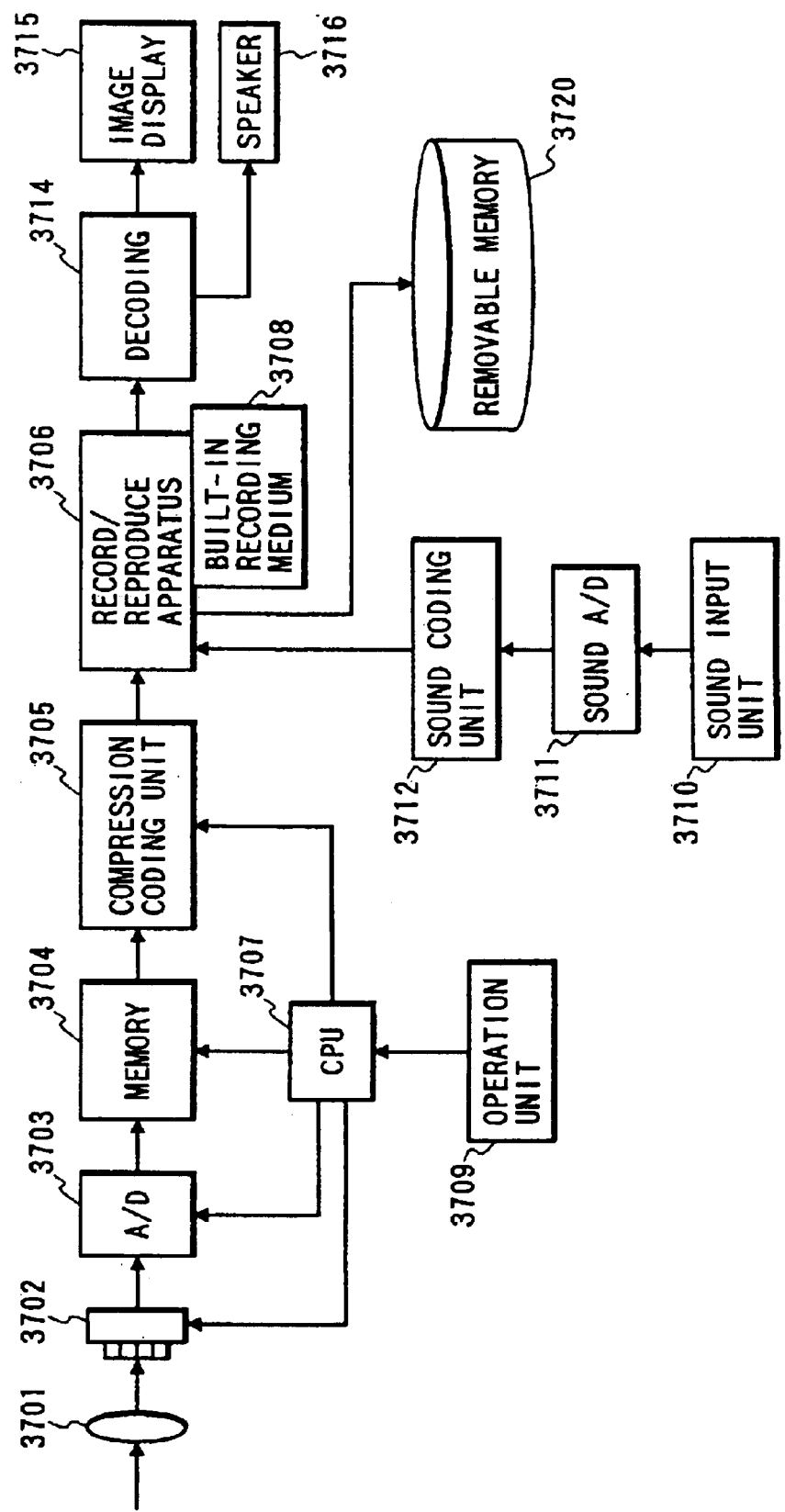
FIG. 37 is a block diagram showing a structure of a digital camera according to the fourth embodiment of the present invention.

FIG. 37 is a block diagram showing an example of the structure of a digital camera corresponding to a fourth embodiment of the present invention.

In FIG. 37, an optical image of an object obtained by a lens 3701 is converted into an image electric signal by an image pickup device 3702 such as a CCD disposed behind the lens 3701. The image pickup device 3702 stores electric charges corresponding to the optical image of the object with the response of a control signal supplied from a CPU 3707 and reads an image signal.

The image signal as an analog image signal is converted into a digital signal by an A/D converter 3703. Means for adjusting the image signal (for example, means for performing a gamma compensating process, color signal forming/separating process, and white balancing process) are disposed between the image pickup device 3702 and the A/D converter 3703.

The image signal converted into the digital signal by the A/D converter 3703 is temporarily stored in an image memory 3704. Thereafter, a compression coding unit 3705 compresses and codes the image data read from the image memory 3704. The compressed and coded image data is written as a captured data file such as an image file or a sound file to a built-in recording medium 3708 or a removable memory 3720 through a recording/reproducing unit 3706 that composes a recording/reproducing system.

As an example of the compressing method of the image data, JPEG method that has been defined as an international standard can be used.

As an example of the method for managing an image file and a sound file, a method for recording property information of captured data to one file management map file has been considered.

In this method, when property information such as image mode and photographing condition recorded in many captured data files is displayed as a list, it takes a long time to analyze the captured data files. To solve this problem, property information such as photographed date, photographing mode, photographing condition, record location of thumbnail image on medium, type of annotation, location of annotation information file on medium, image files, sound files, and group information are totally managed by a captured data management map file. The file management map file and the captured data files are recorded on the built-in recording medium.

Generally, the storage capacity of the built-in recording medium of the recording unit is relatively small. Thus, in addition to the built-in recording medium, a removable recording medium (removable memory) may be used. When much captured data is recorded on the built-in recording medium, since the storage capacity thereof becomes insufficient, the captured data is also recorded on the removable memory. However, when the removable memory is disconnected from the recording unit, the captured data group recorded therein is separated from the captured data management map file that manages it.

When the system management map file that stores above-described various configuration values is recorded in the removable memory, if the removable memory is disconnected from the recording unit, the configuration values of the system are lost.

When the removable memory that stores the system management map file of a particular system is connected to a different system, the configuration values of the system management map file become meaningless.

Thus, an object of the fourth embodiment is to provide an apparatus that properly manages both the system and captured data.

Next, with reference to the accompanying drawings, an image recording system (digital camera) according to the fourth embodiment of the present invention will be described. FIG. 37 shows a structure of the image recording system.

Figure 34:
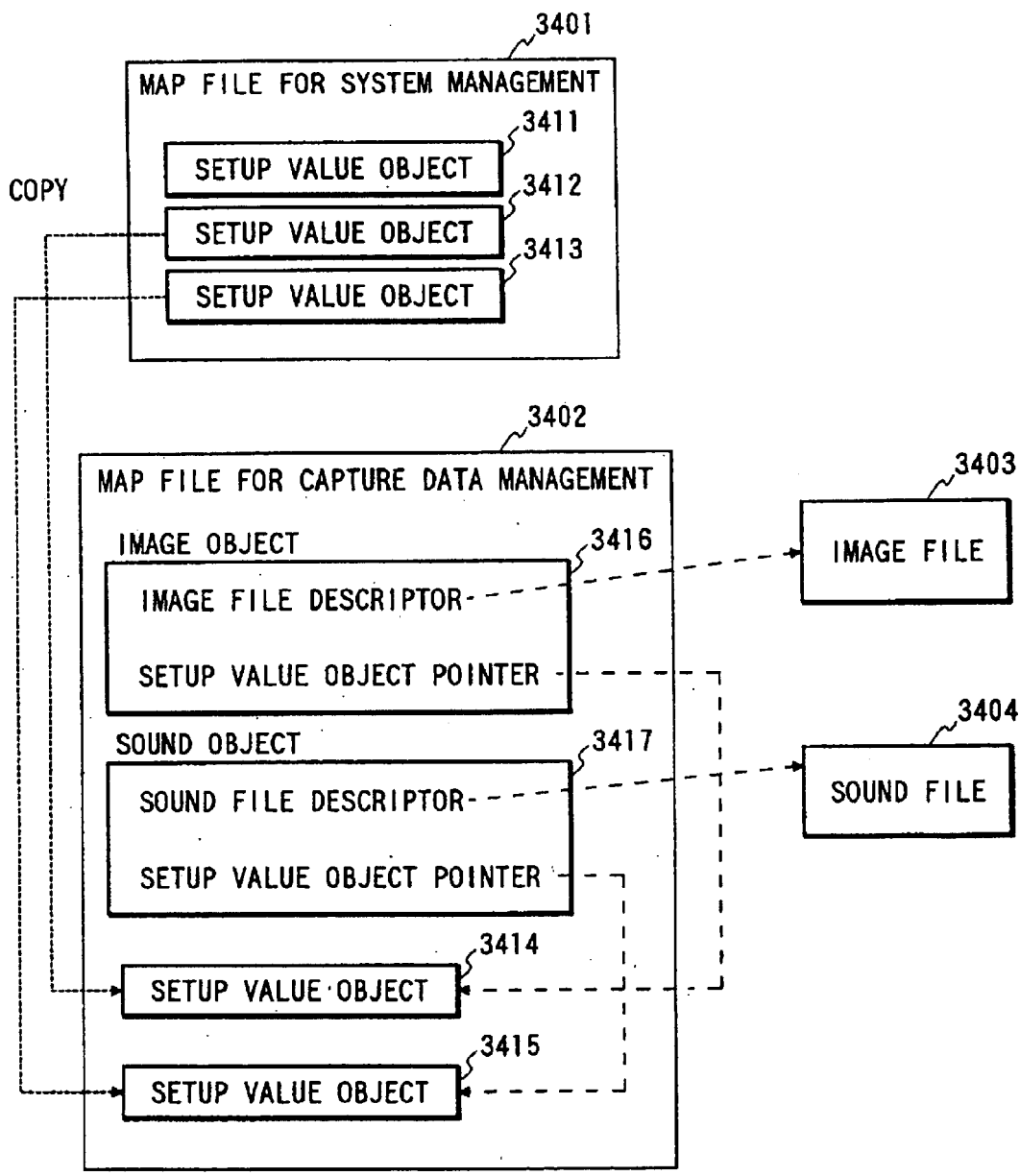
FIG. 34 is a schematic diagram showing structures of a system management map file and a captured data management map file according to a forth embodiment of the present invention.

FIG. 34 shows structures of a system management map file and a captured data management map file.

A system management map file 3401 of the recording system of the recording unit according to the embodiment can have a plurality of combinations of a plurality of setup items such as image format, exposure, focus, image size, and diaphragm value as setup value objects (3411, 3412, and 3413).

When captured data is recorded, for example the setup value object 3412 that has the setup values of the system is copied to the captured data management map file 3402 as the setup value object 3414. In the captured data management map file 3402, the copied setup value object 3414 and an image file 3403 as recorded captured data are recorded so that they are associated by an image data object 3416. Likewise, the setup value object 3413 is copied as a setup value object 3415. The setup value object 3415 is recorded in association with a sound data object 3417.

Thus, when captured data is recorded, the setup state of the system can be quickly searched and displayed.

Figure 35:
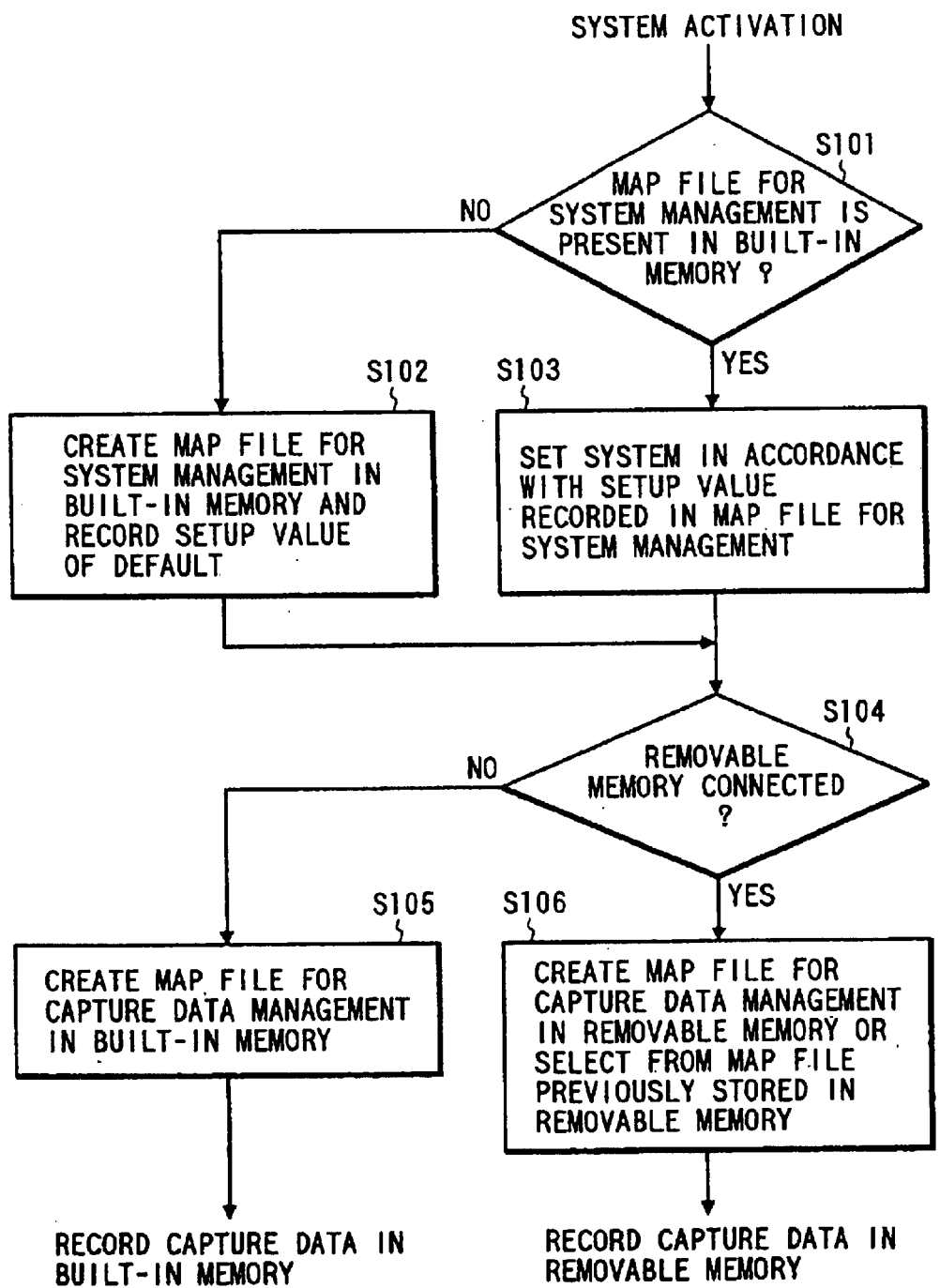
FIG. 35 is a flow chart showing a process after the system gets started.

Next, the system setting process just after the recording system gets started will be described with reference to a flow chart shown in FIG. 35.

At step S101, it is determined whether or not the system management map file is present in the built-in recording medium 3708. When the determined result at step S101 is No, the flow advances to step S102. At step S102, the system management map file 3401 is newly created on the built-in recording medium 3708. In addition, various default setup values are recorded in the system management map file 3401. When the determined result at step S101 is Yes, the flow advances to step S103. At step S103, the system is set up corresponding to the setup values recorded in the system management map file 3401.

At step S104, it is determined whether or not the removable memory 3720 is connected to the recording system. When the determined result at step S104 is No, the flow advances to step S105. At step S105, the captured data management map file 3402 is created on the built-in recording medium 3708. The captured data is recorded on the built-in recording medium 3708.

When the determined result at step S104 is Yes, the flow advances to step S106. At step S106, when the captured data management map file 3402 is not present in the removable memory 3720, it is newly created. Otherwise, the captured data management map file 3402 is selected from the removable memory or newly created thereon. The captured data is recorded in the removable memory 3720.

Figure 36A:
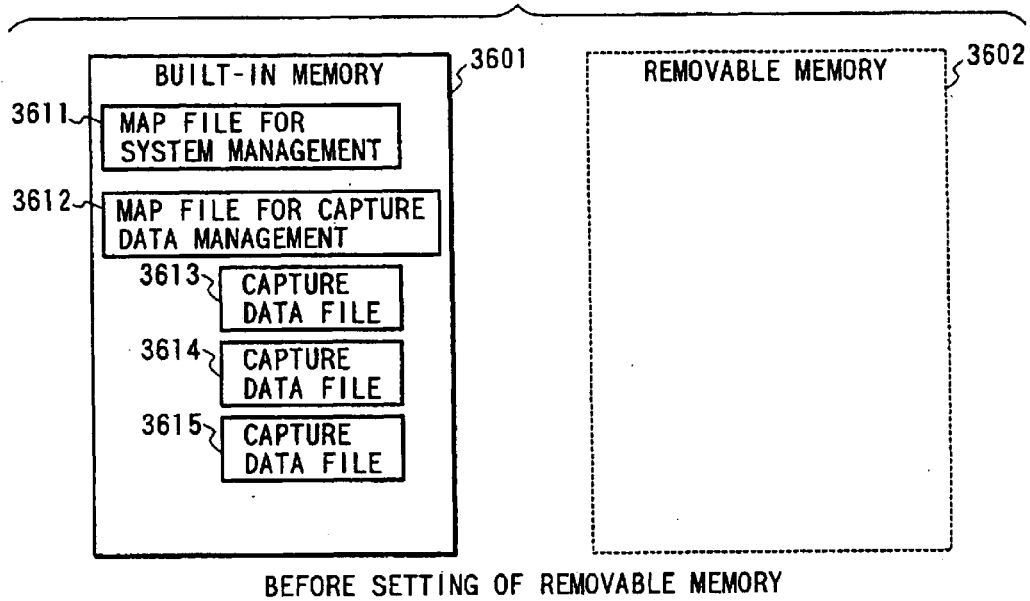
FIGS. 36A and 36B are schematic diagrams showing an outline of a copying operation for a captured data management map file and a captured data file, the copying operation being performed when a removable memory is mounted on the system.
Figure 36B:
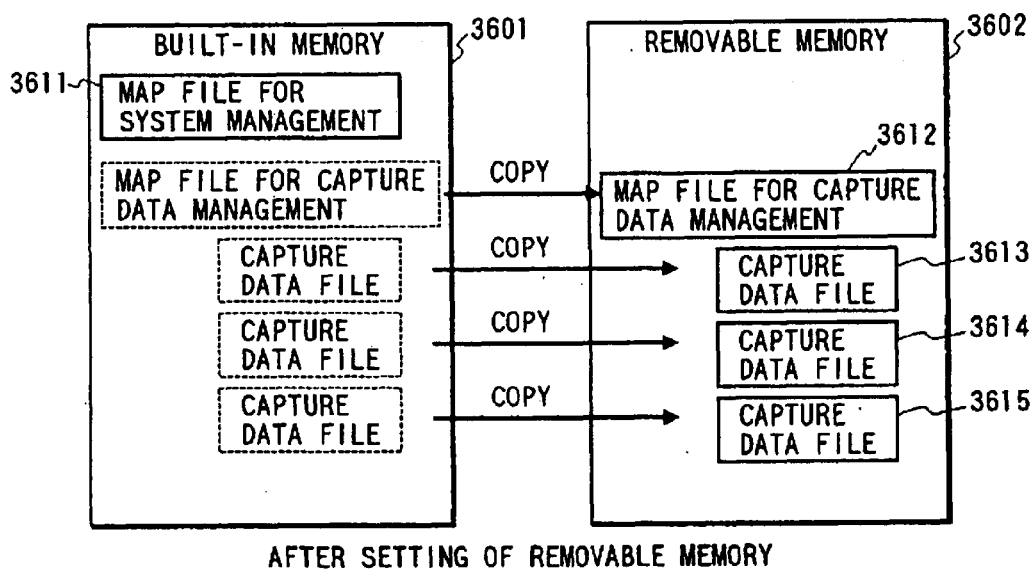

An operation in the case that the removable memory 3720 is mounted on the system after it gets started will be described with reference to FIGS. 36A and 36B. In FIG. 36A, when the removable memory has not been mounted, the system management map file 3611 and the captured data management map file 3611 are created on the built-in recording medium 3601. At this point, the captured data files 3613, 3614, and 3615 have been recorded on the built-in recording medium 3601. When the removable memory 3602 is newly mounted in such a state, as shown in FIG. 36B, the captured data management map file 3611 and the captured data files 3613, 3614, and 3615 are copied to the removable memory 3602.

Thus, new captured data is recorded in the removable memory 3602. Consequently, even if the removable memory 3602 is disconnected, the captured data management map file 3612 is not separated from the captured data files 3613, 3614, and 3615 controlled therewith. When the removable memory 3602 is connected to for example another computer system, since data of setup values of the system has been copied as shown in FIG. 34 and it has been associated with the captured data files, acquired various setup values of the system for captured data can be quickly searched and displayed.

As described above, according to the fourth embodiment, even if the removable memory is disconnected, the system management map file can be prevented from being lost from the system. In addition, the captured data management map file can be prevented from being separated from the captured data managed therewith.

According to the embodiment, since the system setup condition corresponding to captured data is recorded in the captured data management map file and they are associated, the system setup condition can be quickly searched and displayed.

In addition, when captured data is recorded, property values of the system are recorded in association with the captured data. Thus, even if system setup values are changed, data can be prevented from being incorrectly used.

When the recording unit is initially used, a file with default setup values is created. With the file, the system is set up. Thus, the user can use the system without need to input system setup values.

After the system is stopped, when it is restarted, since the last system setup state is stored, the user can operate the system in the last setup state.

When the removable memory is not connected to the system, captured data can be managed with a map file.

When captured data is recorded in a removable memory with a relatively large storage capacity, much captured data can be recorded. A captured data management map file can be selected from the removable memory or created thereon. Thus, when the removable memory is disconnected from the system, the captured data group can be prevented from being separated from the map file that manages it.

When captured data is moved from the built-in recording medium with a relatively small storage capacity to a removable memory with a relatively large storage capacity, while captured data managed by one map file is being recorded, the memory space can be prevented from becoming insufficient. In addition, when the captured data management map file is moved along with captured data, one record block can be prevented from being separated in a plurality of recording mediums.

Fifth Embodiment

Figure 38:
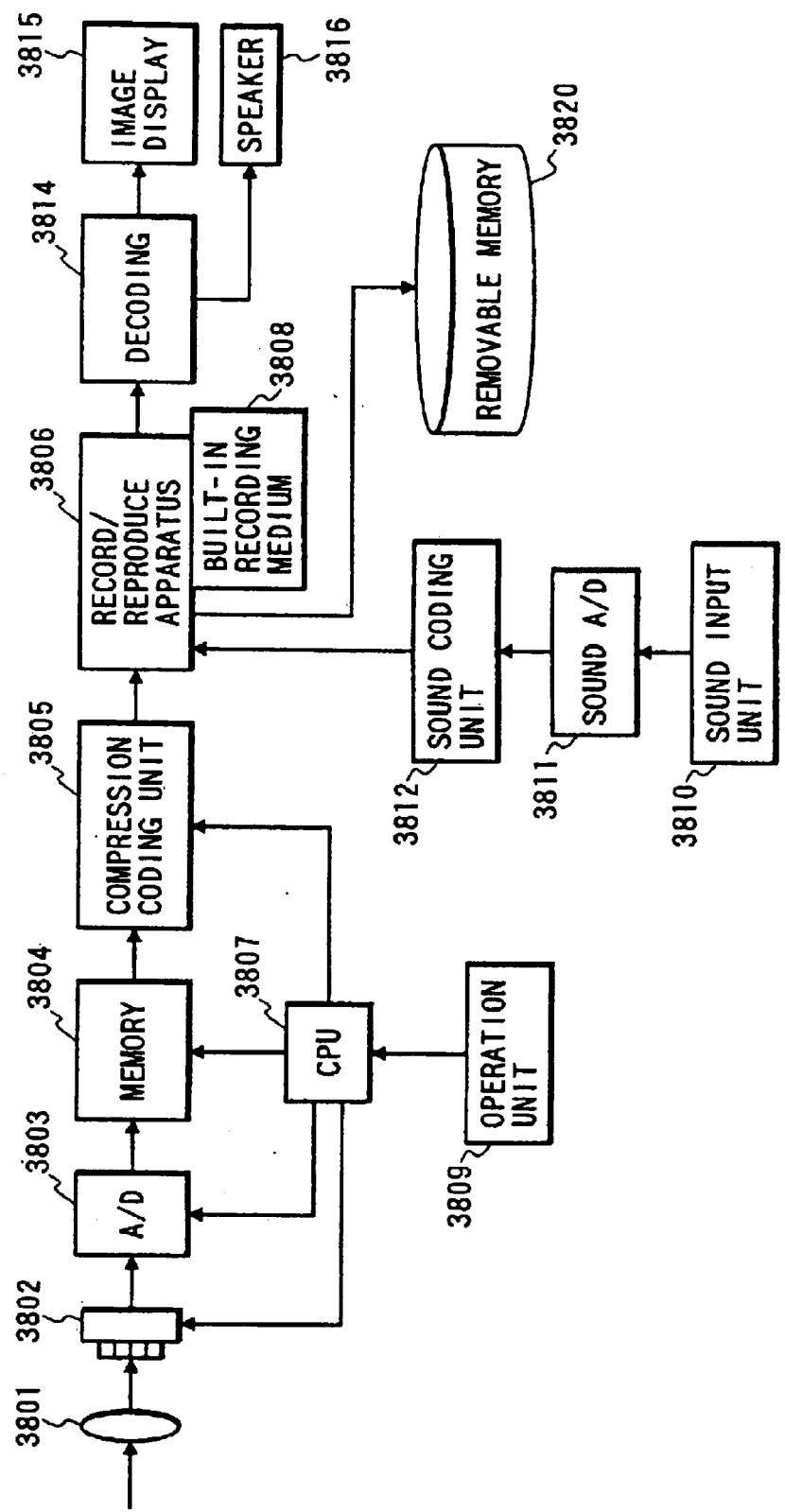
FIG. 38 is a schematic diagram showing a structure of a digital camera according to a fifth embodiment of the present invention.

FIG. 38 is a block diagram showing a structure of a digital camera according to a fifth embodiment of the present invention.

In FIG. 38, an optical image of an object obtained by a lens 3801 is converted into an image electric signal by an image pickup device such as a CCD disposed behind the lens 3801. An image pickup device 3802 stores electric charges corresponding to the optical image of the object with a control signal and reads an image signal.

The image signal as an analog signal is converted into a digital signal by an A/D converter 3803. Means for adjusting the image signal (for example, means for performing a gamma compensating process, color signal forming/ separating process, and white balancing process) (not shown) are disposed between the image pickup device 3802 and the A/D converter 3803.

The image signal converted into the digital signal by the A/D converter 3803 is temporarily stored in an image memory 3804. A compression coding unit 3805 compresses and codes image data read from the image memory 3804. The compressed and coded image data is written to a built-in recording medium 3808 or a removable memory 3820 through a recording/reproducing unit 3806.

As an example of the compressing method of the image data, JPEG method that has been defined as an international standard can be used.

When a CPU 3807 detects a sound record command issued by the user through an operation unit 3809, a sound signal that is input from a sound input unit 3810 is supplied to an A/D converter 3811. The A/D converter 3811 converts the sound signal into a digital data and supplies the digital data to a sound coding unit 3812. The sound coding unit 3812 compresses and codes the sound digital data and supplies the resultant data to the recording/reproducing unit 3806.

Next, an example of the management of record data of the digital camera as an example of the record management system according to the embodiment will be described.

In this embodiment, link information of each data item is recorded in a data management map file (hereinafter merely referred to as a map file).

Figure 39:
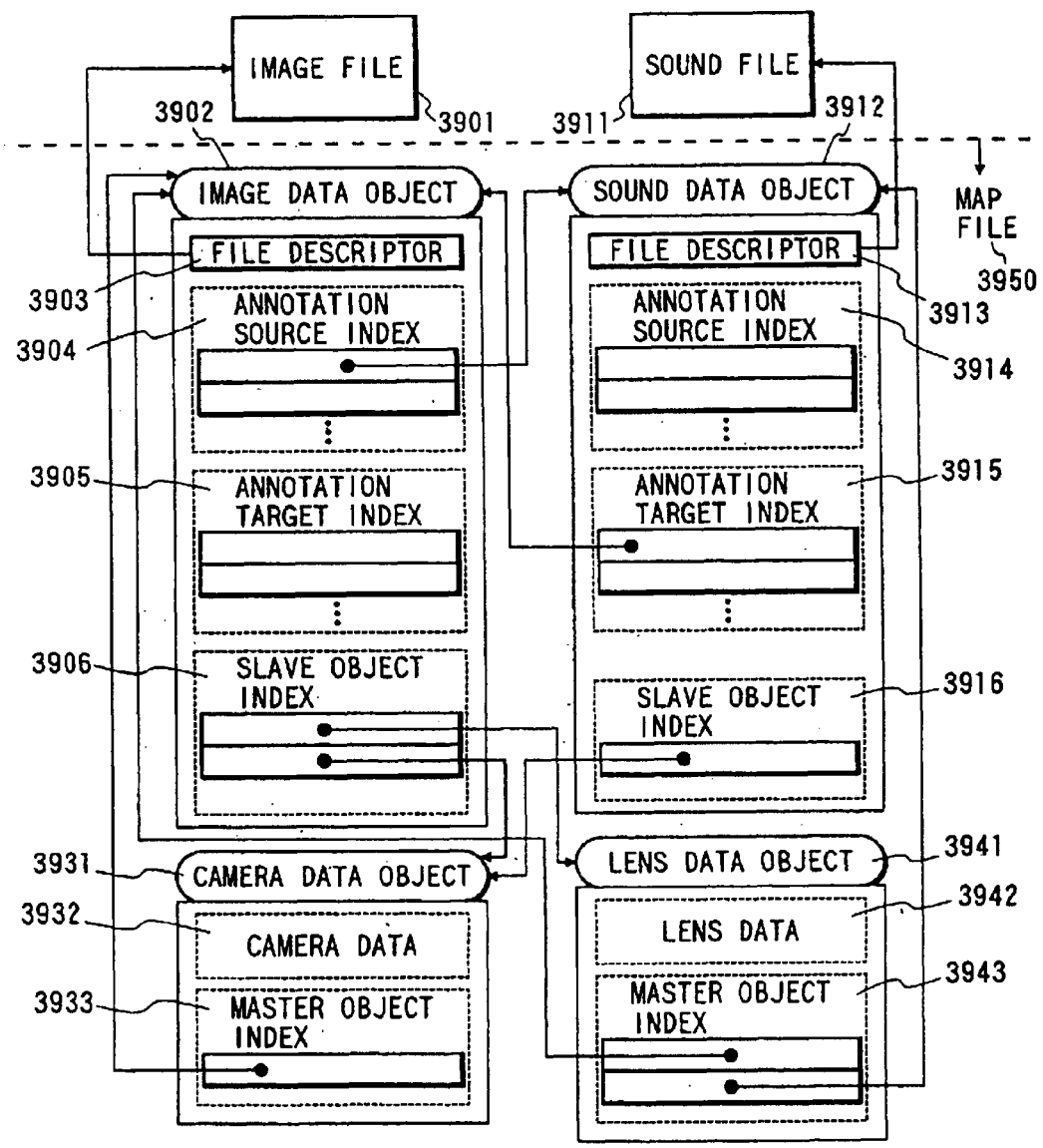
FIG. 39 is a schematic diagram showing a file format of a map file for recording information of link relation between record data and associated data according to the fifth embodiment of the present invention.

FIG. 39 shows a structure of a map file 3950 according to the embodiment.

Record data or the like is managed by the map file 3950. The map file 3950 has objects corresponding to the types of data to be recorded. Each object has information such as image/sound data itself, a file descriptor thereof, and associated data corresponding to the object.

In FIG. 39, recorded image data is stored in an image file 3901. In addition, a file descriptor 3903 to the file 3901 is recorded in an image data object 3902. Likewise, sound data is stored in a sound file 3911. In addition, a file descriptor 3913 to the file 3911 is recorded in a sound data object 3912 in the map file 3950.

In this embodiment, two types of linking methods are used. The first linking method is a linking method used when recorded data is annotated with other associated data. This method is referred to as annotation linking method. In this case, the image file 3901 is annotated with the sound file 3911 corresponding to the annotation linking method. To accomplish this relation, the image data object 3902 and the sound data object 3903 has annotation source indexes 3904 and 3914 and annotation target indexes 3905 and 3915, respectively.

The annotation source indexes 3904 and 3914 each have a pointer to a data object that annotates data corresponding to an object that has an index. In FIG. 39, the relation of which the sound file 3911 annotates the image file 3901 is shown. The annotation source index 3904 in the image data object 3902 has a pointer to the sound data object 3913. The annotation target index 3915 in the sound data object 3912 has a pointer to the image data object 3902. Since the annotating side and the annotated side have respective indexes, data can be searched from each side.

In addition, each index can have a plurality of pointers. Thus, one record data item can be annotated with a plurality of record data items. In contrast, a plurality of record data items can be annotated with one record data item.

The second linking method is a linking method for linking record data with data that represents property information or the like of the record data. The second linking method is referred to as a master-slave linking method.

In FIG. 39, the image file 3901 has as properties a camera data object 3931 and a lens data object 3941. The camera data object 3931 has camera data 3932 that is setup data of the camera at the time the image file 3901 was recorded. The lens data object 3941 has lens data 3942 that is setup data of the lens. A slave object index 3906 in the image data object 3902 has pointers to the objects 3931 and 3941. As property information, the camera object 3931 has the camera data 3932 that is setup data of the camera at the time the sound file 3911 was recorded. A slave object index 3916 in a sound data object 3912 has a pointer to the camera object 3931. Thus, as with the annotation linking method, in the master-slave linking method, data can be searched from each side. In addition, a plurality of slave objects can be linked to one record data item. In contrast, one object as a slave object can be linked with a plurality of record data items.

As described above, the referencing method (data annotating method and linking method) of the first linking method is different from that of the second linking method. Link information corresponding to each method is used.

Figure 40:
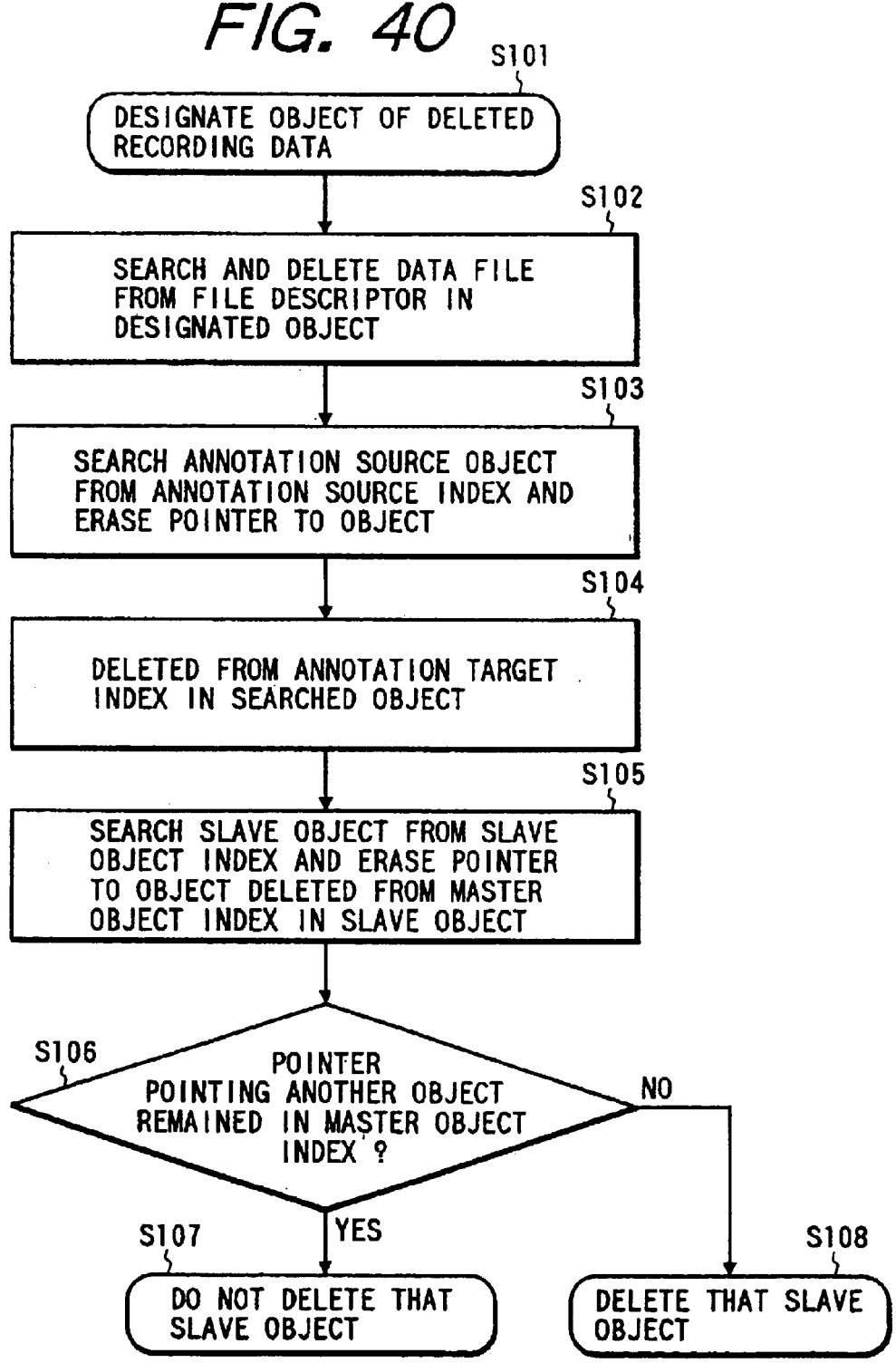
FIG. 40 is a flow chart showing a process of associated data linked with record data to be erased.

Next, the process in the case that record data is erased corresponding to each linking method will be described with reference to a flow chart shown in FIG. 40.

First, the user designates an object of record data to be deleted (at step S101). The system searches a data file corresponding to a file descriptor in the designated object and erases the data file (at step S102). Thereafter, an annotation source object is searched from an annotation source index. The pointer to the object to be erased is erased from the annotation target index in the acquired object (at step S103).

Thereafter, an annotation target object is searched from the annotation target index. The point to the object to be erased is erased from the annotation source index in the acquired object (at step S104).

Thereafter, a slave object is searched from the slave object index. The pointer to the object to be erased is erased from the master object index in the slave object (at step S105). Thereafter, it is determined whether or not a pointer to another object is present in the master object index (at step S106). When the determined result at step S106 is No, the flow advances to step S108. At step S108, the slave object is erased. When the determined result at step S106 is Yes, the flow advances to step S107. At step S107, the object is not erased.

Next, the above-described process will be described in detail with reference to FIG. 39.

First, the process corresponding to the annotation linking method will be described. Assume that a command for erasing the image file 3901 is issued to the system. In this case, the image file 3901 is searched with the file descriptor 3903 in the image data object 3902 of the map file 3950 and then the image file 3901 is erased. Thereafter, the sound data object 3912 is searched with the pointer in the annotation source index 3905 of the image data object 3902 and then the pointer to the image data object 3902 in the annotation target index 3915 is erased. In this case, since it is considered that sound data in the sound file 3911 is one captured data item and even if the linking relation with the image file 3901 is lost, since the sound file is meaningful as it is, the sound data object 3912 is not erased.

Next, the process for the master-slave linking method will be described. The camera data object 3901 is searched from the slave object index 3906 in the image data object 3902. The pointer to the image data object 3902 is erased from the master object index 3933. Thus, since the master object index 3933 becomes empty, the camera data object 3932 is also erased. In addition, the lens data object 3941 is searched from the slave object index 3906. The pointer to the image data object 3902 is erased from the master object index 3943. At this point, since the master object index 3943 does not become empty, the lens data object 3941 is not erased.

When information of the specifications of the camera is linked with image data or sound data corresponding to the master-slave linking method, examples of the information are camera owner name, camera name, camera body ID, version, sensitivity, ROM operation mode, image pickup device name, and the specifications of infrared ray filter.

When information of the specifications of the lens is linked with image data or sound data corresponding to the master-slave linking method, examples of the information are lens owner name, lens model name, and the specifications of the lens.

Assume the case that one image data item is photographed with a camera of interchangeable lens type and a lens A and other image data items are photographed with the same camera and a lens B. In this case, when the first image data item is erased, the data of the lens A becomes meaningless. Thus, the data of the lens A wastes the storage capacity of the memory. When data that is meaningless as it is is shared, the master-slave linking method is preferably used.

When information of the specifications of a flash light is linked with image data or sound data corresponding to the master-slave linking method, examples of the information are flash light owner name, flash light model name, and the specifications of the flash light.

Consider the case that annotation information for image data or sound data is linked with another image data or another sound data corresponding to the annotation linking method. In this case, image data, sound data, character data, graphics data, or the like may be linked to image data. On the other hand, image data, sound data, character data, graphics data, or the like may be linked to sound data.

As described above, according to this embodiment, since link information is recorded corresponding to a selected one of a plurality of linking methods, necessary data on the recording medium can be protected. In addition, unnecessary data on the recording medium can be erased. Thus, the recording medium can be prevented from being wastefully used. Moreover, many data items can be effectively managed.

When indexes for bidirectionally searching data are recorded as link information between data items, with image data, sound data, or the like being designated, associated information can be displayed. In contrast, with associated data being designated, image data, sound data, or the like associated therewith can be quickly searched.

Since the linking method of which one associated data item annotates a plurality of record data items is provided, the recording medium can be prevented from being wastefully used.

Since the linking method of which a plurality of associated data items annotate one record data item is provided, one record data item can be annotated with many data items in detail.

With the linking method of which annotating data item is not erased when an annotated data item is erased in the condition that the annoting data item is linked with the annoted data item, data that is meaningful as it is and that should not be erased can be protected.

With the linking method of which when an annoted data item is deleted, if there is no annoting data item that annotates the deleted annoted data item, the annoting data item is also erased, otherwise, an annoting data item is not erased, a data item that is meaningless as it is can be erased. Thus, the recording medium can be prevented from being wastefully used.

Since the first linking method and the second linking method are provided, a proper one can be selected corresponding to the type of associated data.

When an annotating data item is meaningful as it is, the first linking method is used for the data item. When an annoting data item is meaningless as it is, the second linking method is used. Thus, the recording medium can be prevented from being wastfully used with a data item that is meaningless as it is. In addition, a data item that is meaningful as it is can be prevented from being erased unless it is explicitly designated.

In addition, since information of the specifications of the camera is linked as associated data with image data or sound data corresponding to the second linking method, the information of the specifications of the camera that is meaningless unless associated with record data is erased. Thus, the recording medium can be prevented from being wastefully used with such information.

Since information of the specifications of a lens is linked as associated data with image data or sound data corresponding to the second linking method, the information of the specifications of the lens that is meaningless unless linked with record data is erased. Thus, the recording medium can be prevented from being wastefully used with such information.

Since information of the specifications of a flash light is linked as associated data with image data or sound data corresponding to the second linking method, the information of the specifications of the flash light that is meaningless unless it is linked to record data is erased. Thus, the recording medium can be prevented from being wastefully used with such information.

Since annotation information of image data or sound data is linked as associated data of record data with image data or sound data corresponding to the first linking method, the annotation information can be prevented from being erased unless explicitly designated.

Sixth Embodiment

Next, a sixth embodiment of the present invention will be described with reference to the accompanying drawings.

FIG. 41 is a schematic diagram showing an outlined structure of a photographing apparatus according to the embodiment. The apparatus is composed of an image pickup device 41-1 such as a CCD, a CPU 41-2 (that controls the entire apparatus), a recording unit 41-3 (that records image data and associated information thereof (that is necessary when the image data is reproduced)), a setup information storing unit 41-4 (that stores setup information including a reproduction processing means identification table (that will be described later)), a photographing mode setup switch 41-5, and a photographing switch 41-6.

Figure 46:
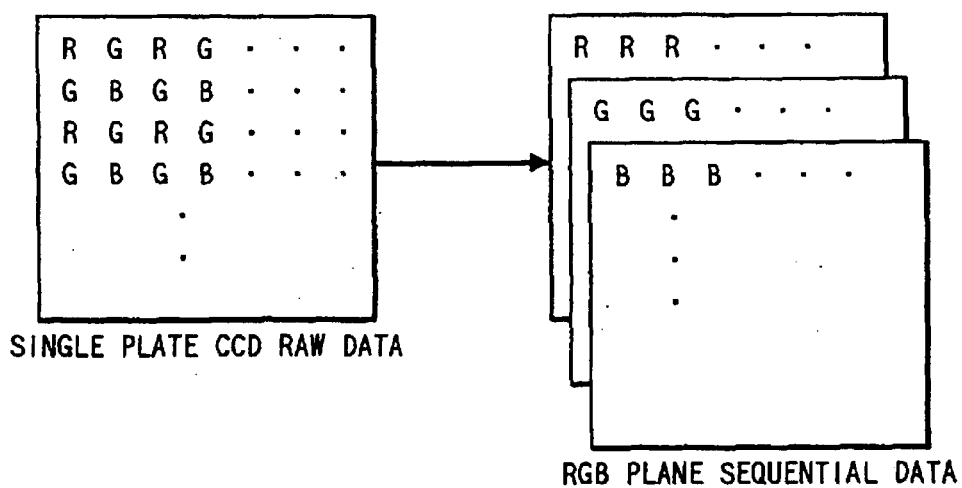
FIG. 46 is a schematic diagram showing a structure in the case that image data does not accord with a standard format.
Figure 47:
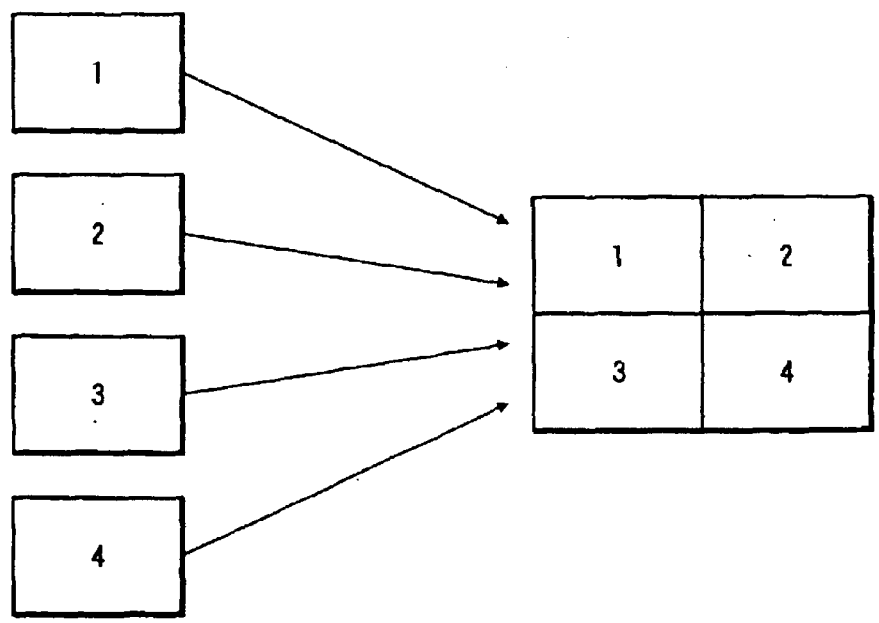
FIG. 47 is a schematic diagram showing a structure in the case that a plurality of images are combined to one image.

In this embodiment, as shown in FIG. 46, a signal process for converting single plate CCD raw data into RGB plane sequential data is varied depending on whether an object (solid substance) such as a normal scene or a monochrome manuscript such as characters on white paper is photographed. On the other hand, as shown in FIG. 47, when a plurality of images are combined as one image, the image format of each image is the same as the conventional format. However, the reproducing process is automatically started corresponding to the selected photographing mode so that a plurality of images are automatically combined.

Next, the operation of the photographing apparatus shown in FIG. 41 will be described.

In this apparatus, the reproduction processing means identification table that has information for identifying a reproduction processing means necessary for the reproducing operation in each available photographing mode has been stored in the setup information storing unit 41-4. For example, assume that the mode 1 is the normal photographing mode, the mode 2 is the monochrome manuscript photographing mode, and so forth. File names of reproduction application software programs as identification information necessary for the reproducing operation are assigned to the modes 1, 2, and so forth.

FIG. 42 shows data listed in the reproduction processing means identification table of the setup information storing unit 41-4. In the mode 1 (normal photographing mode), since no special process is required, no file name is listed.

Figure 43:
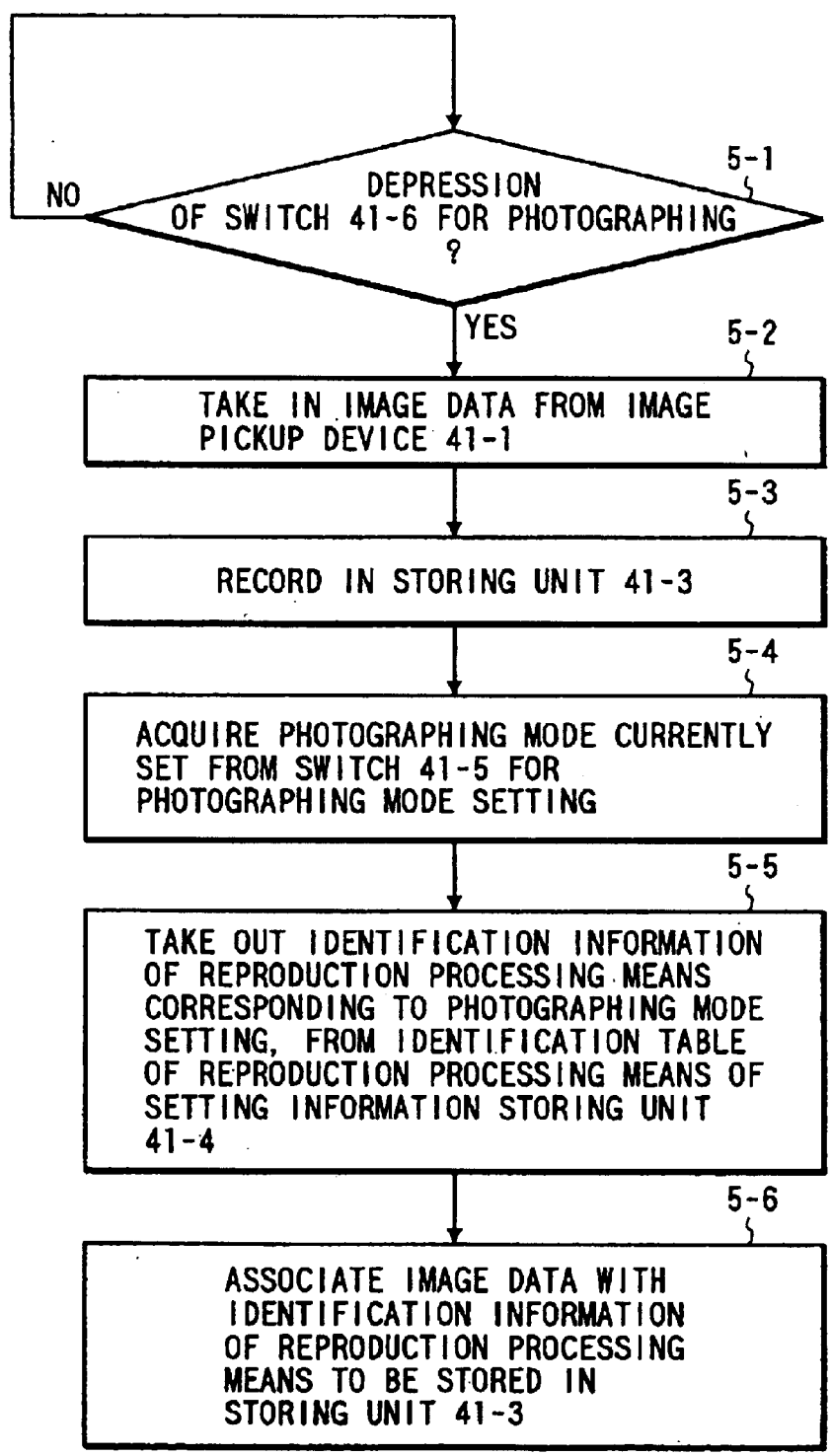
FIG. 43 is a flow chart showing a photographing process.

FIG. 43 shows a flow chart of the photographing process.

The user sets up a photographing mode with the photographing mode setup switch 41-5. When the user photographs an image, he or she presses the photographing switch 41-6. Thus, the CPU 41-2 detects the operation of the photographing switch 41-6 (at step 5-1) and acquires image data from the image pickup device 41-1 (at step 5-2). The image data is recorded on the storing unit 41-3 (at step 5-3). Thereafter, the CPU 41-2 acquires the photographing mode that has been currently set up from the photographing mode setup switch 41-5 (at step 5-4). In addition, the CPU 41-2 acquires reproduction processing means identification information corresponding to the photographing mode that has been set up from the reproduction processing means identification table in the setup information storing unit 41-4 (at step 5-5) and records the image data and the reproduction processing means identification information in a map file of the storing unit 41-3 so that the image data and the reproduction processing means identification information are associated (at step 5-6).

Figure 44:
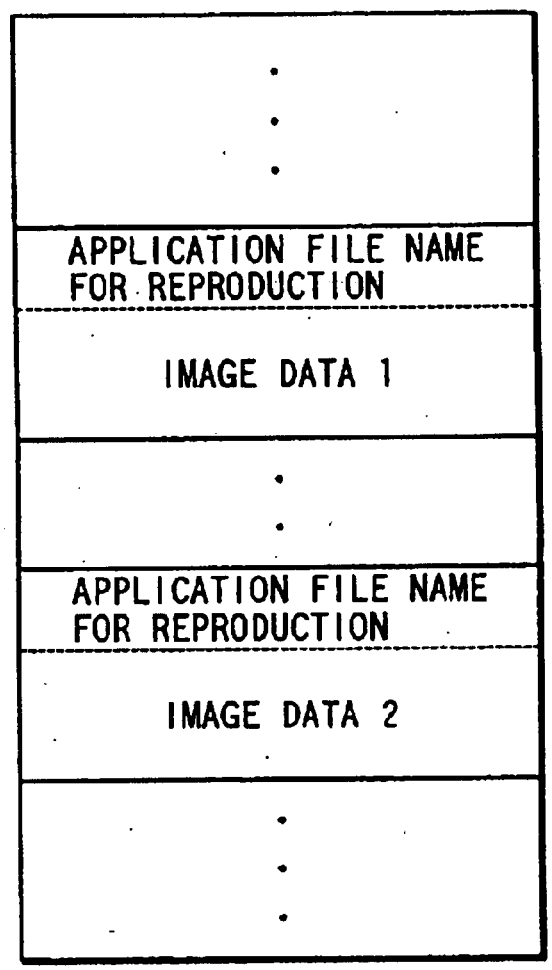
FIG. 44 is a schematic diagram showing data of a map file.

FIG. 44 shows data in the map file.

The map file has a plurality of associated information blocks, each of which has location information of at least one image data item and reproduction processing means identification information thereof. With at least one map file, associated information of image data is managed.

Next, the image reproducing process in the image processing apparatus will be described.

Figure 45:
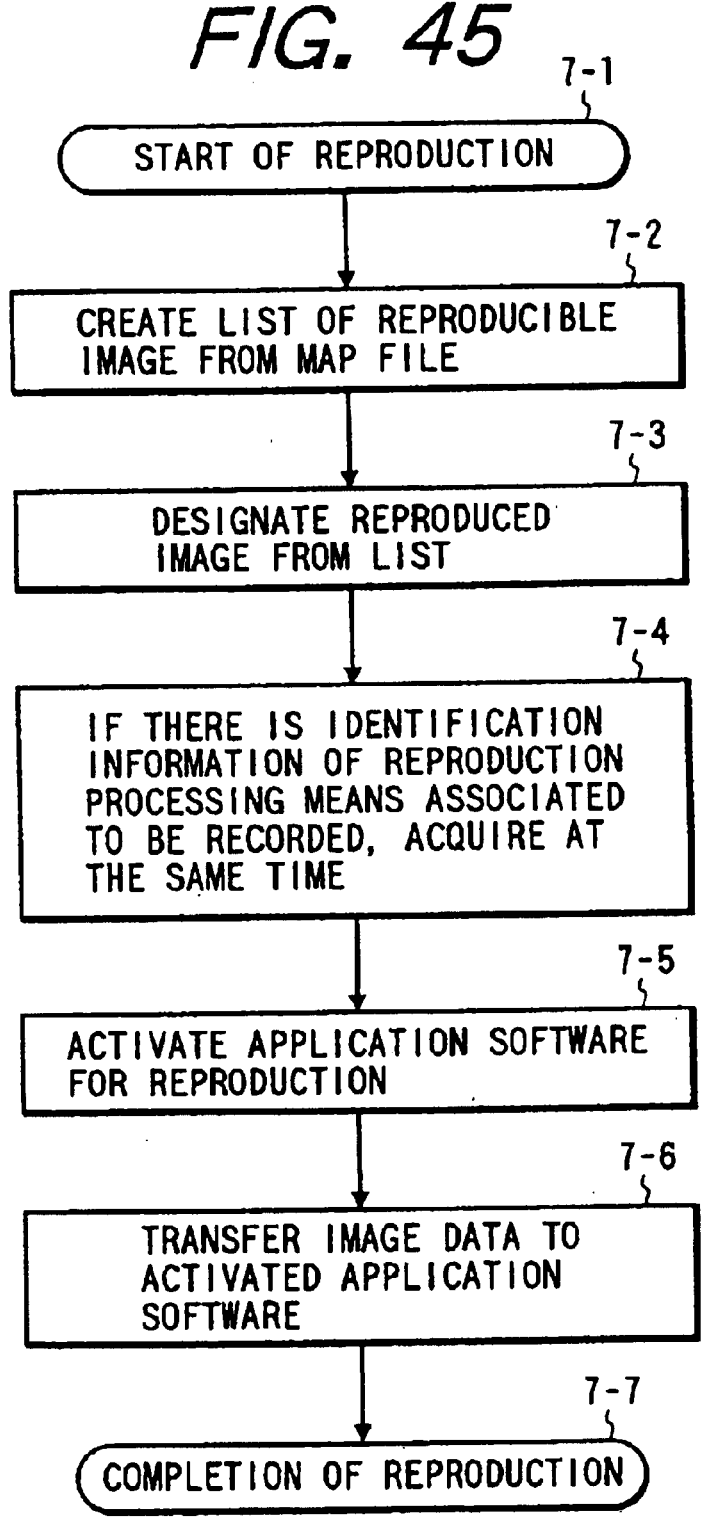
FIG. 45 is a flow chart showing a reproducing process.

FIG. 45 shows a flow chart of the reproducing operation. When image data is reproduced, the map file is read and a list of image data items that can be reproduced is created (at step 7-2). Thereafter, a desired image data items is designated in the list (at step 7-3). At this point, when there is reproduction processing means identification information recorded in association with the image data item is present, the information is also acquired at the same time (at step 7-4). With the information, the reproducing application software is started (at step 7-5). The image data is passed to the application software (at step 7-6). Thus, the image data is completely reproduced (at step 7-7).

In the sixth embodiment, a file name of the reproduction application software is assigned as reproduction processing means identification information that is necessary when image data is reproduced. However, it should be noted that instead of a file name, for example processes may have been registered as members of a shared library and a desired process may be evoked with its name therefrom.

As described above, according to the sixth embodiment, since identification information for identifying an image process performed in reproducing image data is assigned to image data when it is photographed, the reproduction processing means can be automatically started up corresponding to the assigned identification information when the image data is reproduced. Thus, image data can be automatically and properly processed without need to change, modify, or add the image format and without intervention of the user. Thus, a new photographing mode by a new process can be easily added.

Another Embodiment

Each of the above-described embodiment can be applied for a system composed of a plurality of units or for an apparatus composed of one unit.

In addition, each of the above-described embodiments includes the method of which a program that accomplishes the structure of each of the above-described embodiments is stored in a storing medium. Moreover, each of the above-described embodiments includes the storing medium that stores the foregoing program.

Examples of the storing medium are a floppy disk, a hard disk, an optical disc, a magnet-optical disc, a CD-ROM, a magnetic tape, a nonvolatile memory card, and an ROM.

Each of the above-described embodiments includes not only the case that the process is performed by the program stored in the storing medium, but the case that the process is executed along with another software program and/or an extended board on an operating system.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An image processing apparatus comprising:
   reproduction means for reproducing on a recording medium an image signal and discrimination information obtained from information representing an image pickup mode of the image signal to automatically select a predetermined application from among plural applications used in case of reproducing an image picked up in the image pickup mode; and
   processing means for automatically activating the application according to the reproduced discrimination information and thus performing an image processing of the image signal representing the picked-up image;

wherein said processing means is adapted to combine plural images into one image using the predetermined application corresponding to each image.

2. An apparatus according to claim 1, wherein the image process is performed based on reproduction software.

3. An apparatus according to claim 2, wherein the reproduction software is automatically started in accordance with the identification information.

4. An apparatus according to claim 1, wherein the image data and the identification information are recorded in the recording medium by an image pickup apparatus.

5. An image processing method, comprising the steps of:

reproducing, on a recording medium, an image signal and discrimination information obtained from information representing an image pickup mode of the image signal to automatically select a predetermined application from among plural applications used in case of reproducing an image picked up in the image pickup mode; and automatically activating the application according to the reproduced discrimination information and thus performing an image processing of the image signal representing the picked-up image, wherein in said activating step plural images are combinable into one image using the predetermined application corresponding to each image.

6. A memory medium, storing computer-executable instructions for performing an image reproduction method, said method comprising the steps of:

reproducing, on a recording medium, an image signal and discrimination information obtained from information representing an image pickup mode of the image signal to automatically select a predetermined application from among plural applications used in case of reproducing an image picked up in the image pickup mode; and automatically activating the application according to the reproduced discrimination information and thus performing an image processing of the image signal representing the picked-up image, wherein in said activating step plural images are combinable into one image using the predetermined application corresponding to each image.

* * * * *

UNITED STATES PATENT AND TRADEMARK OFFICE
CERTIFICATE OF CORRECTION

PATENT NO. : 6,771,889 B1
DATED : August 3, 2004
INVENTOR(S) : Akira Suga et al.

It is certified that error appears in the above-identified patent and that said Letters Patent is hereby corrected as shown below:

<u>Drawings,</u>
Sheet 11, Sheet 11, Figure 11, "SubObu jectID=1" should read -- SubObjectID=1 --;
Sheet 14, Figure 14A, "ANALIZE" should read -- ANALYZE --;
Sheet 30, Figure 31, "Prorerty" should read -- Property --; and
Sheet 40, Figure 42, "PHOTOGRAPHING MOVE" should read
-- PHOTOGRAPHING MODE --.

<u>Column 1,</u>
Line 12, "an" should be deleted; and
Line 29, "such a" should read -- such as a --.

<u>Column 3,</u>
Line 46, "forth" should read -- fourth --.

<u>Column 5,</u>
Line 49, "tyep.IDCode." should read -- type.IDCode --; and
Line 54, "shown" should read -- shown in --.

<u>Column 7,</u>
Line 64, "an" should read -- a --.

<u>Column 8,</u>
Line 36, "a" should read -- an --; and
Line 49, "IMAG000.JPG" should read -- IMAG0000.JPG --.

<u>Column 11,</u>
Line 2, "represent" should read -- represents --.

<u>Column 14,</u>
Line 31, "is" should be deleted; and
Line 45, "hiearchical" should read -- hierarchical --.

<u>Column 16,</u>
Line 34, "record" should read -- recorded --; and
Line 67, "even if their appearance is resemble" should read
-- even if they have a similar appearance --.

UNITED STATES PATENT AND TRADEMARK OFFICE
CERTIFICATE OF CORRECTION

PATENT NO. : 6,771,889 B1
DATED : August 3, 2004
INVENTOR(S) : Akira Suga et al.

It is certified that error appears in the above-identified patent and that said Letters Patent is hereby corrected as shown below:

<u>Column 18,</u>
Line 14, "a" should read -- an --.

<u>Column 20,</u>
Line 42, "an" should read -- a --.

<u>Column 23,</u>
Line 8, "has" should read -- have --.

<u>Column 24,</u>
Line "configu-" should read -- Configu- --.

<u>Column 32,</u>
Lines 11, 17 and 27, "annoting" should read -- annotating --;
Lines 12, 14, "annoted" should read -- annotated --;
Line 15, "annoting" should read -- annotating --;
Line 16, "annoted" should read -- annotated --; and "annoting" should read -- annotating --; and
Lines 29 and 45, "wastfully" should read --wastefully--.

<u>Column 34,</u>
Line 2, "items" should read -- item --; and
Line 32, "embodiment" should read -- embodiments --.

Signed and Sealed this

Twenty-sixth Day of October, 2004

JON W. DUDAS
*Director of the United States Patent and Trademark Office*